（12） United States Patent
Nishijima

(10) Patent No.: US 9,176,571 B2
(45) Date of Patent: Nov. 3, 2015

(54) MICROPROCESSOR AND METHOD FOR DRIVING MICROPROCESSOR

(71) Applicant: Semiconductor Energy Laboratory Co., Ltd., Atsugi-shi, Kanagawa-ken (JP)

(72) Inventor: Tatsuji Nishijima, Kanagawa (JP)

(73) Assignee: Semiconductor Energy Laboratories Co., Ltd., Atsugi-shi, Kanagawa-ken (JP)

( * ) Notice: Subject to any disclaimer, the term of this patent is extended or adjusted under 35 U.S.C. 154(b) by 249 days.

(21) Appl. No.: 13/780,412

(22) Filed: Feb. 28, 2013

(65) Prior Publication Data

US 2013/0232366 A1 Sep. 5, 2013

(30) Foreign Application Priority Data

Mar. 2, 2012 (JP) .................................. 2012-047096

(51) Int. Cl.
*G06F 1/32* (2006.01)
*G06F 1/26* (2006.01)

(52) U.S. Cl.
CPC ................ *G06F 1/3275* (2013.01); *G06F 1/26* (2013.01); *Y02B 60/1228* (2013.01)

(58) Field of Classification Search
CPC ..................................... G06F 1/32; G06F 1/26
USPC .................................................. 713/324, 300
See application file for complete search history.

(56) References Cited

U.S. PATENT DOCUMENTS

| 5,528,032 | A | 6/1996 | Uchiyama |
| 5,731,856 | A | 3/1998 | Kim et al. |
| 5,744,864 | A | 4/1998 | Cillessen et al. |
| 6,127,702 | A | 10/2000 | Yamazaki et al. |
| 6,294,274 | B1 | 9/2001 | Kawazoe et al. |
| 6,563,174 | B2 | 5/2003 | Kawasaki et al. |

(Continued)

FOREIGN PATENT DOCUMENTS

| EP | 1 737 044 A1 | 12/2006 |
| EP | 2 226 847 A2 | 9/2010 |

(Continued)

OTHER PUBLICATIONS

Asakuma, N et al., "Crystallization and Reduction of Sol-Gel-Derived Zinc Oxide Films by Irradiation With Ultraviolet Lamp," Journal of Sol-Gel Science and Technology, 2003, vol. 26, pp. 181-184.

(Continued)

*Primary Examiner* — Jaweed A Abbaszadeh
*Assistant Examiner* — Phil Nguyen
(74) *Attorney, Agent, or Firm* — Fish & Richardson P.C.

(57) ABSTRACT

A microprocessor with low power consumption and a method for driving the microprocessor are provided. The microprocessor includes a processor core, a cache memory, an interrupt controller, and a power supply controller. As at least one of a plurality of memory cell arrays included in the cache memory, a memory cell array composed of a plurality of memory cells is used. At the time of switching to a low power consumption mode, data used by the processor core after supply of power is resumed is prefetched to the memory cell array; then supply of power to the cache memory is stopped. Then, the processor core fetches needed data from the memory cell array after supply of power to the cache memory is resumed.

9 Claims, 23 Drawing Sheets

(56) References Cited

U.S. PATENT DOCUMENTS

| | | | |
|---|---|---|---|
| 6,727,522 B1 | 4/2004 | Kawasaki et al. | |
| 7,049,190 B2 | 5/2006 | Takeda et al. | |
| 7,061,014 B2 | 6/2006 | Hosono et al. | |
| 7,064,346 B2 | 6/2006 | Kawasaki et al. | |
| 7,105,868 B2 | 9/2006 | Nause et al. | |
| 7,197,666 B1* | 3/2007 | Yin | 714/23 |
| 7,211,825 B2 | 5/2007 | Shih et al. | |
| 7,282,782 B2 | 10/2007 | Hoffman et al. | |
| 7,297,977 B2 | 11/2007 | Hoffman et al. | |
| 7,323,356 B2 | 1/2008 | Hosono et al. | |
| 7,385,224 B2 | 6/2008 | Ishii et al. | |
| 7,402,506 B2 | 7/2008 | Levy et al. | |
| 7,411,209 B2 | 8/2008 | Endo et al. | |
| 7,453,065 B2 | 11/2008 | Saito et al. | |
| 7,453,087 B2 | 11/2008 | Iwasaki | |
| 7,462,862 B2 | 12/2008 | Hoffman et al. | |
| 7,468,304 B2 | 12/2008 | Kaji et al. | |
| 7,501,293 B2 | 3/2009 | Ito et al. | |
| 7,674,650 B2 | 3/2010 | Akimoto et al. | |
| 7,732,819 B2 | 6/2010 | Akimoto et al. | |
| 8,362,538 B2 | 1/2013 | Koyama et al. | |
| 2001/0046027 A1 | 11/2001 | Tai et al. | |
| 2002/0056838 A1 | 5/2002 | Ogawa | |
| 2002/0087900 A1* | 7/2002 | Homewood et al. | 713/320 |
| 2002/0132454 A1 | 9/2002 | Ohtsu et al. | |
| 2002/0162038 A1* | 10/2002 | Bullman et al. | 713/323 |
| 2003/0189401 A1 | 10/2003 | Kido et al. | |
| 2003/0218222 A1 | 11/2003 | Wager, III et al. | |
| 2004/0038446 A1 | 2/2004 | Takeda et al. | |
| 2004/0127038 A1 | 7/2004 | Carcia et al. | |
| 2004/0158750 A1* | 8/2004 | Syed et al. | 713/320 |
| 2005/0017302 A1 | 1/2005 | Hoffman | |
| 2005/0199959 A1 | 9/2005 | Chiang et al. | |
| 2006/0035452 A1 | 2/2006 | Carcia et al. | |
| 2006/0043377 A1 | 3/2006 | Hoffman et al. | |
| 2006/0091793 A1 | 5/2006 | Baude et al. | |
| 2006/0108529 A1 | 5/2006 | Saito et al. | |
| 2006/0108636 A1 | 5/2006 | Sano et al. | |
| 2006/0110867 A1 | 5/2006 | Yabuta et al. | |
| 2006/0113536 A1 | 6/2006 | Kumomi et al. | |
| 2006/0113539 A1 | 6/2006 | Sano et al. | |
| 2006/0113549 A1 | 6/2006 | Den et al. | |
| 2006/0113565 A1 | 6/2006 | Abe et al. | |
| 2006/0169973 A1 | 8/2006 | Isa et al. | |
| 2006/0170111 A1 | 8/2006 | Isa et al. | |
| 2006/0197092 A1 | 9/2006 | Hoffman et al. | |
| 2006/0208977 A1 | 9/2006 | Kimura | |
| 2006/0228974 A1 | 10/2006 | Thelss et al. | |
| 2006/0231882 A1 | 10/2006 | Kim et al. | |
| 2006/0238135 A1 | 10/2006 | Kimura | |
| 2006/0244107 A1 | 11/2006 | Sugihara et al. | |
| 2006/0284171 A1 | 12/2006 | Levy et al. | |
| 2006/0284172 A1 | 12/2006 | Ishii | |
| 2006/0292777 A1 | 12/2006 | Dunbar | |
| 2007/0024187 A1 | 2/2007 | Shin et al. | |
| 2007/0046191 A1 | 3/2007 | Saito | |
| 2007/0052025 A1 | 3/2007 | Yabuta | |
| 2007/0054507 A1 | 3/2007 | Kaji et al. | |
| 2007/0090365 A1 | 4/2007 | Hayashi et al. | |
| 2007/0108446 A1 | 5/2007 | Akimoto | |
| 2007/0152217 A1 | 7/2007 | Lai et al. | |
| 2007/0172591 A1 | 7/2007 | Seo et al. | |
| 2007/0187678 A1 | 8/2007 | Hirao et al. | |
| 2007/0187760 A1 | 8/2007 | Furuta et al. | |
| 2007/0194379 A1 | 8/2007 | Hosono et al. | |
| 2007/0252928 A1 | 11/2007 | Ito et al. | |
| 2007/0260794 A1* | 11/2007 | Ashish et al. | 710/267 |
| 2007/0272922 A1 | 11/2007 | Kim et al. | |
| 2007/0287296 A1 | 12/2007 | Chang | |
| 2008/0006877 A1 | 1/2008 | Mardilovich et al. | |
| 2008/0038882 A1 | 2/2008 | Takechi et al. | |
| 2008/0038929 A1 | 2/2008 | Chang | |
| 2008/0050595 A1 | 2/2008 | Nakagawara et al. | |
| 2008/0073653 A1 | 3/2008 | Iwasaki | |
| 2008/0083950 A1 | 4/2008 | Pan et al. | |
| 2008/0106191 A1 | 5/2008 | Kawase | |
| 2008/0128689 A1 | 6/2008 | Lee et al. | |
| 2008/0129195 A1 | 6/2008 | Ishizaki et al. | |
| 2008/0166834 A1 | 7/2008 | Kim et al. | |
| 2008/0182358 A1 | 7/2008 | Cowdery-Corvan et al. | |
| 2008/0224133 A1 | 9/2008 | Park et al. | |
| 2008/0254569 A1 | 10/2008 | Hoffman et al. | |
| 2008/0258139 A1 | 10/2008 | Ito et al. | |
| 2008/0258140 A1 | 10/2008 | Lee et al. | |
| 2008/0258141 A1 | 10/2008 | Park et al. | |
| 2008/0258143 A1 | 10/2008 | Kim et al. | |
| 2008/0296568 A1 | 12/2008 | Ryu et al. | |
| 2009/0068773 A1 | 3/2009 | Lai et al. | |
| 2009/0073325 A1 | 3/2009 | Kuwabara et al. | |
| 2009/0114910 A1 | 5/2009 | Chang | |
| 2009/0134399 A1 | 5/2009 | Sakakura et al. | |
| 2009/0152506 A1 | 6/2009 | Umeda et al. | |
| 2009/0152541 A1 | 6/2009 | Maekawa et al. | |
| 2009/0278122 A1 | 11/2009 | Hosono et al. | |
| 2009/0280600 A1 | 11/2009 | Hosono et al. | |
| 2010/0065844 A1 | 3/2010 | Tokunaga | |
| 2010/0070742 A1* | 3/2010 | Dowling | 712/225 |
| 2010/0092800 A1 | 4/2010 | Itagaki et al. | |
| 2010/0109002 A1 | 5/2010 | Itagaki et al. | |
| 2010/0148171 A1 | 6/2010 | Hayashi et al. | |
| 2012/0079303 A1* | 3/2012 | Madduri | 713/324 |
| 2012/0268164 A1 | 10/2012 | Kobayashi et al. | |
| 2012/0274355 A1 | 11/2012 | Nishijima | |
| 2012/0294067 A1 | 11/2012 | Kobayashi et al. | |
| 2012/0294096 A1 | 11/2012 | Nishijima | |
| 2013/0080812 A1* | 3/2013 | Shirota et al. | 713/324 |

FOREIGN PATENT DOCUMENTS

| | | |
|---|---|---|
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 06-275697 A | 9/1994 |
| JP | 08-264794 A | 10/1996 |
| JP | 10-301659 A | 11/1998 |
| JP | 11-505377 A | 5/1999 |
| JP | 2000-044236 A | 2/2000 |
| JP | 2000-150900 A | 5/2000 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| WO | 2004/114391 A1 | 12/2004 |

OTHER PUBLICATIONS

Asaoka, Y et al., "29.1: Polarizer-Free Reflective LCD Combined With Ultra Low-Power Driving Technology," SID Digest '09 : SID International Symposium Digest of Technical Papers, 2009, pp. 395-398.

Chern, H et al., "An Analytical Model for the Above-Threshold Characteristics of Polysilicon Thin-Film Transistors," IEEE Transactions on Electron Devices, Jul. 1, 1995, vol. 42, No. 7, pp. 1240-1246.

Cho, D et al., "21.2: Al and Sn-Doped Zinc Indium Oxide Thin Film Transistors for AMOLED Back-Plane," SID Digest '09 : SID International Symposium Digest of Technical Papers, May 31, 2009, pp. 280-283.

Clark, S et al., "First Principles Methods Using CASTEP," Zeitschrift fur Kristallographie, 2005, vol. 220, pp. 567-570.

Coates. D et al., Optical Studies of the Amorphous Liquid-Cholesteric Liquid Crystal Transition: The "Blue Phase," Physics Letters, Sep. 10, 1973, vol. 45A, No. 2, pp. 115-116.

(56) References Cited

OTHER PUBLICATIONS

Costello, M et al., "Electron Microscopy of a Cholesteric Liquid Crystal and Its Blue Phase," Phys. Rev. A (Physical Review. A), May 1, 1984, vol. 29, No. 5, pp. 2957-2959.

Dembo, H et al., "RFCPUS on Glass and Plastic Substrates Fabricated by TFT Transfer Technology," IEDM 05: Technical Digest of International Electron Devices Meeting, Dec. 5, 2005, pp. 1067-1069.

Fortunato, E et al., "Wide-Bandgap High-Mobility ZnO Thin-Film Transistors Produced at Room Temperature," Appl. Phys. Lett. (Applied Physics Letters), Sep. 27, 2004, vol. 85, No. 13, pp. 2541-2543.

Fung, T et al., "2-D Numerical Simulation of High Performance Amorphous In—Ga—Zn—O TFTs for Flat Panel Displays," AM-FPD '08 Digest of Technical Papers, Jul. 2, 2008, pp. 251-252, The Japan Society of Applied Physics.

Godo, H et al., "P-9: Numerical Analysis on Temperature Dependence of Characteristics of Amorphous In—Ga—Zn—Oxide TFT," SID Digest '09 : SID International Symposium Digest of Technical Papers, May 31, 2009, pp. 1110-1112.

Godo, H et al., "Temperature Dependence of Characteristics and Electronic Structure for Amorphous In—Ga—Zn—Oxide TFT," AM-FPD '09 Digest of Technical Papers, Jul. 1, 2009, pp. 41-44.

Hayashi, R et al., "42.1: Invited Paper: Improved Amorphous In—Ga—Zn—O TFTs," SID Digest '08 : SID International Symposium Digest of Technical Papers, May 20, 2008, vol. 39, pp. 621-624.

Hirao, T et al., "Novel Top-Gate Zinc Oxide Thin-Film Transistors (ZnO TFTs) for AMLCDS," Journal of the SID , 2007, vol. 15, No. 1, pp. 17-22.

Hosono, H et al., "Working hypothesis to explore novel wide band gap electrically conducting amorphous oxides and examples," J. Non-Cryst. Solids (Journal of Non-Crystalline Solids), 1996, vol. 198-200, pp. 165-169.

Hosono, H, "68.3: Invited Paper:Transparent Amorphous Oxide Semiconductors for High Performance TFT," SID Digest '07 : SID International Symposium Digest of Technical Papers, 2007, vol. 38, pp. 1830-1833.

Hsieh, H et al., "P-29: Modeling of Amorphous Oxide Semiconductor Thin Film Transistors and Subgap Density of States," SID Digest '08 : SID International Symposium Digest of Technical Papers, 2008, vol. 39, pp. 1277-1280.

Ikeda, T et al., "Full-Functional System Liquid Crystal Display Using CG-Silicon Technology," SID Digest '04 : SID International Symposium Digest of Technical Papers, 2004, vol. 35, pp. 860-863.

Janotti, A et al., "Native Point Defects in ZnO," Phys. Rev. B (Physical Review. B), 2007, vol. 76, No. 16, pp. 165202-1-165202-22.

Janotti, A et al., "Oxygen Vacancies in ZnO," Appl. Phys. Lett. (Applied Physics Letters), 2005, vol. 87, pp. 122102-1-122102-3.

Jeong, J et al., "3.1: Distinguished Paper: 12.1-Inch WXGA AMOLED Display Driven by Indium—Gallium—Zinc Oxide TFTs Array," SID Digest '08 : SID International Symposium Digest of Technical Papers, May 20, 2008, vol. 39, No. 1, pp. 1-4.

Jin, D et al., "65.2: Distinguished Paper:World-Largest (6.5") Flexible Full Color Top Emission AMOLED Display on Plastic Film and Its Bending Properties," SID Digest '09 : SID International Symposium Digest of Technical Papers, May 31, 2009, pp. 983-985.

Kanno, H et al., "White Stacked Electrophosphorecent Organic Light-Emitting Devices Employing MoO3 as a Charge-Generation Layer," Adv. Mater. (Advanced Materials), 2006, vol. 18, No. 3, pp. 339-342.

Kikuchi, H et al., "39.1: Invited Paper: Optically Isotropic Nano-Structured Liquid Crystal Composites for Display Applications," SID Digest '09 : SID International Symposium Digest of Technical Papers, May 31, 2009, pp. 578-581.

Kikuchi, H et al., "62.2: Invited Paper: Fast Electro-Optical Switching in Polymer-Stabilized Liquid Crystalline Blue Phases for Display Application," SID Digest '07 : SID International Symposium Digest of Technical Papers, 2007, vol. 38, pp. 1737-1740.

Kikuchi, H et al., "Polymer-Stabilized Liquid Crystal Blue Phases," Nature Materials, Sep. 1, 2002, vol. 1, pp. 64-68.

Kim, S et al., "High-Performance oxide thin film transistors passivated by various gas plasmas," The Electrochemical Society, 214th ECS Meeting, 2008, No. 2317, 1 page.

Kimizuka, N et al., "Spinel,YbFe2O4, and Yb2Fe3O7 Types of Structures for Compounds in the In2O3 and Sc2O3—A2O3—BO Systems [A; Fe, Ga, or Al; B: Mg, Mn, Fe, Ni, Cu,or Zn] at Temperatures Over 1000° C.," Journal of Solid State Chemistry, 1985, vol. 60, pp. 382-384.

Kimizuka, N et al., "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3—ZnGa2O4—ZnO System," Journal of Solid State Chemistry, Apr. 1, 1995, vol. 116, No. 1, pp. 170-178.

Kitzerow, H et al., "Observation of Blue Phases in Chiral Networks," Liquid Crystals, 1993, vol. 14, No. 3, pp. 911-916.

Kurokawa, Y et al., "UHF RFCPUS on Flexible and Glass Substrates for Secure RFID Systems," Journal of Solid-State Circuits , 2008, vol. 43, No. 1, pp. 292-299.

Lany, S et al., "Dopability, Intrinsic Conductivity, and Nonstoichiometry of Transparent Conducting Oxides," Phys. Rev. Lett. (Physical Review Letters), Jan. 26, 2007, vol. 98, pp. 045501-1-045501-4.

Lee, H et al., "Current Status of, Challenges to, and Perspective View of AM-OLED," IDW '06 : Proceedings of the 13th International Display Workshops, Dec. 7, 2006, pp. 663-666.

Lee, J et al., "World's Largest (15-Inch) XGA AMLCD Panel Using IGZO Oxide TFT," SID Digest '08 : SID International Symposium Digest of Technical Papers, May 20, 2008, vol. 39, pp. 625-628.

Lee, M et al., "15.4: Excellent Performance of Indium—Oxide-Based Thin-Film Transistors by DC Sputtering," SID Digest '09 : SID International Symposium Digest of Technical Papers, May 31, 2009, pp. 191-193.

Li, C et al., "Modulated Structures of Homologous Compounds InMO3(ZnO)m (M=In,Ga; m=Integer) Described by Four-Dimensional Superspace Group," Journal of Solid State Chemistry, 1998, vol. 139, pp. 347-355.

Masuda, S et al., "Transparent thin film transistors using ZnO as an active channel layer and their electrical properties," J. Appl. Phys. (Journal of Applied Physics), Feb. 1, 2003, vol. 93, No. 3, pp. 1624-1630.

Meiboom, S et al., "Theory of the Blue Phase of Cholesteric Liquid Crystals," Phys. Rev. Lett. (Physical Review Letters), May 4, 1981, vol. 46, No. 18, pp. 1216-1219.

Miyasaka, M, "Suftla Flexible Microelectronics on Their Way to Business," SID Digest '07 : SID International Symposium Digest of Technical Papers, 2007, vol. 38, pp. 1673-1676.

Mo, Y et al., "Amorphous Oxide TFT Backplanes for Large Size AMOLED Displays," IDW '08 : Proceedings of the 6th International Display Workshops, Dec. 3, 2008, pp. 581-584.

Nakamura, "Synthesis of Homologous Compound with New Long-Period Structure," NIRIM Newsletter, Mar. 1995, vol. 150, pp. 1-4 with English translation.

Nakamura, M et al., "The phase relations in the In2O3—Ga2ZnO4—ZnO system at 1350° C.," Journal of Solid State Chemistry, Aug. 1, 1991, vol. 93, No. 2, pp. 298-315.

Nomura, K et al., "Thin-Film Transistor Fabricated in Single-Crystalline Transparent Oxide Semiconductor," Science, May 23, 2003, vol. 300, No. 5623, pp. 1269-1272.

Nomura, K et al., "Amorphous Oxide Semiconductors for High-Performance Flexible Thin-Film Transistors," Jpn. J. Appl. Phys. (Japanese Journal of Applied Physics) , 2006, vol. 45, No. 5B, pp. 4303-4308.

Nomura, K et al., "Room-Temperature Fabrication of Transparent Flexible Thin-Film Transistors Using Amorphous Oxide Semiconductors," Nature, Nov. 25, 2004, vol. 432, pp. 488-492.

Nomura, K et al., "Carrier transport in transparent oxide semiconductor with intrinsic structural randomness probed using single-crystalline InGaO3(ZnO)5 films," Appl. Phys. Lett. (Applied Physics Letters) , Sep. 13, 2004, vol. 85, No. 11, pp. 1993-1995.

Nowatari, H et al., "60.2: Intermediate Connector With Suppressed Voltage Loss for White Tandem OLEDs," SID Digest '09 : SID International Symposium Digest of Technical Papers, May 31, 2009, vol. 40, pp. 899-902.

(56) References Cited

OTHER PUBLICATIONS

Oba, F et al., "Defect energetics in ZnO: A hybrid Hartree-Fock density functional study," Phys. Rev. B (Physical Review. B), 2008, vol. 77, pp. 245202-1-245202-6.

Oh, M et al., "Improving the Gate Stability of ZnO Thin-Film Transistors With Aluminum Oxide Dielectric Layers," J. Electrochem. Soc. (Journal of the Electrochemical Society), 2008, vol. 155, No. 12, pp. H1009-H1014.

Ohara, H et al., "21.3: 4.0 In. QVGA AMOLED Display Using In—Ga—Zn—Oxide TFTs With a Novel Passivation Layer," SID Digest '09 : SID International Symposium Digest of Technical Papers, May 31, 2009, pp. 284-287.

Ohara, H et al., "Amorphous In—Ga—Zn—Oxide TFTs with Suppressed Variation for 4.0 inch QVGA AMOLED Display,"AM-FPD '09 Digest of Technical Papers, Jul. 1, 2009, pp. 227-230, The Japan Society of Applied Physics.

Orita, M et al., "Amorphous transparent conductive oxide InGaO3(ZnO)m (m>4):a Zn4s conductor," Philosophical Magazine, 2001, vol. 81, No. 5, pp. 501-515.

Orita, M et al., "Mechanism of Electrical Conductivity of Transparent InGaZnO4," Phys. Rev. B (Physical Review. B), Jan. 15, 2000, vol. 61, No. 3, pp. 1811-1816.

Osada, T et al., "15.2: Development of Driver-Integrated Panel using Amorphous In—Ga—Zn—Oxide TFT," SID Digest '09 : SID International Symposium Digest of Technical Papers, May 31, 2009, pp. 184-187.

Osada, T et al., "Development of Driver-Integrated Panel Using Amorphous In—Ga—Zn—Oxide TFT," AM-FPD '09 Digest of Technical Papers, Jul. 1, 2009, pp. 33-36.

Park, J et al., "Dry etching of ZnO films and plasma-induced damage to optical properties," J. Vac. Sci. Technol. B (Journal of Vacuum Science & Technology B), Mar. 1, 2003, vol. 21, No. 2, pp. 800-803.

Park, J et al., "Improvements in the Device Characteristics of Amorphous Indium Gallium Zinc Oxide Thin-Film Transistors by Ar Plasma Treatment," Appl. Phys. Lett. (Applied Physics Letters), Jun. 26, 2007, vol. 90, No. 26, pp. 262106-1-262106-3.

Park, J et al., "Electronic Transport Properties of Amorphous Indium—Gallium—Zinc Oxide Semiconductor Upon Exposure to Water," Appl. Phys. Lett. (Applied Physics Letters), 2008, vol. 92, pp. 072104-1-072104-3.

Park, J et al., "High performance amorphous oxide thin film transistors with self-aligned top-gate structure," IEDM 09: Technical Digest of International Electron Devices Meeting, Dec. 7, 2009, pp. 191-194.

Park, Sang-Hee et al., "42.3: Transparent ZnO Thin Film Transistor for the Application of High Aperture Ratio Bottom Emission AM-OLED Display," SID Digest '08 : SID International Symposium Digest of Technical Papers, May 20, 2008, vol. 39, pp. 629-632.

Park, J et al., "Amorphous Indium—Gallium—Zinc Oxide TFTs and Their Application for Large Size AMOLED," AM-FPD '08 Digest of Technical Papers, Jul. 2, 2008, pp. 275-278.

Park, S et al., "Challenge to Future Displays: Transparent AM-OLED Driven by Peald Grown ZnO TFT," IMID '07 Digest, 2007, pp. 1249-1252.

Prins, M et al., "A Ferroelectric Transparent Thin-Film Transistor," Appl. Phys. Lett. (Applied Physics Letters), Jun. 17, 1996, vol. 68, No. 25, pp. 3650-3652.

Sakata, J et al., "Development of 4.0-In. AMOLED Display With Driver Circuit Using Amorphous In—Ga—Zn—Oxide TFTs," IDW '09 : Proceedings of the 16th International Display Workshops, 2009, pp. 689-692.

Son, K et al., "42.4L: Late-News Paper: 4 Inch QVGA AMOLED Driven by the Threshold Voltage Controlled Amorphous GIZO (Ga2O3—In2O3—ZnO) TFT," SID Digest '08 : SID International Symposium Digest of Technical Papers, May 20, 2008, vol. 39, pp. 633-636.

Takahashi, M et al., "Theoretical Analysis of IGZO Transparent Amorphous Oxide Semiconductor," IDW '08 : Proceedings of the 15th International Display Workshops, Dec. 3, 2008, pp. 1637-1640.

Tsuda, K et al., "Ultra Low Power Consumption Technologies for Mobile TFT-LCDs," IDW '02 : Proceedings of the 9th International Display Workshops, Dec. 4, 2002, pp. 295-298.

Ueno, K et al., "Field-Effect Transistor on SrTiO3 With Sputtered Al2O3 Gate Insulator," Appl. Phys. Lett. (Applied Physics Letters), Sep. 1, 2003, vol. 83, No. 9, pp. 1755-1757.

Van De Walle, C, "Hydrogen as a Cause of Doping in Zinc Oxide," Phys. Rev. Lett. (Physical Review Letters), Jul. 31, 2000, vol. 85, No. 5, pp. 1012-1015.

Ishii, T et al., "A Poly-Silicon TFT With a Sub-5-nm Thick Channel for Low-Power Gain Cell Memory in Mobile Applications," IEEE Transactions on Electron Devices, Nov. 1, 2004, vol. 51, No. 11, pp. 1805-1810.

Kim, W et al., "An Experimental High-Density DRAM Cell with a Built-in Gain Stage," IEEE Journal of Solid-State Circuits, Aug. 1, 1994, vol. 29, No. 8, pp. 978-981.

Shukuri, S et al., "A Complementary Gain Cell Technology for sub-1 V Supply DRAMs," IEDM 92: Technical Digest of International Electron Devices Meeting, Dec. 13, 1992, pp. 1006-1008.

Shukuri, S et al., "A Semi-Static Complementary Gain Cell Technology for Sub-1 V Supply DRAM's," IEEE Transactions on Electron Devices, Jun. 1, 1994, vol. 41, No. 6, pp. 926-931.

\* cited by examiner

MICROPROCESSOR AND METHOD FOR DRIVING MICROPROCESSOR

BACKGROUND OF THE INVENTION

1. Field of the Invention

The present invention relates to an object, a method, a manufacturing method, a process, a machine, a manufacture, or a composition of matter. The present invention relates to, for example, a semiconductor device, a display device, a light-emitting device, a driving method thereof, or a manufacturing method thereof. In particular, the present invention relates to a microprocessor and a method for driving the microprocessor.

Note that the term "microprocessor" in this specification can be regarded as a synonym for the term "CPU", "MPU", "processor", or the like.

2. Description of the Related Art

With the development of a technique for miniaturizing a semiconductor device, the degree of integration of a microprocessor has been increased year by year. Accordingly, the total amount of leakage current of a variety of semiconductor elements (e.g., a transistor and the like) provided inside the microprocessor has been increased, which has resulted in a large increase in power consumption of the microprocessor. Thus, one of important issues in recent years is to reduce power consumption of a microprocessor.

As one of methods for reducing power consumption of a microprocessor, there is a technique in which a circuit block which does not need to operate in the microprocessor is switched to a low power consumption mode (Patent Document 1). In Patent Document 1, a stop of supply of power supply voltage to a block which does not need to operate is given as the low power consumption mode, for example.

REFERENCE

Patent Document

[Patent Document 1] Japanese Published Patent Application No. H10-301659

SUMMARY OF THE INVENTION

Most of power consumption of a microprocessor is occupied by power consumption of a cache memory (also simply referred to as a cache). Thus, a reduction in power consumption of the cache memory can greatly contribute to a reduction in power consumption of the microprocessor.

However, when supply of power to the cache memory is stopped according to Patent Document 1, data stored in the cache memory is erased. As a result, when supply of power to the cache memory is resumed, a number of cache misses occur and the operation of the microprocessor is significantly delayed.

In view of the above problem, one object of the present invention is to provide a microprocessor capable of switching between a low power consumption mode and a normal operation mode, in which even in the case where supply of power to a cache memory is stopped to reduce power consumption, processing delay due to a cache miss occurs after supply of power to the cache memory is resumed is prevented. Another object is to provide a method for driving the microprocessor, by which occurrence of cache misses after supply of power to the microprocessor is resumed is effectively reduced.

Note that the description of these objects does not impede the existence of other objects. In one embodiment of the present invention, there is no need to achieve all the objects. Other objects will be apparent from and can be derived from the description of the specification, the drawings, the claims, and the like.

The microprocessor includes a processor core, a cache memory, an interrupt controller, and a power supply controller. As at least one of a plurality of memory cell arrays included in the cache memory, a memory cell array composed of a plurality of memory cells is used. In a method for driving the cache memory, at the time of switching to the low power consumption mode, data preferentially used by the processor core after supply of power is resumed (that is, at the time of switching from a low power consumption mode to a normal operation mode) is prefetched to the memory cell array and then supply of power to the cache memory is stopped. Then, at the time of switching to the normal operation mode, needed data is fetched to the processor core from the memory cell array after supply of power to the cache memory is resumed.

Since the memory cell array stores accurate data even when supply of power is stopped, occurrence of cache misses can be reduced in the case where the needed data is fetched to the processor core from the memory cell array after supply of power is resumed.

That is, one embodiment of the present invention is a microprocessor including a processor core which performs arithmetic processing, a cache memory which includes at least one memory cell array including a plurality of memory cells, an interrupt controller in which an interrupt vector is stored, and a power supply controller which controls at least a state of supplying power to the cache memory. The microprocessor has a low power consumption mode and a normal operation mode. In the low power consumption mode, the interrupt vector stored in the interrupt controller is loaded in the processor core, data is prefetched according to the interrupt vector to the memory cell array included in the cache memory, and the power supply controller performs a power supply stopping process at least on the cache memory after the prefetch is completed. In the normal operation mode, the power supply controller performs a power supply resuming process at least on the cache memory, and the data in the memory cell array included in the cache memory is fetched to the processor core after supply of power to the cache memory is resumed.

With a structure of the microprocessor of one embodiment of the present invention, needed data can be fetched to the processor core from the memory cell array in which accurate data is stored, after supply of power is resumed; thus, occurrence of cache misses can be reduced.

In one embodiment of the present invention, a structure may be employed in which a power supply controller which performs the power supply stopping process on the cache memory and the processor core after the prefetch is completed and detects an interrupt event to perform the power supply resuming process on the cache memory and the processor core is used as the power supply controller, so that power consumption of the microprocessor can be further reduced.

In one embodiment of the present invention, the memory cell is preferably any one of a memory cell which includes a transistor formed using an oxide semiconductor material for a semiconductor layer, a memory cell which includes a magnetic tunnel junction element, and a memory cell which includes an element including a system of holding charge in a floating gate, or a combination of any of these.

In one embodiment of the present invention, a proportion of memory cell arrays that are regarded as nonvolatile to all memory cell arrays included in the cache memory may be 50% or higher. Thus, the processor core can store much more data needed after supply of power is resumed in the cache memory, which results in a large reduction in occurrence of cache misses by the processor core after supply of power is resumed.

One embodiment of the present invention is a method for driving a microprocessor including a processor core which performs arithmetic processing, a cache memory which includes at least one memory cell array including a plurality of memory cells, an interrupt controller in which an interrupt vector is stored, and a power supply controller which controls at least a state of supplying power to the cache memory. The microprocessor is switched to a low power consumption mode as a result of the following operation: the interrupt vector stored in the interrupt controller is loaded in the processor core and a prefetch instruction according to the interrupt vector is issued to the cache memory; the processor core outputs a first signal for an instruction to stop supplying power to at least the cache memory to the power supply controller after or during prefetch; and the power supply controller receives the first signal and performs a power supply stopping process at least on the cache memory. The microprocessor is switched to a normal operation mode as a result of the following operation: the interrupt controller outputs a second signal for an instruction to resume supplying power to at least the cache memory to the power supply controller; the power supply controller receives the second signal and resumes supply of power to at least the cache memory; and the interrupt vector stored in the interrupt controller is loaded in the processor core to which power is supplied again and data is fetched to the processor core from the memory cell array included in the cache memory according to the interrupt vector.

With the method for driving a microprocessor of one embodiment of the present invention, data which is accurate and is needed after supply of power is resumed can be fetched to the processor core from the memory cell array after supply of power is resumed; thus, occurrence of cache misses can be reduced.

In the method for driving a microprocessor of one embodiment of the present invention, in the case where the cache memory includes n (n is an integer of 2 or more) memory cell arrays that are regarded as nonvolatile, n interrupt vectors in decreasing order of the frequency of use of all interrupt vectors stored in the interrupt controller may be loaded in the processor core; thus, occurrence of cache misses can be further reduced.

In the driving method of one embodiment of the present invention, the microprocessor may be switched to the low power consumption mode as a result of the following operation: the processor core outputs a first signal for an instruction to stop supplying power to at least the cache memory to the power supply controller; the power supply controller receives the first signal and outputs a signal for an instruction to load the interrupt vector to the cache memory; the cache memory receives the signal for an instruction to load the interrupt vector and loads the interrupt vector from the interrupt controller, so that prefetch is performed according to the interrupt vector; the cache memory outputs a signal indicating the completion of the prefetch to the power supply controller after the prefetch is completed; and the power supply controller receives the signal indicating the completion of the prefetch and stops supplying power to one or both of the cache memory and the processor core.

With the structure of the microprocessor described in this specification, data needed after supply of power is resumed can be stored as accurate data in the memory cell array. Note that the data is preferentially used by the processor core immediately after supply of power is resumed. Further, with the method for driving a microprocessor described in this specification, needed data can be fetched to the processor core from the memory cell array immediately after supply of power is resumed; thus, occurrence of cache misses can be reduced.

DETAILED DESCRIPTION OF THE INVENTION

Figure 1:
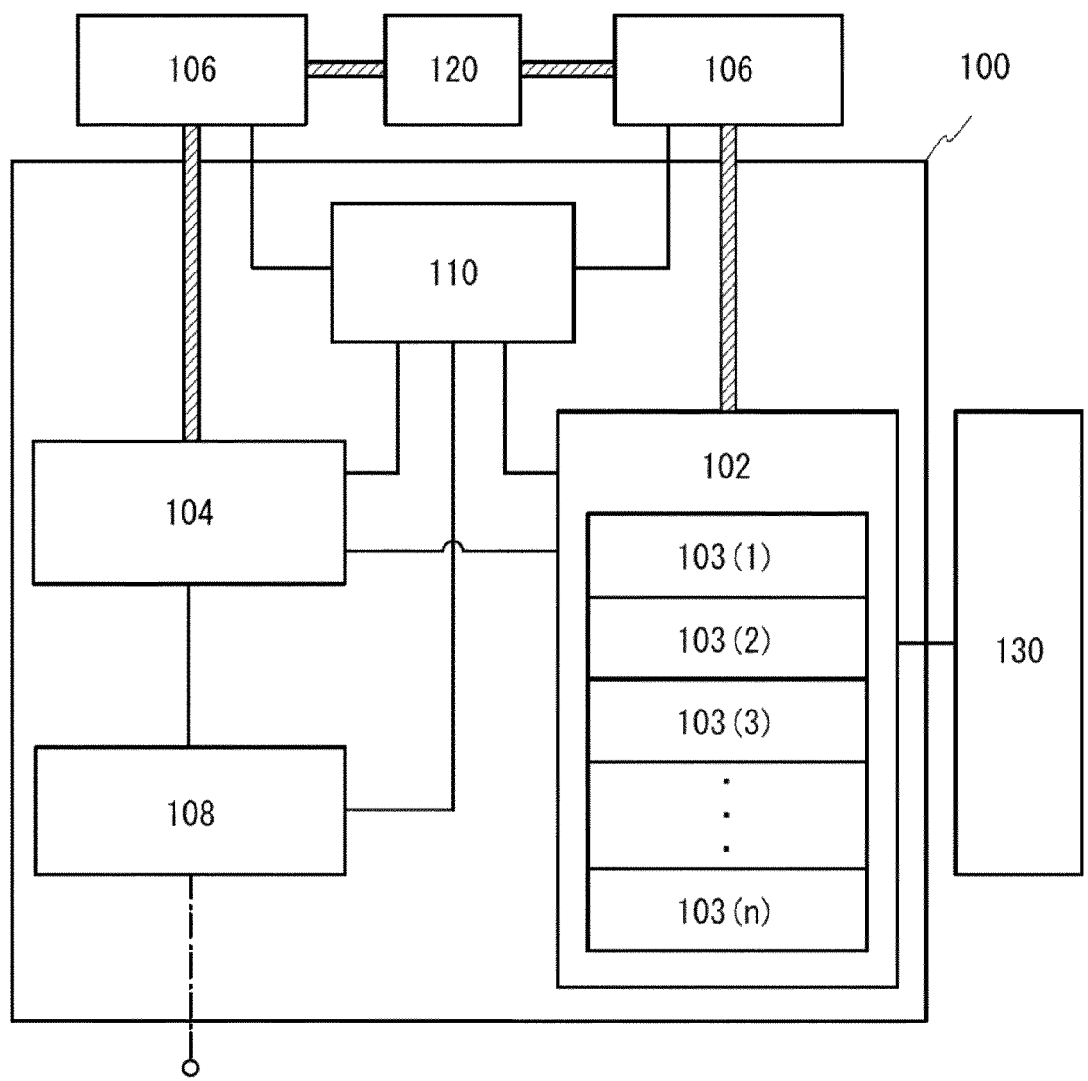
FIG. 1 is a block diagram of a microprocessor of Embodiment 1.

Hereinafter, embodiments of the invention disclosed in this specification will be described with reference to the accompanying drawings. Note that the present invention is not limited to the following description and it will be readily appreciated by those skilled in the art that modes and details can be modified in various ways without departing from the spirit and the scope of the present invention. Thus, the present invention should not be construed as being limited to the description in the following embodiments.

In the following embodiments, the same portions or portions having similar functions are denoted by the same reference numerals in different drawings, and explanation thereof will not be repeated.

Note that the position, size, range, and the like of each component illustrated in the drawings and the like are not accurately represented for easy understanding in some cases. Thus, the disclosed invention is not necessarily limited to the position, size, range, and the like in the drawings and the like.

In this specification and the like, ordinal numbers such as "first", "second", and "third" are used in order to avoid confusion among components, and the terms do not limit the components numerically.

In this specification and the like, the term such as "over" or "below" does not necessarily mean that a component is placed "directly on" or "directly under" another component. For example, the expression "B over A" can mean the case where there is an additional component between A and B.

In this specification and the like, the expression "pair of B sandwiching A" does not necessarily mean B is in direct contact with A. For example, the expression may mean a "pair of B sandwiching A with C provided therebetween" (e.g., B/C/A/C/B).

In this specification and the like, the term "electrically connected" includes the case where components are connected through an "object having any electric function". There is no particular limitation on an "object having any electric function" as long as electric signals can be transmitted and received between components that are connected through the object. Examples of an "object having any electric function" are an electrode and a wiring.

In this specification and the like, the term "instruction" can be replaced with a "signal indicating an instruction". Further, the term "instruct" can be replaced with "output a signal indicating an instruction".

Embodiment 1

In this embodiment, a structure of a microprocessor will be described using a block diagram of FIG. 1, and a method for driving the microprocessor will be described using block diagrams of FIGS. 2A to 2D, FIGS. 3A to 3C, FIGS. 4A to 4D, FIGS. 5A to 5D, FIG. 6, and FIGS. 7A and 7B.

<Structure Example of Microprocessor>

As illustrated in FIG. 1, a microprocessor 100 includes a cache memory 102, a processor core 104, a power supply controller 110, and an interrupt controller 108. The cache memory 102 is electrically connected to a main memory 130 and the power supply controller 110 is electrically connected to switch circuits 106. Power is supplied from a power supply 120 to the cache memory 102 and the processor core 104 through the switch circuits 106. Note that interrupt vectors (also referred to as an address of an interrupt handler) are stored in the interrupt controller 108.

In this specification, each component of the microprocessor (i.e., the cache memory 102, the processor core 104, the power supply controller 110, or the interrupt controller 108) is sometimes referred to as a "block".

In the drawings of this specification, power is supplied to the cache memory 102 and the processor core 104 from the same power supply (the power supply 120); however, power may be supplied from respective power supplies.

The drawings of this specification illustrate the power supply controller 110 and the interrupt controller 108 as if power is not supplied thereto. This is because a state of supplying power to the cache memory 102 and the processor core 104 is easily understood. In practice, power is supplied to the power supply controller 110 and the interrupt controller 108. There is no particular limitation on a power supply source.

In the drawings of this specification, a fine solid line between the components indicates a transmission path of a signal and a shaded thick line between the components indicates a transmission path of power. Note that a bold solid line indicates a state where a signal is transmitted and a hollow thick line, which is not shaded, indicates a state where power is not supplied.

The cache memory 102 is electrically connected to the processor core 104, the power supply controller 110, and the main memory 130. Further, power is supplied to the cache memory 102 from the power supply 120 through the switch circuit 106.

Note that the cache memory 102 includes a plurality of memory cells and each of groups of the memory cells (hereinafter, referred to as a memory cell array 103) stores data. In the microprocessor 100 of this embodiment, the cache memory 102 includes one or more of the memory cell arrays 103 composed of nonvolatile memory cells. The memory cell array 103 composed of nonvolatile memory cells is sometimes referred to as a "nonvolatile memory cell array" in this specification.

In this specification, the term "nonvolatile" means a property of maintaining stored data even when supply of power is interrupted, and the term "volatile" means a property that stored data is instantly erased when supply of power is interrupted.

As the nonvolatile memory cell, for example, any one of a memory cell (hereinafter, also referred to as an OS memory) which includes a transistor (hereinafter, also referred to as an OS transistor) formed using an oxide semiconductor material for a semiconductor layer, a memory cell which includes a magnetic tunnel junction element (hereinafter, also referred to as a magnetoresistive random access memory), and a memory cell which includes an element including a system of holding charge in a floating gate (hereinafter, also referred to as a flash memory), or a combination of any of these can be used.

Then, operation conditions of a cache memory including memory cell arrays each composed of volatile memory cells (a general cache memory) and a cache memory including memory cell arrays, some of which are the nonvolatile memory cell arrays, (a cache memory described in this specification), in the case where supply of power to the cache memories is stopped and supply of power is resumed will be described.

In the general cache memory, even when data having a higher priority among data used after supply of power is resumed (the data having a higher priority is simply referred to as "data"), is prefetched to some of the memory cell arrays, the data stored in the memory cell arrays becomes inaccurate and invalid (for example, data "1" stored in each memory cells of a memory cell array including four memory cells changes to "0" by leakage of charge) in an extremely short time after supply of power to the cache memory is stopped. Thus, a reset operation of data is necessary after supply of power is resumed in the general cache memory. As a result, the prefetched data is reset, so that a cache miss occurs in the case where the data is fetched to the processor core 104 from the cache memory. Thus, data needs to be prefetched again to the cache memory from the main memory (e.g., a dynamic random access memory (DRAM) or a solid state drive (SSD)).

Since the data transmission rate between the cache memory and the main memory is lower than the data transmission rate between the processor core and the cache memory, the processing of the microprocessor might be significantly delayed in the case where data needs to be prefetched from the main memory again as described above.

In contrast, in the cache memory 102 of this embodiment in which some of the memory cell arrays 103 are the above nonvolatile memory cell arrays, data stored in the nonvolatile memory cell array can be stored as accurate data even when supply of power to the cache memory 102 is stopped. As a result, in the case where supply of power to the cache memory 102 is resumed and the data is fetched to the processor core 104, the data can be fetched from the cache memory 102 and occurrence of cache misses can be significantly reduced. Thus, the processing speed of the microprocessor after supply of power to a block to which supply of power has been stopped is resumed can be significantly increased.

Note that it is particularly preferable that an OS memory be used as the above nonvolatile memory cell. The OS memory is nonvolatile owing to an extremely low off-state current (current which flows between a source and a drain when a transistor is in an off state (also referred to as a non-conductive state, an inactive state, or the like)) of an OS transistor, so that performance degradation due to deterioration of a gate insulating film as in the case of a flash memory hardly occurs. Thus, it can be said that the OS memory is advantageous in terms of reliability and the like.

The energy gap of an oxide semiconductor used for a semiconductor layer of the OS transistor is greater than or equal to 3.0 eV, which is much larger than the band gap of silicon (1.1 eV).

The off-resistance of the transistor (resistance between source and drain when the transistor is in an off state) is inversely proportional to the concentration of carriers thermally excited in the semiconductor layer where a channel is formed. Since the band gap of silicon is 1.1 eV even in a state where there is no carrier caused by a donor or an acceptor (i.e., even in the case of an intrinsic semiconductor), the concentration of thermally excited carriers at room temperature (300 K) is approximately $1 \times 10^{11}$ cm$^{-3}$.

On the other hand, in the case of a semiconductor whose band gap is 3.2 eV (an oxide semiconductor, here), the concentration of thermally excited carriers is approximately $1 \times 10^{-7}$ cm$^{-3}$. When the electron mobility is the same, the resistivity is inversely proportional to the carrier concentration; thus, the resistivity of the semiconductor whose band gap is 3.2 eV is 18 orders of magnitude higher than that of silicon.

Such a transistor in which an oxide semiconductor having a wide band gap is used for the semiconductor layer (OS transistor) can realize an extremely small off-state current.

To describe an "extremely small off-state current" of an OS transistor, results of measuring the off-state current of a transistor including a highly purified oxide semiconductor will be described.

<Measurement of Off-State Current of OS Transistor>

Figure 18:
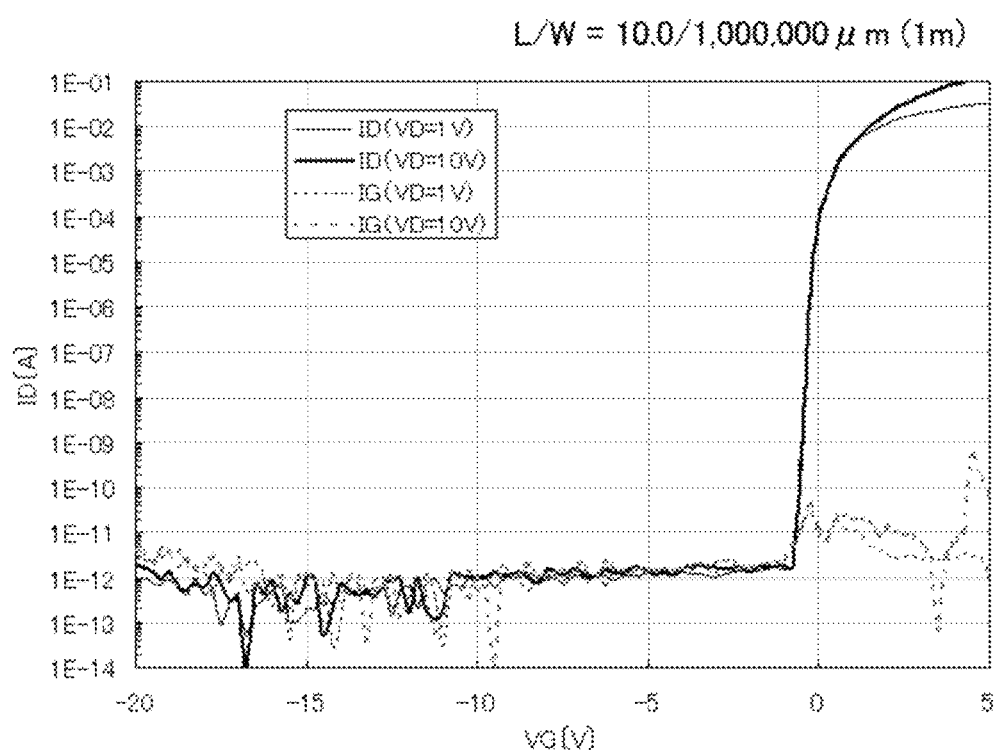
FIG. 18 is a graph showing characteristics of a transistor including an oxide semiconductor.

First, a transistor with a channel width W of 1 m, which is sufficiently wide, was prepared in consideration of the very small off current of a transistor including a highly purified oxide semiconductor, and the off current was measured. FIG. 18 shows the results obtained by measurement of the off-state current of the transistor with a channel width W of 1 m. In FIG. 18, the horizontal axis shows gate voltage $V_G$ and the vertical axis shows drain current $I_D$. In the case where the drain voltage $V_D$ is +1 V or +10 V and the gate voltage $V_G$ is in a range of −5 V to −20 V, the off-state current of the transistor is found to be lower than or equal to $1 \times 10^{-12}$ A which is the detection limit. Moreover, it is found that the off current of the transistor (per unit channel width (1 μm)) is smaller than or equal to 1 aA ($1 \times 10^{-18}$ A).

Next, the results obtained by more accurately measuring the off-state current of the transistor including a highly purified oxide semiconductor will be described. As described above, the off-state current of the transistor including a highly purified oxide semiconductor is found to be lower than or equal to $1 \times 10^{-12}$ A which is the detection limit of the measurement equipment. Here, the results obtained measuring more accurate off current (the value smaller than or equal to the detection limit of measurement equipment in the above measurement), with the use of an element for characteristic evaluation, will be described.

First, the element for characteristic evaluation which was used in a method for measuring current will be described with reference to FIG. 19.

Figure 19:
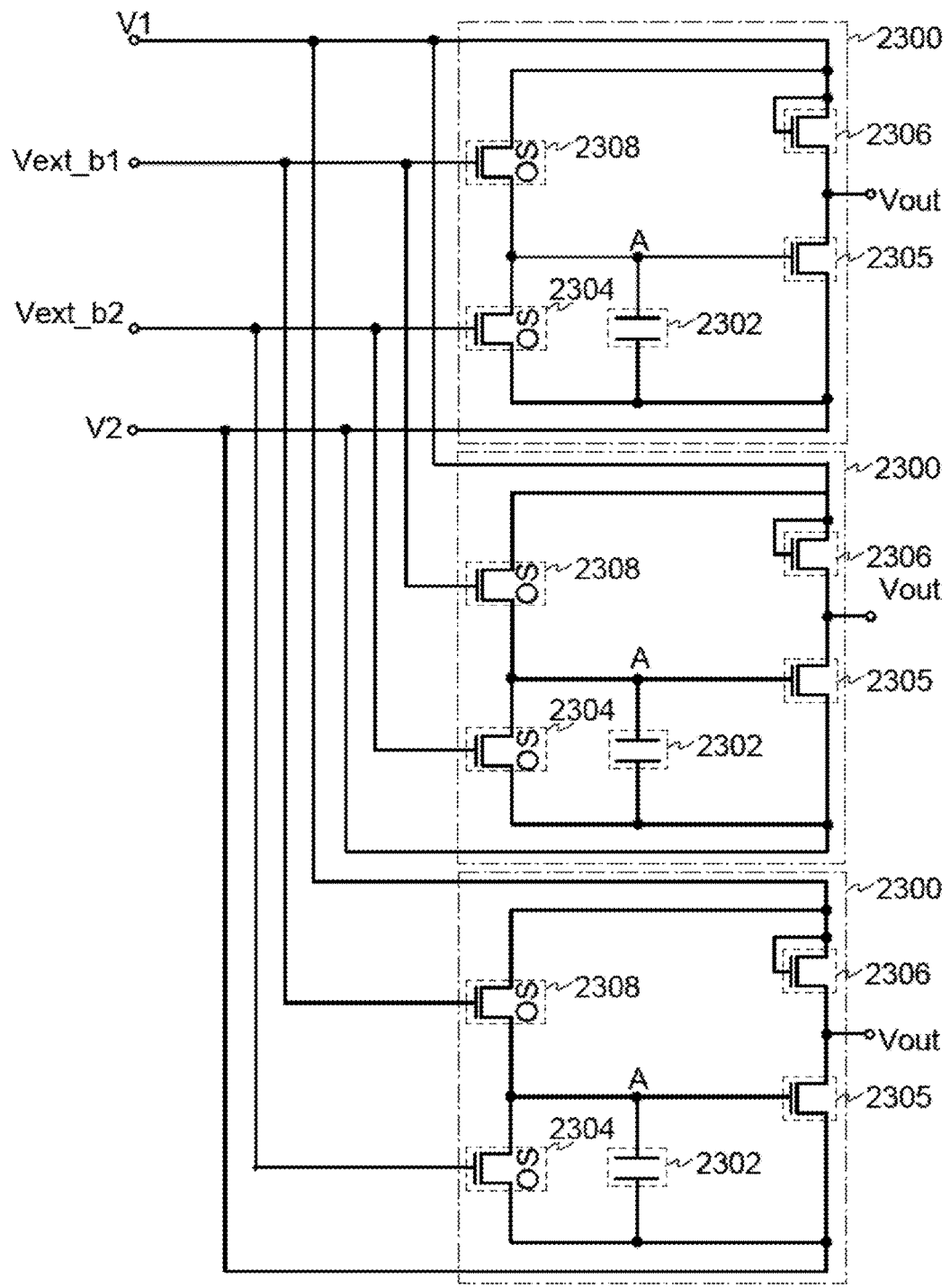
FIG. 19 is a circuit diagram of an element for evaluating characteristics of a transistor including an oxide semiconductor.

In the element for characteristic evaluation in FIG. 19, three measurement systems 2300 are connected in parallel. The measurement system 2300 includes a capacitor 2302, a transistor 2304, a transistor 2305, a transistor 2306, and a transistor 2308. As the transistor 2304, the transistor 2305, the transistor 2306, and the transistor 2308, transistors including a highly purified oxide semiconductor are employed.

In the measurement system 2300, one of a source terminal and a drain terminal of the transistor 2304, one of terminals of the capacitor 2302, and one of a source terminal and a drain terminal of the transistor 2305 are electrically connected to a power source (for supplying $V_2$). The other of the source terminal and the drain terminal of the transistor 2304, one of a source terminal and a drain terminal of the transistor 2308, the other of the terminals of the capacitor 2302, and a gate terminal of the transistor 2305 are electrically connected to one another. The other of the source terminal and the drain terminal of the transistor 2308, one of a source terminal and a drain terminal of the transistor 2306, and a gate terminal of the transistor 2306 are electrically connected to a power source (for supplying $V_1$). The other of the source terminal and the drain terminal of the transistor 2305 and the other of the source terminal and the drain terminal of the transistor 2306 are electrically connected to each other and electrically connected to an output terminal.

A potential $V_{ext\_b2}$ for controlling an on state and an off state of the transistor 2304 is supplied to the gate terminal of the transistor 2304. A potential $V_{ext\_b1}$ for controlling an on state and an off state of the transistor 2308 is supplied to the gate terminal of the transistor 2308. A potential $V_{out}$ is output from the output terminal.

Next, a method for measuring current with the use of the element for characteristic evaluation will be described.

First, an initial period in which a potential difference is applied to measure the off current will be described briefly. In the initial period, the potential $V_{ext\_b1}$ for turning on the transistor 2308 is input into the gate terminal of the transistor 2308. Accordingly, a potential $V_1$ is supplied to a node A that is electrically connected to the other of the source terminal and the drain terminal of the transistor 2304 (that is, the node electrically connected to one of the source terminal and the drain terminal of the transistor 2308, the other of the terminals of the capacitor 2302, and the gate terminal of the transistor 2305). Here, the potential $V_1$ is, for example, a high potential. The transistor 2304 is off.

After that, the potential $V_{ext\_b1}$ for turning off the transistor 2308 is input into the gate terminal of the transistor 2308 so that the transistor 2308 is turned off. After the transistor 2308 is turned off, the potential $V_1$ is set to low. Still, the transistor 2304 is off. The potential $V_2$ is the same potential as $V_1$. Thus, the initial period is completed. In a state where the initial period is completed, a potential difference is generated between the node A and one of the source terminal and the drain terminal of the transistor 2304, and also, a potential difference is generated between the node A and the other of the source terminal and the drain terminal of the transistor 2308. Thus, charge flows slightly through the transistor 2304 and the transistor 2308. That is, the off-state current flows.

Next, a measurement period of the off-state current is briefly described. In the measurement period, the potential (that is, $V_2$) of one of the source terminal and the drain terminal of the transistor 2304 and the potential (that is, $V_1$) of the other of the source terminal and the drain terminal of the transistor 2308 are set to low and fixed. On the other hand, the potential of the node A is not fixed (the node A is in a floating state) in the measurement period. Accordingly, electric charge flows through the transistor 2304, and the amount of electric charge stored in the node A is changed as time passes. The potential of the node A is changed depending on the change in the amount of electric charge stored in the node A. That is to say, the output potential $V_{out}$ of the output terminal also varies.

Figure 20:
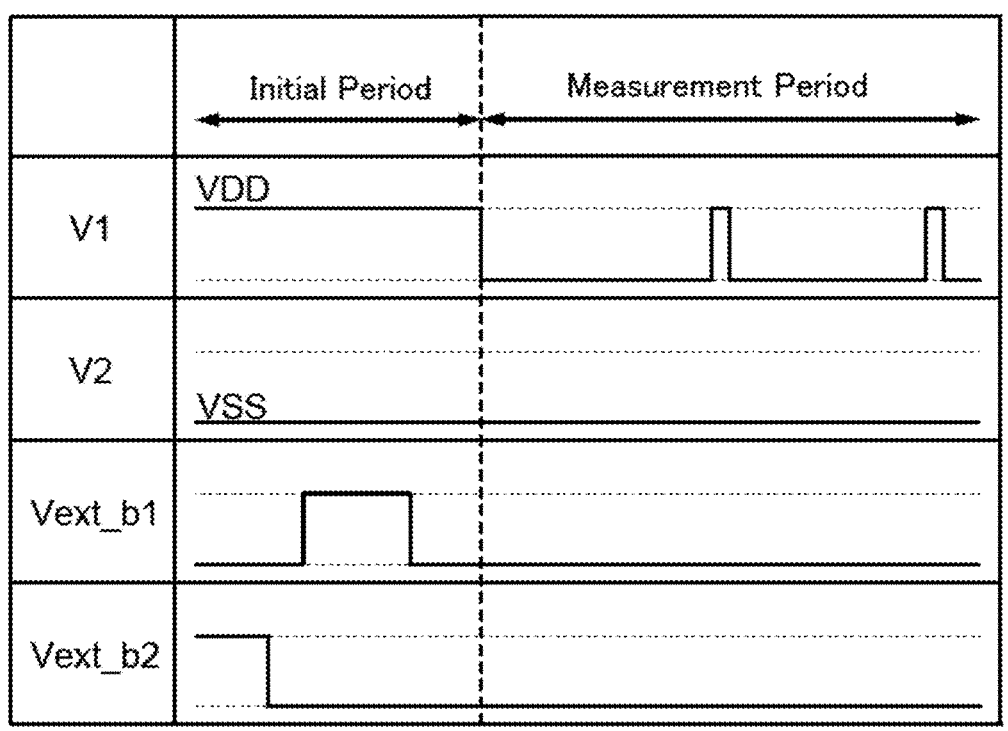
FIG. 20 is a timing chart of an element for evaluating characteristics of a transistor including an oxide semiconductor.

FIG. 20 shows details (a timing chart) of the relationship among potentials in the initial period in which the potential difference is generated and those in the subsequent measurement period.

In the initial period, first, the potential $V_{ext\_b2}$ is set to a potential (high potential) at which the transistor 2304 is turned on. Thus, the potential of the node A comes to be $V_2$, that is, a low potential ($V_{SS}$). Note that a low potential ($V_{SS}$) is not necessarily supplied to the node A. After that, the potential $V_{ext\_b2}$ is set to a potential (low potential) at which the transistor 2304 is turned off, whereby the transistor 2304 is turned off. Next, the potential $V_{ext\_b1}$ is set to a potential (a high potential) with which the transistor 2308 is turned on. Thus, the potential of the node A comes to be $V_1$, that is, a high potential ($V_{DD}$). After that, the potential $V_{ext\_b1}$ is set to a potential at which the transistor 2308 is turned off. Accordingly, the node A is brought into a floating state and the initial period is completed.

In the following measurement period, the potential $V_1$ and the potential $V_2$ are individually set to potentials at which electric charge flows to or from the node A. Here, the potential $V_1$ and the potential $V_2$ are low potentials ($V_{SS}$). Note that at the timing of measuring the output potential $V_{out}$, it is necessary to operate an output circuit; thus, $V_1$ is set to a high potential ($V_{DD}$) temporarily in some cases. The period in which $V_1$ is a high potential ($V_{DD}$) is set to be short so that the measurement is not influenced.

When the potential difference is generated and the measurement period is started as described above, the amount of electric charge stored in the node A is changed as time passes, which changes the potential of the node A. This means that the potential of a gate terminal of the transistor 2305 varies and thus, the output potential $V_{out}$ of the output terminal also varies with the lapse of time.

A method for calculating the off-state current on the basis of the obtained output potential $V_{out}$ is described below.

The relation between the potential $V_A$ of the node A and the output potential $V_{out}$ is obtained in advance before the off current is calculated. With this, the potential $V_A$ of the node A can be obtained using the output potential $V_{out}$. In accordance with the above relationship, the potential $V_A$ of the node A can be expressed as a function of the output potential $V_{out}$ by the following Formula (1).

[FORMULA 1]

$$V_A = F(V\text{out}) \tag{1}$$

Electric charge $Q_A$ of the node A can be expressed by the following Formula (2) with the use of the potential $V_A$ of the node A, capacitance $C_A$ connected to the node A, and a constant (const). Here, the capacitance $C_A$ connected to the node A is the sum of the capacitance of the capacitor 2302 and other capacitance.

[FORMULA 2]

$$Q_A = C_A V_A + \text{const} \tag{2}$$

Since a current $I_A$ of the node A is obtained by differentiating charge flowing to the node A (or charge flowing from the node A) with respect to time, the current $I_A$ of the node A is expressed by the following Formula (3).

[FORMULA 3]

$$I_A = \frac{\Delta Q_A}{\Delta t} = \frac{C_A \Delta F(V\text{out})}{\Delta t} \tag{3}$$

In this manner, the current $I_A$ of the node A can be obtained from the capacitance $C_A$ connected to the node A and the output potential $V_{out}$ of the output terminal.

In accordance with the above method, it is possible to measure leakage current (off-state current) which flows between a source and a drain of a transistor in an off state.

In this embodiment, the transistor 2304, the transistor 2305, the transistor 2306, and the transistor 2308 each of which has a channel length L of 10 μm and a channel width W of 50 μm were manufactured using a highly purified oxide semiconductor. In the measurement systems 2300 which are arranged in parallel, the capacitances of the capacitors 2302 were 100 fF, 1 pF, and 3 pF.

Note that in the measurement of this embodiment, $V_{DD}$ was 5 V and $V_{SS}$ was 0 V. In the measurement period, $V_{out}$ was measured while the potential $V_1$ was basically set to $V_{SS}$ and changed to $V_{DD}$ for 100 msec at intervals of 10 sec to 300 sec. Further, Δt which was used in calculation of current I which flows through the element was about 30000 sec.

Figure 21:
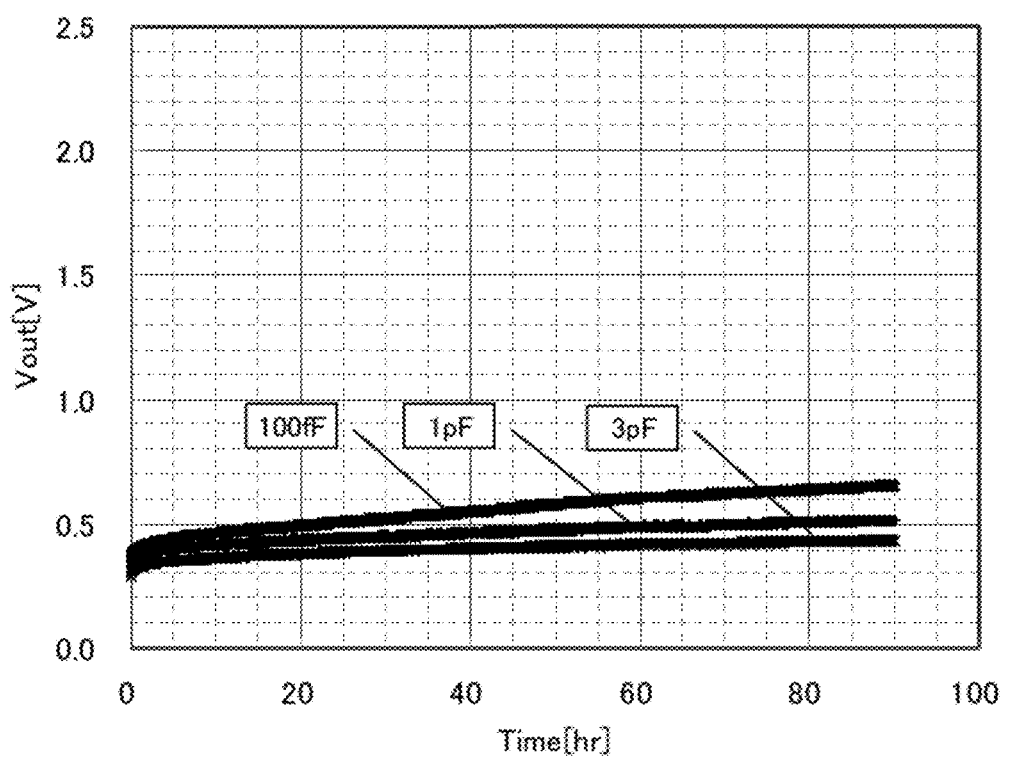
FIG. 21 is a graph showing characteristics of a transistor including an oxide semiconductor.

FIG. 21 shows the relation between the output potential $V_{out}$ and elapsed time Time in the current measurement. As is seen in FIG. 21, the output potential $V_{out}$ changes over time.

Figure 22:
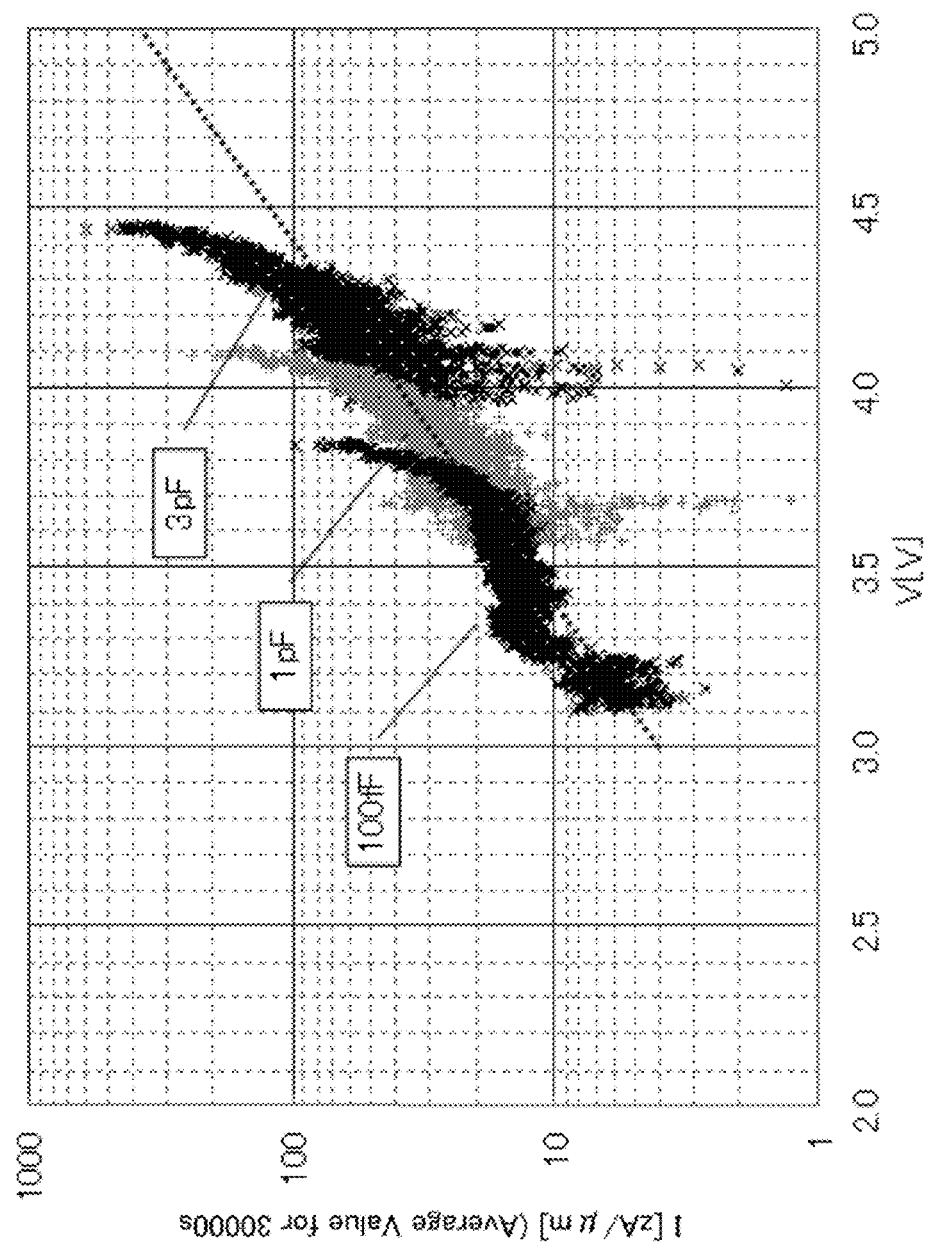
FIG. 22 is a graph showing characteristics of a transistor including an oxide semiconductor.

FIG. 22 shows the off-state current at room temperature (25° C.) calculated in the above current measurement. Note that FIG. 22 shows the relation between source-drain voltage V and off-state current I. According to FIG. 22, the off-state current is approximately 40 zA/μm under the condition that the source-drain voltage is 4 V. In addition, the off-state current is less than or equal to 10 zA/μm under the condition where the source-drain voltage is 3.1 V. Note that 1 zA represents $1 \times 10^{-21}$ A.

Figure 23:
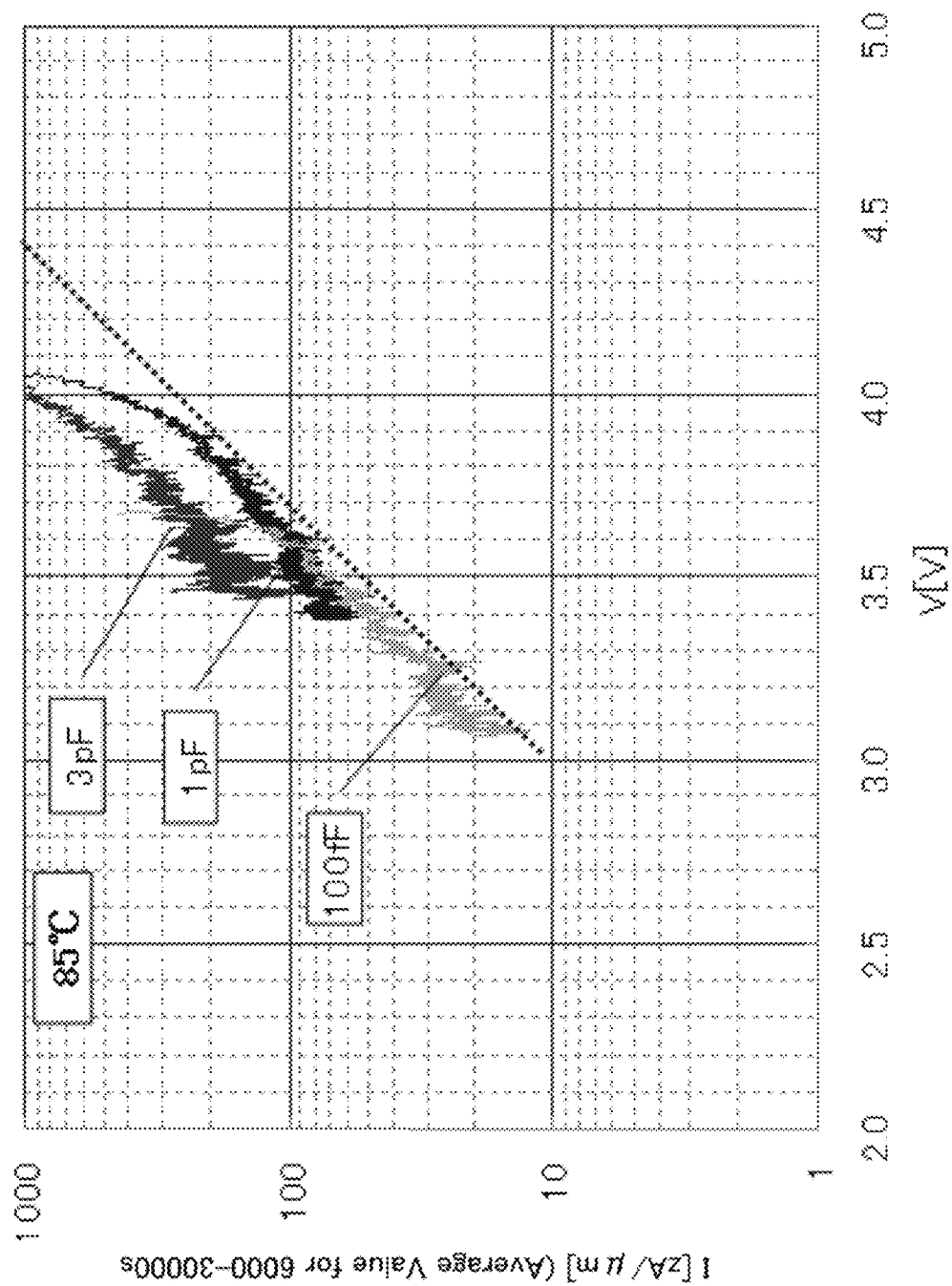
FIG. 23 is a graph showing characteristics of a transistor including an oxide semiconductor.

Further, FIG. 23 shows the off-state current at the time when the temperature is 85° C. calculated in the above current measurement. FIG. 23 shows the relation between the source-drain voltage V and the off-state current I at the time when the temperature is 85° C. According to FIG. 23, the off-state current is less than or equal to 100 zA/μm when the source-drain voltage is 3.1 V.

In this manner, it is confirmed that the off-state current is sufficiently small in a transistor including a highly purified oxide semiconductor. Note that specific examples of a structure of the OS transistor and a method for forming the OS transistor will be described in Embodiment 3. Further, specific examples of a structure of the OS memory and a method for forming the OS memory will be described in Embodiment 4 and Embodiment 5.

In the microprocessor 100, the processor core 104 is electrically connected to the cache memory 102, the power supply controller 110, and the interrupt controller 108. Further, power is supplied to the processor core 104 from the power supply 120 through the switch circuit 106.

The switch circuits 106 are electrically connected to the power supply controller 110 and the power supply 120. The switch circuits 106 determine a state of supplying power (stop or resume supplying power) to a block which does not need to operate (the cache memory 102, the processor core 104, or the like in this embodiment) according to a signal (signal for an instruction to stop or resume supplying power to the block which does not need to operate) output from the power supply controller 110. There is no particular limitation on the structure (or the configuration or the circuit configuration) of the switch circuits 106 as long as the switch circuits 106 can switch between supplying and not supplying power to (or conduction and non-conduction of) the block which does not need to operate. For example, a switching element including a transistor or the like can be used. Note that although the switch circuits 106 are provided outside the microprocessor 100 in this embodiment, the switch circuits 106 may be provided inside the microprocessor 100. For example, the switch circuits 106 may be incorporated into the power supply controller 110. In that case, an operation of transmitting a signal to the switch circuits 106 from the power supply controller 110 is not always necessary to stop or resume supplying power to the cache memory 102 or the processor core 104. Thus, processes of stopping and resuming supply of power to the cache memory or the processor core can be referred to as a "power supply stopping process" and a "power supply resuming process", respectively, of the power supply controller 110.

Alternatively, the switch circuit 106 may be provided between the cache memory 102 and the power supply controller 110 or between the processor core 104 and the power supply controller 110, or may be incorporated into the cache memory 102 or the processor core 104. Note that there is no particular limitation on a configuration of a circuit used as the switch circuit 106, and a known technique can be used.

The interrupt controller 108 is electrically connected to the processor core 104 and the power supply controller 110. An instruction to resume supplying power to the cache memory 102 is first input into the interrupt controller 108. Note that in the drawings of this specification, a dashed-dotted line connected to the interrupt controller 108 indicates a path (wiring) through which the instruction to resume supplying power to the interrupt controller 108 is transmitted from outside the microprocessor 100.

The power supply controller 110 is electrically connected to the cache memory 102, the processor core 104, the switch circuits 106, and the interrupt controller 108.

Although the power supply stopping process (and the power supply resuming process) is performed on both of the cache memory 102 and the processor core 104 in this specification, the process may be performed at least on the cache memory 102. This is because since most of power consumption of the microprocessor 100 is occupied by power consumption of the cache memory 102, power consumption of the microprocessor 100 can be significantly reduced only by the process performed on the cache memory 102.

<Method for Driving Microprocessor>

An example of a driving method (driving sequence) of the microprocessor 100 will be described using the block diagrams of FIGS. 2A to 2D, FIGS. 3A to 3C, FIGS. 4A to 4D, FIGS. 5A to 5D, FIG. 6, and FIGS. 7A and 7B. The following description of the method for driving the microprocessor 100 has two parts: a description of a process for stopping an operation of a block which does not need to operate (hereinafter, sometimes referred to as a "switching process to a low power consumption mode"); and a description of a subsequent process for resuming the operation of the stopped block so that the processor core can go back to a normal operation (or a state where a cache miss due to the stop of the operation of the block which does not need to operate does not occur) (hereinafter, the process is sometimes referred to as a "switching process to a normal operation mode").

<Description of Switching Process to Low Power Consumption Mode>

Figure 2A:
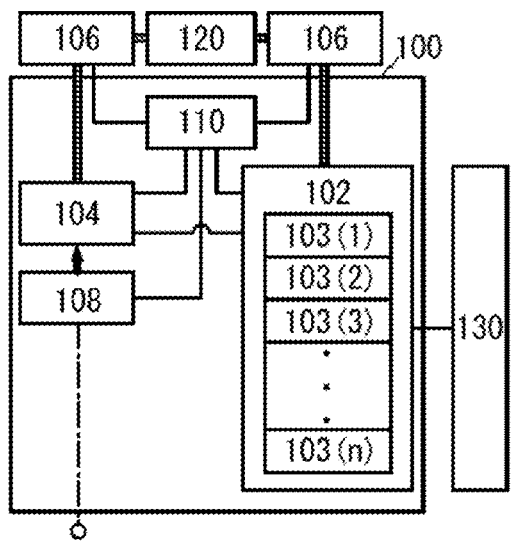
FIGS. 2A to 2D illustrate an operation of a microprocessor of Embodiment 1.

When an instruction to switch to the low power consumption mode is issued, first, the processor core 104 loads one or more of the interrupt vectors stored in the interrupt controller 108 (see FIG. 2A).

The above "instruction to switch to the low power consumption mode is issued" includes, specifically, the case where a task scheduler, which is a program executed by the processor, decides that there is no task that can be executed immediately and executes a program for sending a power supply stopping signal, for example.

Note that the interrupt vectors which are loaded in the processor core 104 are interrupt vectors whose frequencies of use (or frequencies of occurrence) are high of the plurality of interrupt vectors stored in the interrupt controller 108. The number of the interrupt vectors which are loaded in the processor core 104 may be smaller than or equal to the number of nonvolatile memory cell arrays. For example, in the case where 100 arrays of the memory cell arrays 103 are nonvolatile memory cell arrays, the interrupt vectors with the highest frequency of use may be loaded or 10 or 100 interrupt vectors (data) in decreasing order of the frequency of use may be loaded in the processor core 104. The number of the interrupt vectors which are loaded in the processor core 104 may be determined as appropriate by practitioners.

The microprocessor 100 seems to operate continuously on the long time scale, for example, on the second time scale. However, there is a large amount of time that the microprocessor 100 does not operate (for example, time when the task scheduler, which is a program executed by the processor, decides that there is no task that can be executed immediately, as described above) on the short time scale, for example, on the nanosecond time scale or on the microsecond time scale. Thus, in the case where supply of power to a block which does not need to operate is stopped for a moment that the microprocessor 100 does not operate (for example, for a very short period of time such as from a few nanoseconds to a few milliseconds) and then is resumed, the frequency of use of interrupt vectors involved in the operation naturally increases. As a result, those interrupt vectors are preferentially stored in the nonvolatile memory cell arrays of the cache memory 102. Accordingly, the processor core 104 loads the interrupt vectors after supply of power is resumed to start processing; thus, occurrence of cache misses at the time of switching to the normal operation mode can be reduced.

Then, a prefetch instruction according to the interrupt vectors loaded from the interrupt controller 108 is issued from the processor core 104 to the cache memory 102, whereby the prefetch is performed. In the prefetch, data read from the main memory 130 by the prefetch instruction is stored in the nonvolatile memory cell arrays (memory cell arrays composed of nonvolatile memory cells) of the memory cell arrays 103 included in the cache memory 102.

Figure 2B:
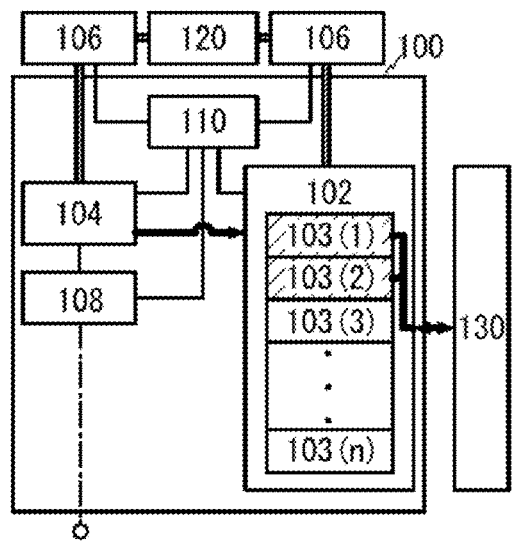

Thus, data preferentially used by the processor core after supply of power is resumed (that is, at the time of switching from the low power consumption mode to the normal operation mode) is prefetched to the nonvolatile memory cell arrays included in the cache memory 102, as illustrated in FIG. 2B.

In FIG. 2B, memory cell arrays hatched with single lines (a first memory cell array 103(1) and a second memory cell array 103(2)) of the memory cell arrays 103 are illustrated as nonvolatile memory cell arrays. The same can be said for the other drawings of this specification. Note that since the numbers of the nonvolatile memory cell arrays and the volatile memory cell arrays are easily changed depending on the use and the like, the nonvolatile memory cell array and the volatile memory cell array are denoted by the same reference numerals in the drawings and the like of this specification. However, it is needless to say that the nonvolatile memory cell array and the volatile memory cell array are different from each other.

The larger the number of the nonvolatile memory cell arrays is, the larger the number of the interrupt vectors (i.e., interrupt vectors having higher priorities of interrupt vectors used after supply of power is resumed) that can be prefetched to the cache memory 102 is. Thus, the proportion of the nonvolatile memory cell arrays to all memory cell arrays 103 is preferably 50% or higher, further preferably 80% or higher, still further preferably 100%.

Note that in the above description, all interrupt vectors used for the prefetch are loaded from the interrupt controller 108 and then data is prefetched to the cache memory 102 according to the vectors. However, data may be prefetched by repeating the following operation: one or some of the interrupt vectors are loaded from the interrupt controller and data is prefetched to the cache memory 102 according to the vectors.

Figure 2C:
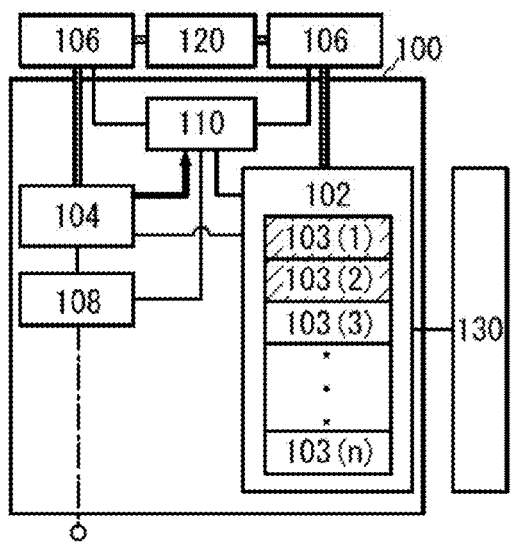

Next, the processor core 104 outputs a first signal (signal for an instruction to stop supplying power to the block which does not need to operate) to the power supply controller 110 (see FIG. 2C).

Figure 2D:
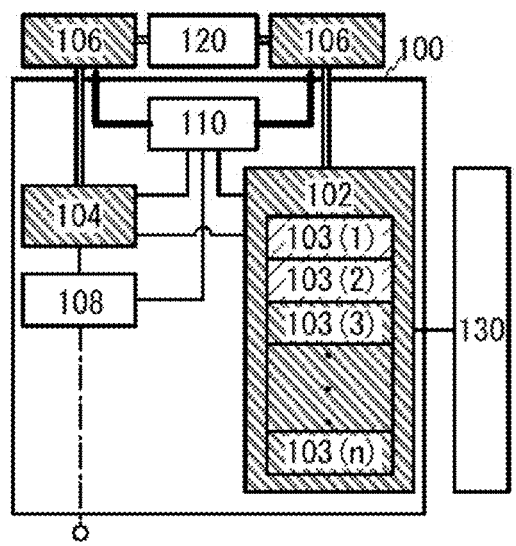

After that, a signal for turning off the switch circuits 106 is output from the power supply controller 110 and thus supply of power from the power supply 120 to the cache memory 102 and supply of power from the power supply 120 to the processor core 104 are stopped (see FIG. 2D). Note that blocks hatched with double lines such as the cache memory 102, the processor core 104, and the like in FIG. 2D are in an off state (also referred to as a non-conductive state or an inactive state). The same can be said for the other drawings of this specification.

In this embodiment, a step of prefetching data to the cache memory 102 (FIG. 2B) and a step of outputting the first signal to the power supply controller 110 (FIG. 2C) are described as different steps using different drawings. However, the first signal may be output to the power supply controller 110 at the same time as data is prefetched.

In that case, the prefetch needs to be completed before supply of power to the cache memory 102 is stopped. For that reason, for example, the signal for turning off the switch circuits 106 needs to be output from the power supply controller 110 after a signal indicating the completion of the prefetch is input from the cache memory 102 into the power supply controller 110.

Figure 3A:
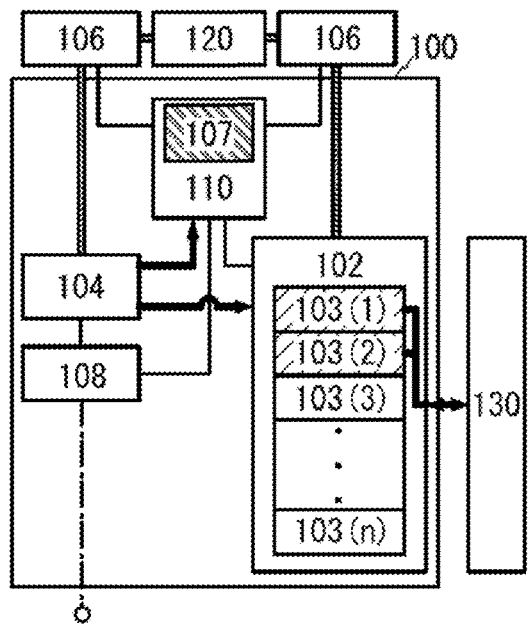
FIGS. 3A to 3C illustrate an operation of a microprocessor of Embodiment 1.
Figure 3B:
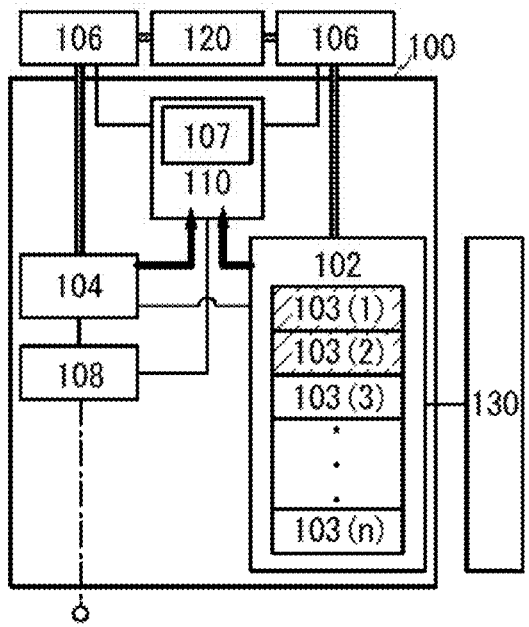
Figure 3C:
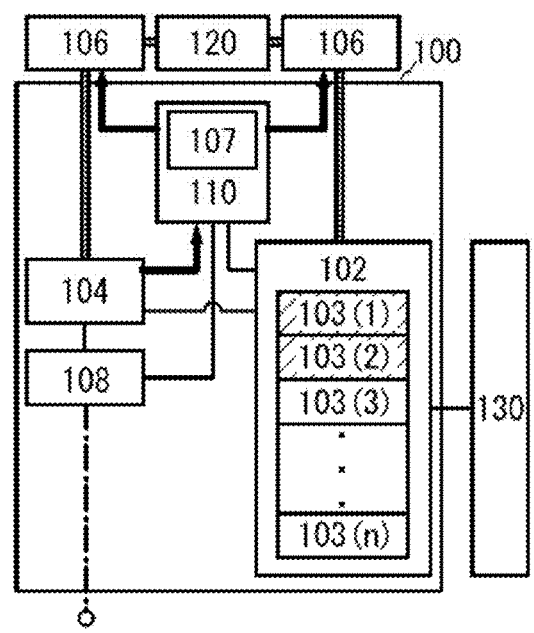

For example, the power supply controller 110 may include a circuit (referred to as a standby circuit 107) which does not let the signal for turning off the switch circuits 106 be output until a predetermined signal is input. In the microprocessor 100 including such a power supply controller 110, the prefetch instruction is executed as illustrated in FIG. 3A when the first signal and the prefetch instruction are issued from the processor core 104, but the signal for turning off the switch circuits 106 is not output from the power supply controller 110. Then, the signal indicating the completion of the prefetch is output from the cache memory 102 to the standby circuit 107 when the prefetch to the cache memory 102 is completed, as illustrated in FIG. 3B. Accordingly, the power supply controller 110 outputs the signal for turning off the switch circuits 106 to the switch circuits 106 as illustrated in FIG. 3C, so that supply of power to the cache memory 102 and the processor core 104 does not stop before the prefetch to the cache memory 102 is completed.

Figure 4A:
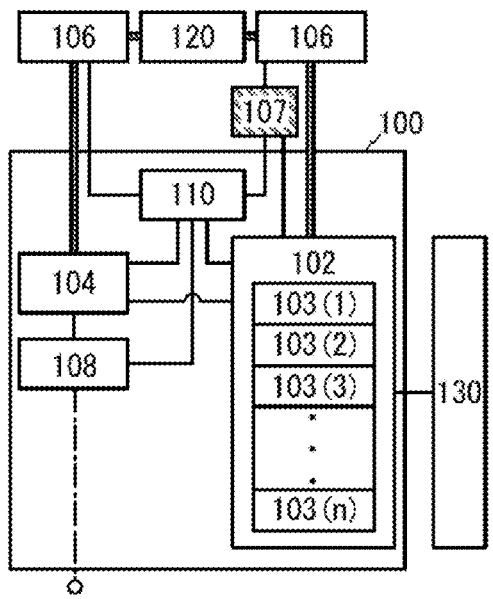
FIGS. 4A to 4D illustrate an operation of a microprocessor of Embodiment 1.
Figure 4B:
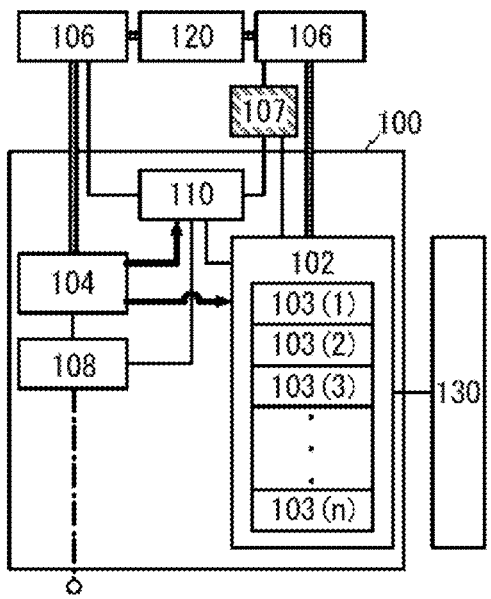
Figure 4C:
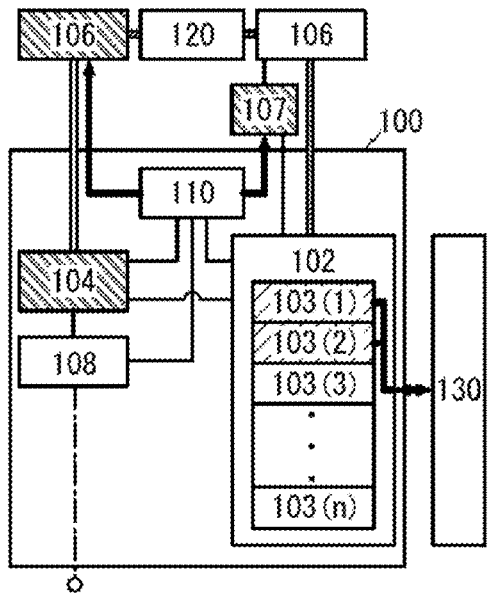
Figure 4D:
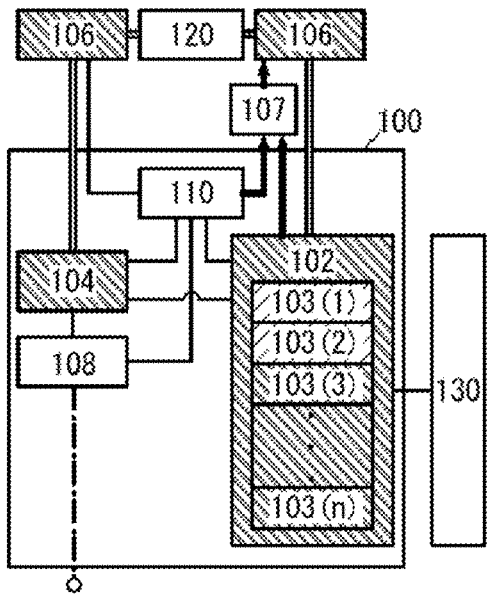

Alternatively, the standby circuit 107 may be provided between the power supply controller 110 and the switch circuit 106 which is connected to the cache memory 102. For example, with the structure in which the standby circuit 107 is provided between the power supply controller 110 and the switch circuit 106 which is connected to the cache memory 102 as illustrated in FIG. 4A, when the first signal and the prefetch instruction are issued from the processor core 104 (see FIG. 4B), a second signal is output from the power supply controller 110 to the switch circuit 106 which is connected to the processor core 104 to stop supplying power to the processor core 104 even when the prefetch is performed (see FIG. 4C). Then, supply of power to the cache memory 102 is stopped after the prefetch to the cache memory 102 is completed (see FIG. 4D). When states of supplying power to the cache memory 102 and the processor core 104 are individually controlled as described above, power consumption of the microprocessor 100 can be further reduced. Note that although the standby circuit 107 is provided outside the microprocessor 100 in FIGS. 4A to 4D, the standby circuit 107 may be provided inside the microprocessor 100.

Although the structure and the process with which supply of power to both of the cache memory 102 and the processor core 104 is stopped are described above, a structure and a process with which only supply of power to the cache memory 102 is stopped (e.g., a structure without the switch circuit 106 connected to the processor core 104) may be employed. This is because since most of power consumption of the microprocessor 100 is occupied by power consumption of the cache memory 102, power consumption of the microprocessor 100 can be significantly reduced with such a structure and process.

Through the above process, supply of power to the block which does not need to operate (in this embodiment, mainly the cache memory 102 and the processor core 104) can be stopped in a state where data preferentially used by the processor core after supply of power is resumed (that is, at the time of switching from the low power consumption mode to the normal operation mode) is prefetched to the cache memory 102. The microprocessor 100 seems to operate continuously on the long time scale, for example, on the second time scale. However, there is time that the microprocessor 100 does not operate on the short time scale, for example, on the nanosecond time scale or on the microsecond time scale. Thus, when supply of power to the cache memory 102 is stopped for every moment (e.g., a very short period of time such as from a few nanoseconds to a few milliseconds) that the microprocessor 100 does not operate and then is resumed as appropriate, power consumption of the microprocessor 100 can be significantly reduced.

<Description of Switching Process to Normal Operation Mode>

Next, a driving method during the switching process to the normal operation mode will be described.

Figure 5A:
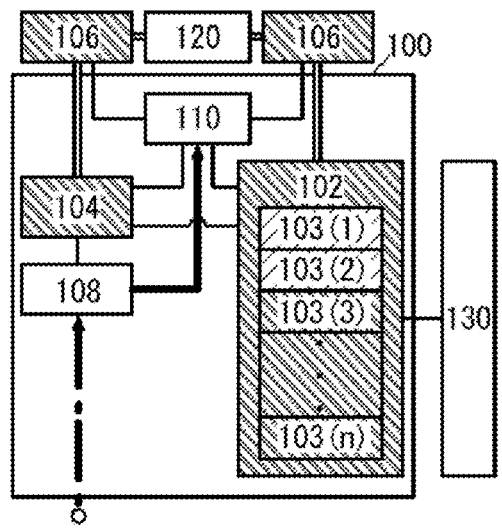
FIGS. 5A to 5D illustrate an operation of a microprocessor of Embodiment 1.
Figure 5B:
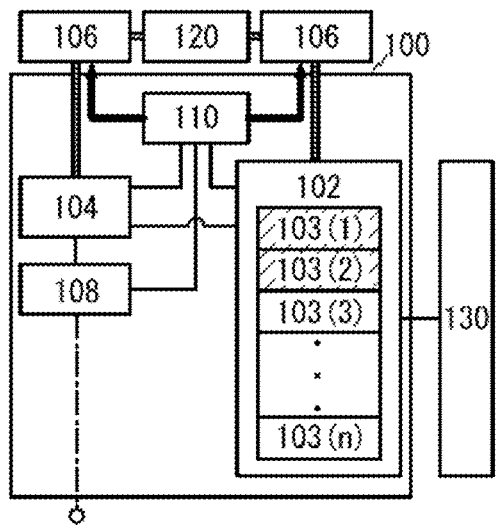

A signal indicating an instruction to switch to the normal operation mode is input into the interrupt controller 108 (or an interrupt event is detected by the interrupt controller 108), and the interrupt controller 108 outputs the second signal (signal for an instruction to resume supplying power to the block to which supply of power has been stopped) to the power supply controller 110 (see FIG. 5A).

The above "instruction to switch to the normal operation mode" includes, specifically, the case where a task scheduler, which is a program executed by the processor, decides that there is a task that can be executed immediately and executes a program for sending a power supply resuming signal, for example.

Next, the power supply controller 110 receives the second signal and then outputs a signal for putting the switch circuits 106 in an on state (also referred to as a conductive state, an active state, or the like) to the switch circuits 106. Thus, power is supplied from the power supply 120 to the cache memory 102 and the processor core 104 (see FIG. 5B).

Figure 5C:
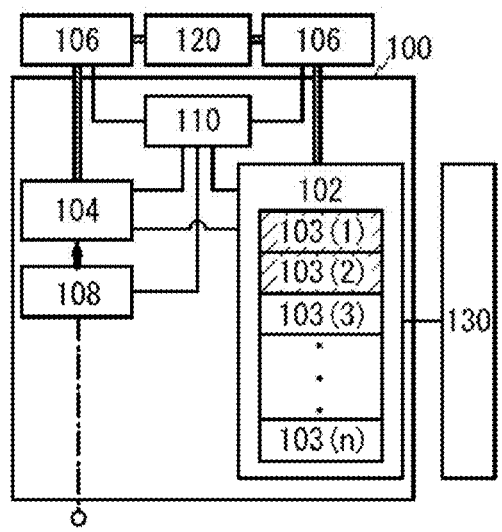
Figure 5D:
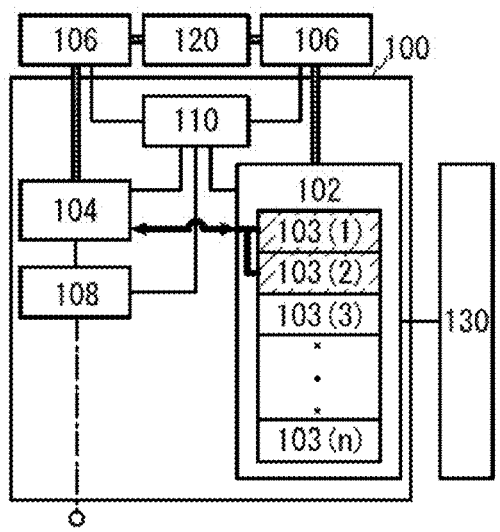

After that, the processor core 104 to which power is resumed to be supplied loads the interrupt vectors stored in the interrupt controller 108 (see FIG. 5C). Note that in this loading, interrupt vectors which store an interrupt handler preferentially used by the processor core after supply of power is resumed are read.

Then, data is fetched to the processor core 104 according to the interrupt vectors loaded from the interrupt controller 108. Note that data preferentially used by the processor core after supply of power is resumed is stored in the nonvolatile memory cell arrays as described in the above <Description of Switching Process to Low Power Consumption Mode>, and the fetch can be performed without a cache miss (in other words, data does not need to be prefetched or is rarely prefetched again from the main memory 130); thus, the processing speed of the microprocessor after supply of power is resumed can be significantly increased (see FIG. 5D).

Through the above process, cache misses caused by the processor core 104 in resuming supply of power to the block to which supply of power has been stopped (in this embodiment, mainly the cache memory 102 and the processor core 104) can be reduced as many as possible (or can be prevented) and thus, the processing speed of the microprocessor 100 can be increased (with almost no delay). Note that a similar process can be performed on the microprocessor including the standby circuit 107 which is illustrated in FIGS. 3A to 3C or FIGS. 4A to 4D. In that case, for the subsequent stopping process, the cache memory 102 needs to output a signal indicating the completion of the process to the standby circuit 107 after the prefetch to the cache memory 102 is completed, so that the standby circuit 107 is turned off.

In the description in this embodiment and the drawings used for the description, the cache memory 102 included in the microprocessor 100 includes the plurality of memory cell arrays 103. However, in some cases, the cache memory 102 is divided into a plurality of regions such as an instruction cache (or a region where a program is temporarily stored), a data cache (or a region where data is temporarily stored), and the like, each of which includes a plurality of memory cell arrays. A structure of a microprocessor 600 illustrated in FIG. 6 in which a cache memory 602 includes an instruction cache 611 having n (n is an integer of 2 or more) memory cell arrays 611a and a data cache 612 having m (m is an integer of 2 or more) memory cell arrays 612a can be given as an example. Although the switch circuits 106 are provided outside the microprocessor 600 in FIG. 6, the switch circuits 106 may be provided inside the microprocessor 600.

Figure 6:
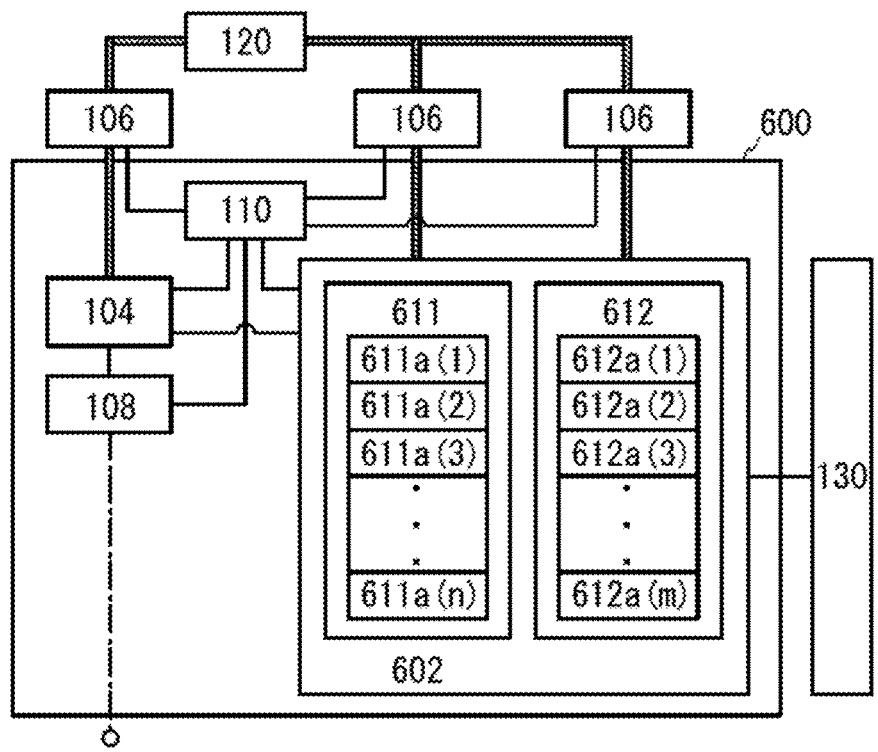
FIG. 6 illustrates an operation of a microprocessor of Embodiment 1.
Figure 7A:
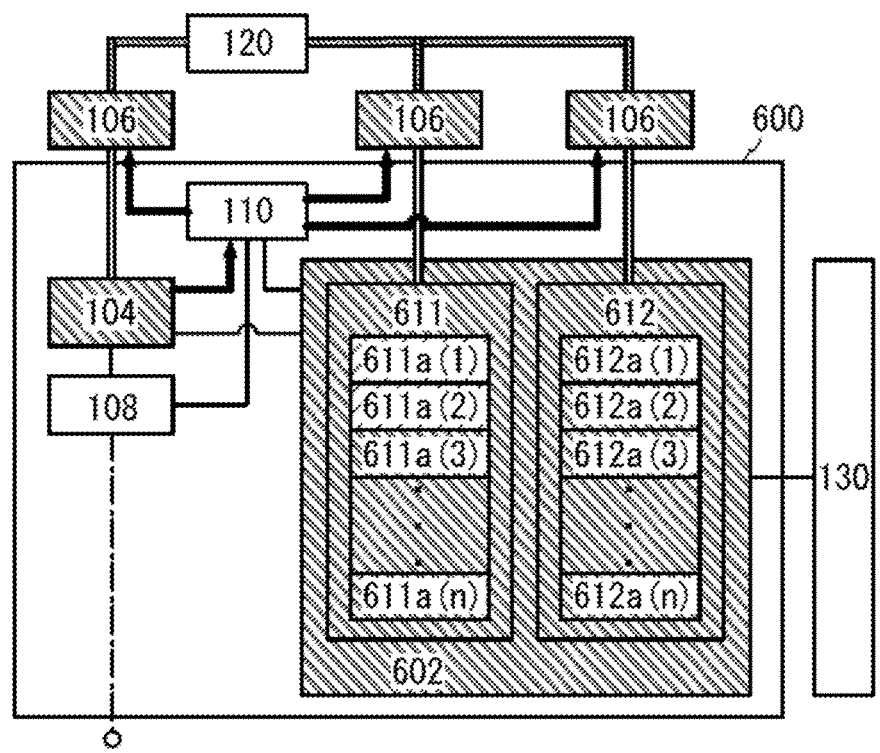
FIGS. 7A and 7B illustrate an operation of a microprocessor of Embodiment 1.
Figure 7B:
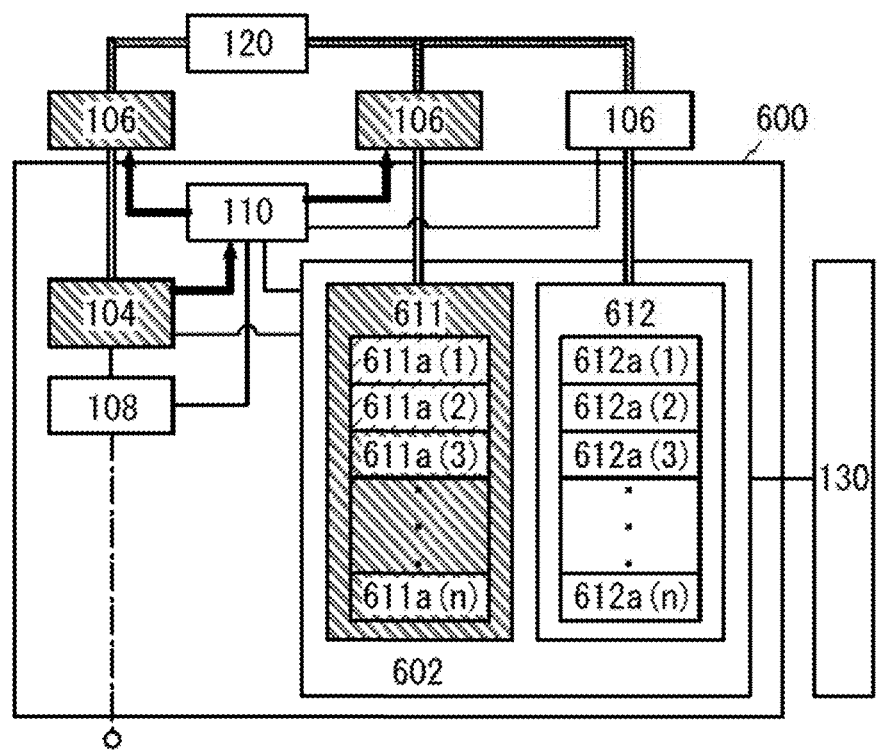

When each region in the cache memory 602 is connected to the switch circuit 106 as illustrated in FIG. 6, for example, supply of power to the instruction cache 611 and the data cache 612 may be stopped so that the operation of the whole cache memory 602 is stopped as illustrated in FIG. 7A, or only supply of power to the instruction cache 611 may be stopped and the data cache 612 may be in an operation state as illustrated in FIG. 7B. As described above, only an unnecessary cache region (cache region to which power does not need to be supplied) can be selectively turned off depending on the use condition of the cache memory 602. Needless to say, the instruction cache 611 and the data cache 612 may be connected to the power supply through one switch circuit 106. The microprocessor 600 illustrated in FIGS. 7A and 7B is different from the above-described microprocessor 100 in that there are two cache regions in the cache memory 602: the instruction cache 611 and the data cache 612. The operation methods (operation processes) of each component are basically similar to those of the microprocessor 100 and the above description can be referred to; thus, the description thereof is omitted here.

Embodiment 2

In this embodiment, a structure of a microprocessor which is partly different from that in Embodiment 1 will be described using a block diagram of FIG. 8. Further, a method for driving the microprocessor will be described using block diagrams of FIGS. 9A to 9D and FIGS. 10A to 10D.

<Structure Example of Microprocessor>

Figure 8:
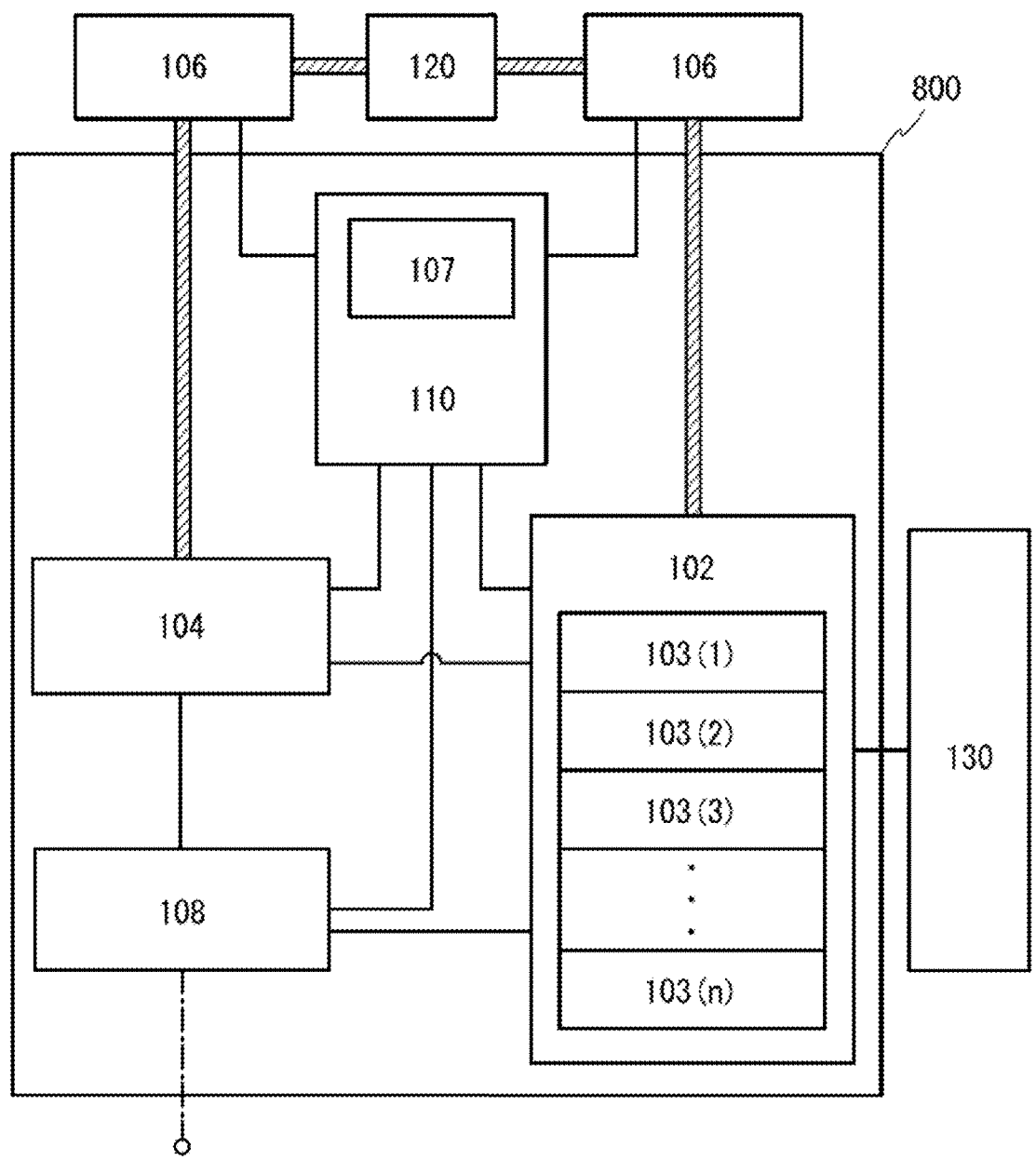
FIG. 8 is a block diagram of a microprocessor of Embodiment 2.

FIG. 8 illustrates a structure of a microprocessor described in this embodiment. A structure of a microprocessor 800 illustrated in FIG. 8 is substantially similar to the structure of the microprocessor illustrated in FIGS. 4A to 4D in Embodiment 1, and is different from that illustrated in FIGS. 4A to 4D in the structure in which the cache memory 102 and the interrupt controller 108 are electrically connected to each other.

Although the switch circuits 106 are provided outside the microprocessor 800 in FIG. 8, the switch circuits 106 may be provided inside the microprocessor 800. Further, although the standby circuit 107 is provided inside the power supply controller 110, the standby circuit 107 may be provided between the power supply controller 110 and the switch circuit 106.

<Method for Driving Microprocessor>

An example of a driving method (driving sequence) of the microprocessor 800 will be described using the block diagrams of FIGS. 9A to 9D and FIGS. 10A to 10D. Note that the following description has two parts as in Embodiment 1: a stopping process and a resuming process.

<Description of Switching Process to Low Power Consumption Mode>

First, when an instruction to stop supplying power to the block which does not need to operate is issued, the processor core 104 outputs the first signal to the power supply controller 110. Since the standby circuit 107 (in an off state) is provided in the power supply controller 110, a signal for turning off the switch circuits 106 is not output from the power supply controller 110. Then, a signal for an instruction to load the interrupt vectors is output from the power supply controller 110 to the cache memory 102 (see FIG. 9A).

Figure 9A:
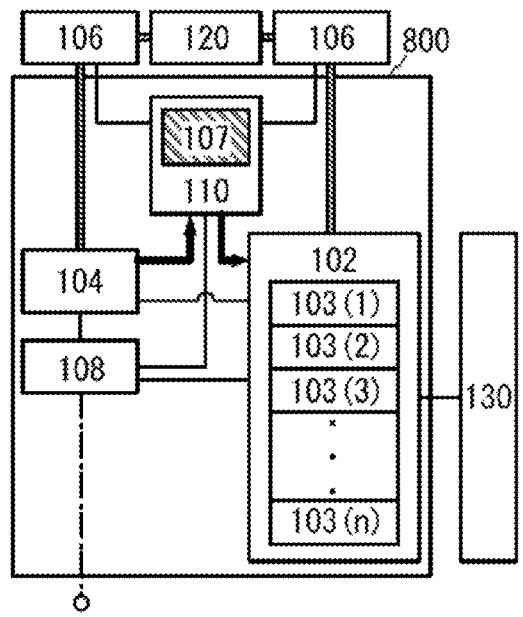
FIGS. 9A to 9D illustrate an operation of a microprocessor of Embodiment 2.
Figure 9B:
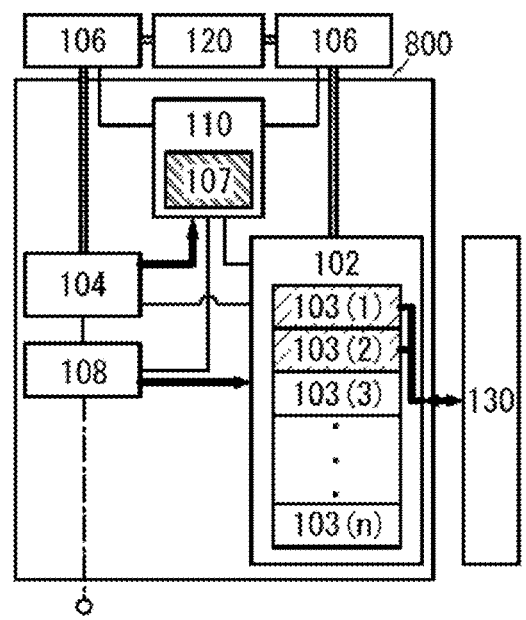

Next, the cache memory 102 receives the signal for an instruction to load the interrupt vectors and loads the interrupt vectors from the interrupt controller 108, and data is prefetched to the cache memory 102 according to the loaded interrupt vectors (see FIG. 9B).

Figure 9C:
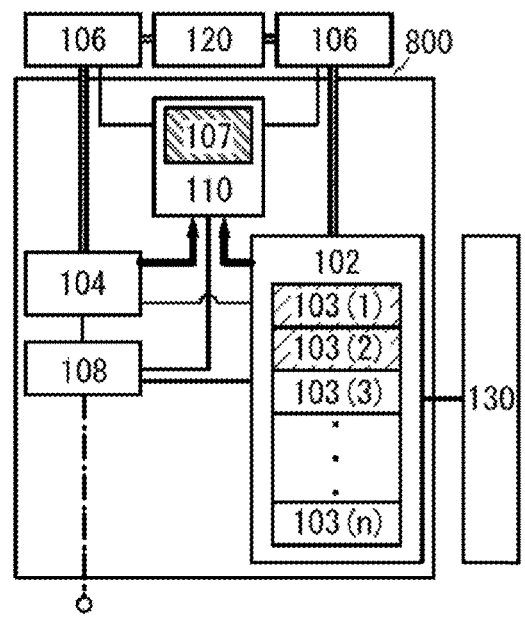

After that, a signal indicating the completion of the prefetch is output from the cache memory 102 to the power supply controller 110 when the prefetch to the cache memory 102 is completed (see FIG. 9C).

Figure 9D:
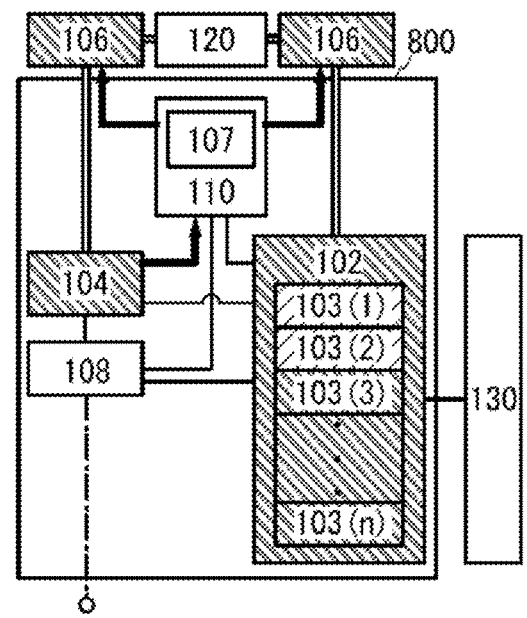

As a result, the standby circuit 107 provided in the power supply controller 110 is turned on and the signal for turning off the switch circuits 106 is output from the power supply controller 110, so that supply of power to the cache memory 102 and the processor core 104 is stopped (see FIG. 9D).

<Description of Switching Process to Normal Operation Mode>

Next, a driving method during the resuming process will be described.

Figure 10A:
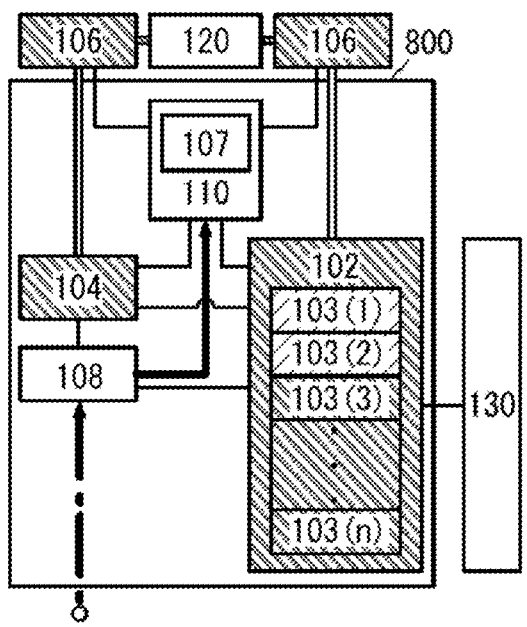
FIGS. 10A to 10D illustrate an operation of a microprocessor of Embodiment 2.
Figure 10B:
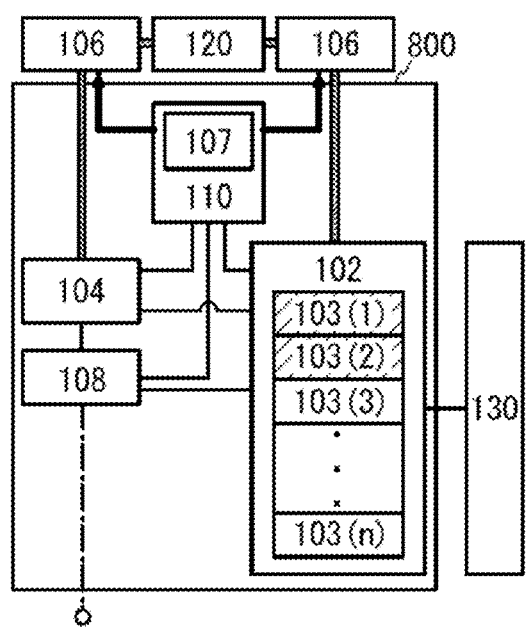

When an instruction to resume supplying power to the block to which supply of power has been stopped is issued and a signal indicating the instruction is input into the interrupt controller 108 (or an interrupt event is detected by the interrupt controller 108), the interrupt controller 108 outputs the second signal to the power supply controller 110 (see FIG. 10A).

Then, the power supply controller 110 receives the second signal and then outputs a signal for putting the switch circuits 106 in an on state to the switch circuits 106. Thus, power is supplied from the power supply 120 to the cache memory 102 and the processor core 104 (see FIG. 10B).

Figure 10C:
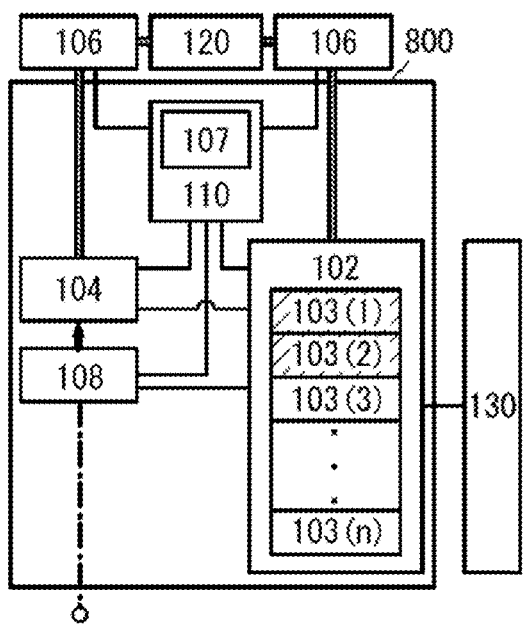

After that, the processor core 104 to which power is resumed to be supplied loads the interrupt vectors stored in the interrupt controller 108 (see FIG. 10C). Note that in this loading, interrupt vectors which stores an interrupt handler preferentially used by the processor core after supply of power is resumed are read.

Figure 10D:
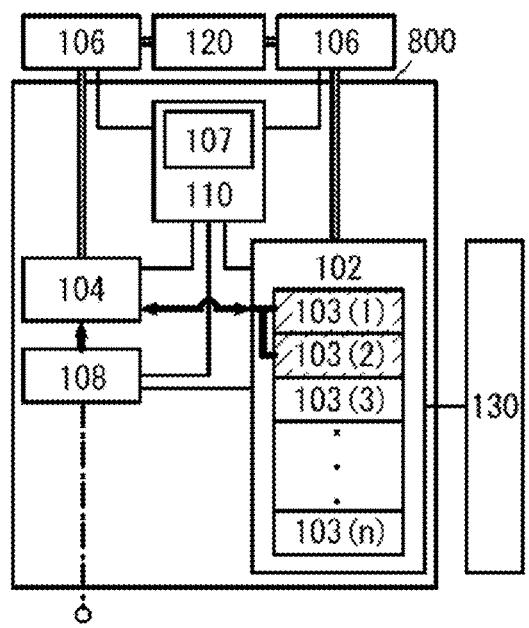

After that, data is fetched to the processor core 104 according to the interrupt vectors loaded from the interrupt controller 108 (see FIG. 10D). As described in <Description of Switching Process to Low Power Consumption Mode> in Embodiment 1, data preferentially used by the processor core after supply of power is resumed is stored in the nonvolatile memory cell array of the memory cell arrays 103, and the fetch can be performed without a cache miss (in other words, data does not need to be prefetched or is rarely prefetched again from the main memory 130); thus, the processing speed of the microprocessor after supply of power is resumed can be significantly increased.

Through the above process, cache misses by the processor core 104 in resuming supply of power to the block to which supply of power has been stopped (in this embodiment, mainly the cache memory 102 and the processor core 104) can be reduced as many as possible (or can be prevented) and thus, the processing speed of the microprocessor 800 can be increased (with almost no delay).

Embodiment 3

In this embodiment, specific examples of a structure and a manufacturing method of the "OS transistor" (transistor formed using an oxide semiconductor material for a semiconductor layer) described in the above embodiment will be described with reference to FIGS. 11A to 11C, FIGS. 12A to 12E, FIGS. 13A to 13D, and FIGS. 14A to 14C.

<Structure Example of OS Transistor>

Figure 11A:
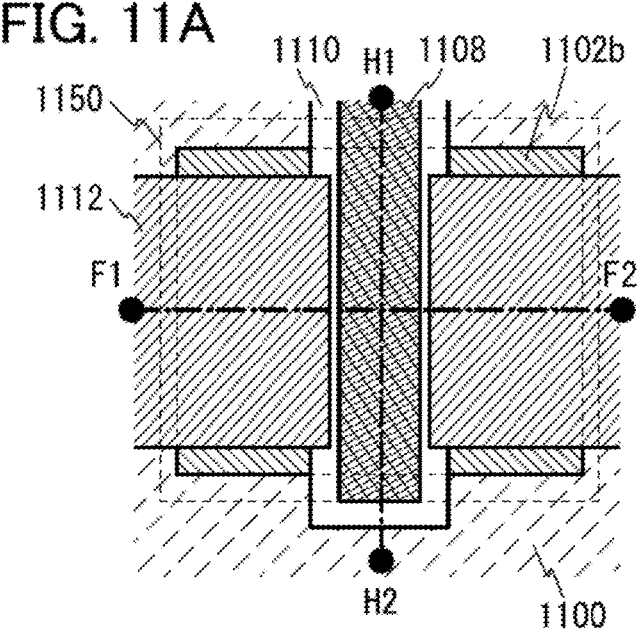
FIGS. 11A to 11C are structural views illustrating a transistor used for a nonvolatile memory cell array.
Figure 11B:
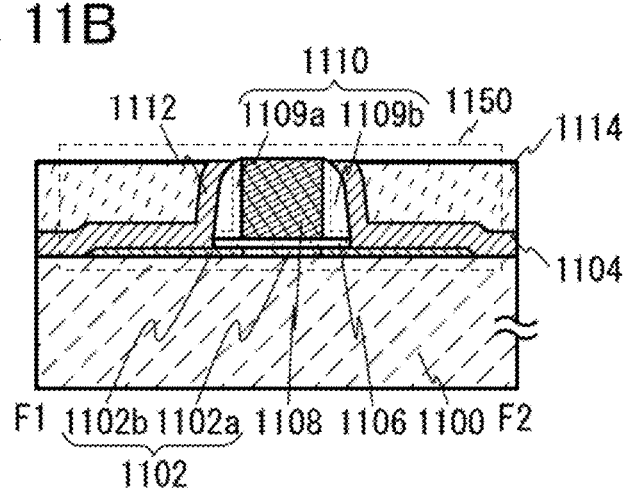
Figure 11C:
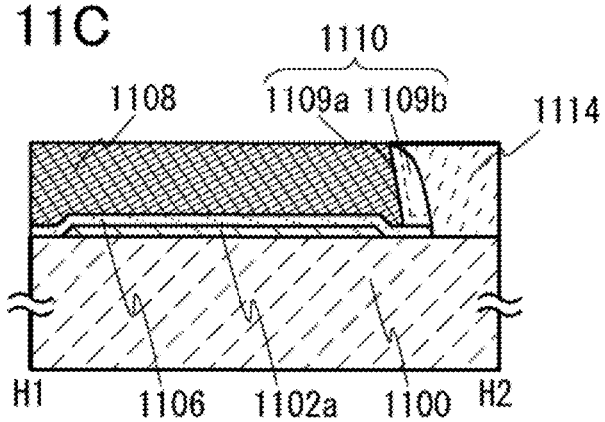

FIGS. 11A to 11C illustrate an example of a plan view and a cross-sectional view of a transistor 1150 having a top-gate structure, as an example of an OS transistor. FIG. 11A is a plan view, FIG. 11B is a cross-sectional view taken along a dashed-dotted line F1-F2 in FIG. 11A, and FIG. 11C is a cross-sectional view taken along a dashed-dotted line H1-H2 in FIG. 11A. In FIG. 11A, some of components are omitted to avoid complexity of the drawing.

The transistor 1150 illustrated in FIGS. 11A to 11C includes, over a substrate 1100 having an insulating surface, an oxide semiconductor film 1102 including a first region 1102a which functions as a channel formation region and second regions 1102b between which the first region 1102a is sandwiched in the channel length direction; a gate insulating film 1106 provided over at least the first region 1102a; a gate electrode 1108 provided over the first region 1102a with the gate insulating film 1106 provided therebetween; a protective insulating film 1110 provided on at least a side surface of the gate electrode 1108; and a pair of electrode films 1112 which are electrically connected to the second regions 1102b and sandwiches the gate electrode 1108.

Note that an insulating film having high surface flatness may be further provided over the transistor 1150. Accordingly, a wiring (e.g., an extraction wiring electrically connected to the transistor 1150) is easily formed over the transistor 1150.

<Method for Manufacturing OS Transistor>

An example of a manufacturing process of the OS transistor illustrated in FIGS. 11A to 11C will be described with reference to FIGS. 12A to 12E and FIGS. 13A to 13D.

Figure 12A:
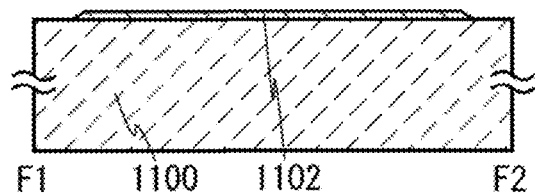
FIGS. 12A to 12E are views illustrating a method for forming a transistor used for a nonvolatile memory cell array.

First, an oxide semiconductor film is formed over the substrate 1100 having an insulating surface, a mask is formed over the oxide semiconductor film by a photolithography method, a printing method, an inkjet method, or the like, and part of the oxide semiconductor film is selectively removed with the mask to form the oxide semiconductor film 1102 (see FIG. 12A). Note that before the formation of the oxide semiconductor film 1102, treatment (also referred to as reverse sputtering treatment) in which an argon gas is introduced and plasma is generated to remove powdery substances (also referred to as particles or dust) or an organic substance attached on the surface of the substrate 1100 having an insulating surface is preferably performed. Note that instead of argon, a gas of nitrogen, helium, oxygen or the like may be used.

There is no particular limitation on the substrate as long as it has heat resistance high enough to withstand heat treatment performed later. For example, a glass substrate of barium borosilicate glass, aluminoborosilicate glass, or the like, a ceramic substrate, a quartz substrate, a sapphire substrate, or the like can be used. Alternatively, a single crystal semiconductor substrate or a polycrystalline semiconductor substrate of silicon, silicon carbide, or the like, a compound semiconductor substrate of silicon germanium or the like, an SOI substrate, or the like can be used as long as the substrate has an insulating surface.

The above-described term "SOI substrate" means a structure (silicon on insulator) in which a silicon thin film is provided on a surface of the insulating film; however, here, the "SOI substrate" is not limited to the above meaning and means a structure (semiconductor on insulator) in which a semiconductor film is provided on the insulating film (or an insulating substrate). The "SOI substrate" in this specification includes a structure (silicon on quartz, also abbreviated to SOQ in some cases) in which a silicon thin film is provided over a quartz substrate, a structure in which a gallium nitride (GaN) thin film or a silicon carbide (SiC) thin film is provided instead of the silicon thin film, and the like.

Note that a film from which oxygen is released by heat treatment (hereinafter, referred to as an oxygen supply film, and a description of the following oxygen supply film can be referred to for an oxygen supply film 1105a described below) is preferably formed in the top layer (that is, a layer in contact with the oxide semiconductor film 1102) of the substrate 1100 having an insulating surface. The reason is described below.

When oxygen vacancy exists in the first region 1102a functioning as a channel formation of the transistor 1150, charge is generated owing to the oxygen vacancy in some cases. In general, part of oxygen vacancy in an oxide semiconductor film serves as a donor to release an electron which is a carrier. As a result, the threshold voltage of the transistor shifts in the negative direction. Thus, an oxygen supply film is preferably formed in the top layer of the substrate 1100 having an insulating surface.

When an oxygen supply film exists in the top layer of the substrate 1100 having an insulating surface, after the oxide semiconductor film to be described later is formed, part of oxygen in the oxygen supply film is released by heat treatment; thus, the oxygen can be supplied to the oxide semiconductor film and oxygen vacancy in the oxide semiconductor film can be filled, which can suppress the shift of the threshold voltage of the transistor in the negative direction. In particular, the oxygen supply film preferably contains oxygen which exceeds at least the stoichiometric composition. For example, in the case where silicon oxide is used for the oxygen supply film, a film of silicon oxide represented by $SiO_{2+\alpha}$ ($\alpha>0$) is preferably used. Note that a region containing a larger amount of oxygen than the stoichiometric composition (hereinafter referred to as "an oxygen-excessive region" in some cases) may exist in at least part of the oxygen supply film.

Note that the "film from which oxygen is released by heat treatment" described above refers to a film whose amount of released oxygen when converted into oxygen atoms in thermal desorption spectroscopy (TDS) analysis is greater than or equal to $1.0 \times 10^{19}$ atoms/cm$^2$, preferably greater than or equal to $3.0 \times 10^{19}$ atoms/cm$^2$, further preferably greater than or equal to $1.0 \times 10^{20}$ atoms/cm$^2$, still further preferably greater than or equal to $3.0 \times 10^{20}$ atoms/cm$^2$.

Here, a method in which the released amount of oxygen is measured by being converted into oxygen atoms using the TDS analysis will now be described.

The released amount of gas in the TDS analysis is proportional to the integral value of a spectrum. Thus, the released amount of gas can be calculated from the ratio between the integral value of a measured spectrum and the reference value of a standard sample. The reference value of a standard sample refers to the ratio of the density of a predetermined atom contained in a sample to the integral value of a spectrum.

For example, the number of released oxygen molecules ($N_{O2}$) from an insulating film can be found according to Formula (4) with the TDS analysis results of a silicon wafer containing hydrogen at a predetermined density which is the standard sample and the TDS analysis results of the insulating film. Here, all spectra having a mass-to-charge ratio (M/z) of 32 which are obtained by the TDS analysis are assumed to originate from an oxygen molecule. Note that $CH_3OH$, which is given as a molecule where M/z=32, is not taken into consideration on the assumption that it is unlikely to be present. Further, an oxygen molecule including an oxygen atom where M/z=17 or M/z=18 which is an isotope of an oxygen atom is not taken into consideration either because the proportion of such a molecule in the natural world is minimal.

[FORMULA 4]

$$N_{O2} = \frac{N_{H2}}{S_{H2}} \times S_{O2} \times a \quad (4)$$

The value $N_{H2}$ is obtained by conversion of the number of hydrogen molecules desorbed from the standard sample into densities. The integral value of a spectrum when the standard sample is subjected to the TDS analysis is denoted by $S_{H2}$. Here, the reference value of the standard sample is set to $N_{H2}/S_{H2}$. The integral value of a spectrum when the insulating film is subjected to the TDS analysis is denoted by $S_{O2}$. Further, $\alpha$ is a coefficient which influences spectrum intensity in the TDS analysis. Refer to Japanese Published Patent Application No. H06-275697 for details of Formula 4. Note that the released amount of oxygen from the above insulating film is measured with a thermal desorption spectrometer produced by ESCO Ltd., EMD-WA1000S/W, using a silicon wafer containing hydrogen atoms at $1 \times 10^{16}$ atoms/cm$^2$ as the standard sample.

Further, in the TDS analysis, oxygen is partly detected as an oxygen atom. The ratio between oxygen molecules and oxygen atoms can be calculated from the ionization rate of the oxygen molecules. Note that, since the above a includes the ionization rate of the oxygen molecules, the number of the released oxygen atoms can also be estimated through the evaluation of the number of the released oxygen molecules.

Note that $N_{O2}$ is the number of the released oxygen molecules. The released amount of oxygen when converted into oxygen atoms is twice the number of the released oxygen molecules.

For the introduction of oxygen into the oxide semiconductor layer, heat treatment performed under an oxygen atmosphere, an ion implantation method, an ion doping method, a plasma immersion ion implantation method, plasma treatment performed under an atmosphere containing oxygen, or the like can be employed.

Further, in the case where the hydrogen concentration in an insulating film containing excessive oxygen is $7.2 \times 10^{20}$ atoms/cm$^3$ or higher, variations in initial characteristics of transistors are increased, an L length (channel length) dependence of electrical characteristics of a transistor is increased, and a transistor is significantly degraded in the BT stress test; thus, the hydrogen concentration in the insulating film containing excessive oxygen is preferably lower than $7.2 \times 10^{20}$ atoms/cm$^3$. Accordingly, the hydrogen concentration in the insulating film containing excessive oxygen is preferably lower than $7.2 \times 10^{20}$ atoms/cm$^3$, and the hydrogen concentration in the oxide semiconductor film is preferably lower than or equal to $5 \times 10^{19}$ atoms/cm$^3$. A method for forming a film having a low hydrogen concentration will be described in detail later.

Note that in the case where oxygen is supplied from the oxygen supply film to the oxide semiconductor film by heat treatment, it is preferable that a film having a low oxygen or water vapor permeability (also referred to as a low moisture permeability) be formed under the oxygen supply film (that is, on a surface of the oxygen supply film which is opposite to a surface of the same in contact with the oxide semiconductor film) so that oxygen released from the oxygen supply film can be supplied to the oxide semiconductor film efficiently. For example, under the oxygen supply film, an aluminum oxide film, an aluminum oxynitride film, an aluminum nitride oxide film, or the like may be formed as a barrier film. In the case of using an aluminum oxide film, the aluminum oxide film preferably has a high density (film density of higher than or equal to 3.2 g/cm$^3$, preferably higher than or equal to 3.6 g/cm$^3$).

The oxide semiconductor film 1102 may be formed in the following manner: an oxide semiconductor film is formed by a sputtering method, a molecular beam epitaxy (MBE) method, a CVD method, a pulse laser deposition method, an atomic layer deposition (ALD) method, or the like; a mask is formed over the oxide semiconductor film by a photolithography method, a printing method, an ink-jet method, or the like; and part of the oxide semiconductor film is selectively removed using the mask. The oxide semiconductor film 1102 may be formed using a sputtering apparatus which performs film formation with surfaces of a plurality of substrates set substantially perpendicular to a surface of a sputtering target. Note that the thickness of the oxide semiconductor film is greater than 5 nm and less than or equal to 200 nm, preferably greater than or equal to 10 nm and less than or equal to 30 nm.

To reduce oxygen vacancy in the oxide semiconductor film 1102 as much as possible, it is preferable that the oxide semiconductor film 1102 be deposited with a deposition atmosphere in which an oxygen gas accounts for a large proportion; thus, it can be said that it is preferable to use a sputtering apparatus into which oxygen can be introduced and in which the gas flow rate can be adjusted. Further, 90% or more of the gas introduced into a deposition chamber of the sputtering apparatus is an oxygen gas, and in the case where another gas is used in addition to the oxygen gas, a rare gas is preferably used. Further, it is more preferable that the gas introduced into the deposition chamber be only an oxygen gas and the percentage of an oxygen gas in the deposition atmosphere be as closer to 100% as possible.

Further, when the oxide semiconductor film 1102 contains a large amount of hydrogen, the hydrogen and an oxide semiconductor are bonded to each other, so that part of the hydrogen serves as a donor and causes generation of an electron which is a carrier. As a result, the threshold voltage of the transistor shifts in the negative direction. Accordingly, the hydrogen concentration in the oxide semiconductor film 1102 is preferably lower than $5\times10^{18}$ atoms/cm$^3$, more preferably lower than or equal to $1\times10^{18}$ atoms/cm$^3$, still more preferably lower than or equal to $5\times10^{17}$ atoms/cm$^3$, further more preferably lower than or equal to $1\times10^{16}$ atoms/cm$^3$. Note that the above hydrogen concentration in the oxide semiconductor film is measured by secondary ion mass spectrometry (SIMS).

For the above-described reason, it is preferable that the gas used for deposition of the oxide semiconductor film 1102 does not contain an impurity such as water, hydrogen, a hydroxyl group, or hydride. Alternatively, it is preferable to use a gas having a purity greater than or equal to 6N, preferably greater than or equal to 7N (i.e., the impurity concentration in the gas is less than or equal to 1 ppm, preferably less than or equal to 0.1 ppm).

Further, in deposition of the oxide semiconductor film 1102, in order to remove moisture (including water, water vapor, hydrogen, a hydroxyl group, or hydroxide) in the deposition chamber, an entrapment vacuum pump such as a cryopump, an ion pump, or a titanium sublimation pump is preferably used. The evacuation unit may be a turbo molecular pump provided with a cold trap. From the deposition chamber which is evacuated with a cryopump, a hydrogen atom, a compound containing a hydrogen atom such as water (H$_2$O) (more preferably, also a compound containing a carbon atom), and the like are removed, whereby the concentration of an impurity such as hydrogen or moisture in the oxide semiconductor film 1102 formed in the deposition chamber can be reduced.

On the other hand, when the oxide semiconductor film 1102 contains an alkali metal or an alkaline earth metal, the alkali metal or the alkaline earth metal and an oxide semiconductor are bonded to each other, so that carriers are generated in some cases, which causes an increase in the off-state current of a transistor. Accordingly, the concentration of an alkali metal or an alkaline earth metal in the oxide semiconductor film 1102 is lower than or equal to $1\times10^{18}$ atoms/cm$^3$, preferably lower than or equal to $2\times10^{16}$ atoms/cm$^3$.

Note that a target used in the sputtering apparatus preferably has a relative density of greater than or equal to 90%, preferably greater than or equal to 95%, further preferably greater than or equal to 99%. With the use of a target having a high relative density, the formed oxide semiconductor film 1102 can be a dense film.

An oxide semiconductor material used for the oxide semiconductor film 1102 contains at least indium (In). In particular, In and zinc (Zn) are preferably contained. In addition, as a stabilizer for reducing variations in electric characteristics of a transistor including the oxide semiconductor material, gallium (Ga) is preferably contained in addition to In and Zn. Tin (Sn) is preferably contained as a stabilizer. Hafnium (Hf) is preferably contained as a stabilizer. Aluminum (Al) is preferably contained as a stabilizer. Zirconium (Zr) is preferably contained as a stabilizer.

As another stabilizer, one or plural kinds of lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu) may be contained.

As the oxide semiconductor, for example, any of the following can be used: indium oxide; tin oxide; zinc oxide, an In—Zn-based oxide, an In—Mg-based oxide, or an In—Ga-based oxide, an In—Ga—Zn-based oxide (also referred to as IGZO), an In—Al—Zn-based oxide, an In—Sn—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, or an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide and an In—Hf—Al—Zn-based oxide.

Note that here, for example, an "In—Ga—Zn-based oxide" means an oxide containing In, Ga, and Zn as its main components and there is no limitation on the ratio of In:Ga:Zn. The In—Ga—Zn-based oxide may contain a metal element other than the In, Ga, and Zn.

Alternatively, a material represented by InMO$_3$(ZnO)$_m$, (m>0, where m is not an integer) may be used as the oxide semiconductor. Note that M represents one or more metal elements selected from Ga, Fe, Mn, and Co. Further alternatively, as the oxide semiconductor, a material represented by In$_2$SnO$_5$(ZnO)$_n$ (n>0, n is an integer) may be used.

The oxide semiconductor film 1102 may be in a non-single-crystal state, for example. The non-single-crystal state is, for example, structured by at least one of c-axis aligned crystal (CAAC), polycrystal, microcrystal, and an amorphous part. The density of defect states of an amorphous part is higher than those of microcrystal and CAAC. The density of defect states of microcrystal is higher than that of CAAC.

Note that an oxide semiconductor including CAAC is referred to as a CAAC-OS (c-axis aligned crystalline oxide semiconductor).

For example, the oxide semiconductor film 1102 may include a CAAC-OS. In the CAAC-OS, for example, c-axes are aligned, and a-axes and/or b-axes are not macroscopically aligned.

For example, the oxide semiconductor film 1102 may include microcrystal. Note that an oxide semiconductor including microcrystal is referred to as a microcrystalline oxide semiconductor. A microcrystalline oxide semiconductor film includes microcrystal (also referred to as nanocrystal) with a size greater than or equal to 1 nm and less than 10 nm, for example. Alternatively, a microcrystalline oxide semiconductor film, for example, includes a crystal-amorphous mixed phase structure where crystal parts (each of which is greater than or equal to 1 nm and less than 10 nm) are distributed.

For example, the oxide semiconductor film 1102 may include an amorphous part. Note that an oxide semiconductor including an amorphous part is referred to as an amorphous oxide semiconductor. An amorphous oxide semiconductor film, for example, has disordered atomic arrangement and no crystalline component. Alternatively, an amorphous oxide semiconductor film is, for example, absolutely amorphous and has no crystal part.

Note that the oxide semiconductor film 1102 may be a mixed film including any of a CAAC-OS, a microcrystalline oxide semiconductor, and an amorphous oxide semiconductor. The mixed film, for example, includes a region of an amorphous oxide semiconductor, a region of a microcrystalline oxide semiconductor, and a region of a CAAC-OS. Further, the mixed film may have a stacked structure including a region of an amorphous oxide semiconductor, a region of a microcrystalline oxide semiconductor, and a region of a CAAC-OS, for example.

Note that the oxide semiconductor film 1102 may be in a single-crystal state, for example.

The oxide semiconductor film 1102 preferably includes a plurality of crystal parts. In each of the crystal parts, a c-axis is preferably aligned in a direction parallel to a normal vector of a surface where the oxide semiconductor film is formed or a normal vector of a surface of the oxide semiconductor film. Note that, among crystal parts, the directions of the a-axis and the b-axis of one crystal part may be different from those of another crystal part. An example of such an oxide semiconductor film is a CAAC-OS film.

The CAAC-OS film is not absolutely amorphous. The CAAC-OS film, for example, includes an oxide semiconductor with a crystal-amorphous mixed phase structure where crystal parts and amorphous parts are intermingled. Note that in most cases, the crystal part fits inside a cube whose one side is less than 100 nm. In an image obtained with a transmission electron microscope (TEM), a boundary between an amorphous part and a crystal part and a boundary between crystal parts in the CAAC-OS film are not clearly detected. Further, with the TEM, a grain boundary in the CAAC-OS film is not clearly found. Thus, in the CAAC-OS film, a reduction in electron mobility due to the grain boundary is suppressed.

In each of the crystal parts included in the CAAC-OS film, for example, a c-axis is aligned in a direction parallel to a normal vector of a surface where the CAAC-OS film is formed or a normal vector of a surface of the CAAC-OS film. Further, in each of the crystal parts, metal atoms are arranged in a triangular or hexagonal configuration when seen from the direction perpendicular to the a-b plane, and metal atoms are arranged in a layered manner or metal atoms and oxygen atoms are arranged in a layered manner when seen from the direction perpendicular to the c-axis. Note that, among crystal parts, the directions of the a-axis and the b-axis of one crystal part may be different from those of another crystal part. In this specification, a term "perpendicular" includes a range from 80° to 100°, preferably from 85° to 95°. In addition, a term "parallel" includes a range from −10° to 10°, preferably from −5° to 5°.

In the CAAC-OS film, distribution of crystal parts is not necessarily uniform. For example, in the formation process of the CAAC-OS film, in the case where crystal growth occurs from a surface side of the oxide semiconductor film, the proportion of crystal parts in the vicinity of the surface of the oxide semiconductor film is higher than that in the vicinity of the surface where the oxide semiconductor film is formed in some cases. Further, when an impurity is added to the CAAC-OS film, the crystal part in a region to which the impurity is added becomes amorphous in some cases.

Since the c-axes of the crystal parts included in the CAAC-OS film are aligned in the direction parallel to a normal vector of a surface where the CAAC-OS film is formed or a normal vector of a surface of the CAAC-OS film, the directions of the c-axes may be different from each other depending on the shape of the CAAC-OS film (the cross-sectional shape of the surface where the CAAC-OS film is formed or the cross-sectional shape of the surface of the CAAC-OS film). Note that the film deposition is accompanied with the formation of the crystal parts or followed by the formation of the crystal parts through crystallization treatment such as heat treatment. Hence, the c-axes of the crystal parts are aligned in the direction parallel to a normal vector of the surface where the CAAC-OS film is formed or a normal vector of the surface of the CAAC-OS film.

In a transistor using the CAAC-OS film, change in electric characteristics due to irradiation with visible light or ultraviolet light is small. Thus, the transistor has high reliability.

Note that part of oxygen included in the oxide semiconductor film may be substituted with nitrogen.

In an oxide semiconductor having a crystal part such as the CAAC-OS, defects in the bulk can be further reduced and when the surface flatness of the oxide semiconductor is improved, mobility higher than that of an oxide semiconductor in an amorphous state can be obtained. To improve the surface flatness, the oxide semiconductor is preferably formed over a flat surface. Specifically, the oxide semiconductor is preferably formed over a surface with an average surface roughness ($R_a$) of less than or equal to 1 nm, more preferably less than or equal to 0.3 nm, still more preferably less than or equal to 0.1 nm. Thus, planarization treatment is preferably performed on a surface over which the oxide semiconductor is to be formed. As the planarization treatment, chemical mechanical polishing (CMP) treatment, a dry etching method, or the like may be used. Note that the CMP treatment may be performed only once or plural times. When the CMP treatment is performed plural times, first polishing is preferably performed with a high polishing rate followed by final polishing with a low polishing rate. By performing polishing steps with different polishing rates in combination, the planarity of the surface over which the oxide semiconductor is to be formed can be further improved.

Note that $R_a$ is obtained by expanding arithmetic mean surface roughness, which is defined by JIS B0601:2001 (ISO4287:1997), into three dimensions so as to be applied to a surface. In addition, $R_a$ can be expressed as an "average value of the absolute values of deviations from a reference surface to a specific surface" and is defined by the following Formula (5).

[FORMULA 5]

$$R_a = \frac{1}{S_0} \int_{y1}^{y2} \int_{x1}^{x2} |f(x, y) - Z_0| dx dy \quad (5)$$

Here, the specific surface is a surface which is a target of roughness measurement, and is a quadrilateral region which is specified by four points represented by the coordinates ($x_1$, $y_1$, $f(x_1, y_1)$), ($x_1$, $y_2$, $f(x_1, y_2)$), ($x_2$, $y_1$, $f(x_2, y_1)$), and ($x_2$, $y_2$, $f(x_2, y_2)$). Further, $S_0$ represents the area of a rectangle which is obtained by projecting the specific surface on the x-y plane, and $Z_0$ represents the height of the reference surface (the average height of the specific surface). Note that $R_a$ can be measured using an atomic force microscope (AFM).

In the case where the CAAC-OS film is deposited as the oxide semiconductor film 1102, any of the following three methods may be employed. The first method is the one in which the oxide semiconductor film is deposited at a temperature higher than or equal to 200° C. and lower than or equal to 450° C., so that the oxide semiconductor film 1102 serves as the CAAC-OS film. The second method is the one in which the oxide semiconductor film 1102 is deposited and then subjected to heat treatment at a temperature higher than or equal to 200° C. and lower than or equal to 700° C., so that the oxide semiconductor film 1102 serves as the CAAC-OS film. The third method is the one in which two layers are deposited for formation of an oxide semiconductor film. After a first oxide semiconductor film with a small thickness is deposited, heat treatment is performed on the first oxide semiconductor film at a temperature higher than or equal to 200° C. and lower than or equal to 700° C., so that the first oxide semiconductor film serves as a CAAC-OS film. Then, a second oxide semiconductor film is deposited over the first oxide semiconductor film using a crystal in the first oxide semiconductor film as a seed crystal, whereby the CAAC-OS film is obtained.

Note that the oxide semiconductor film 1102 may have a structure in which a plurality of oxide semiconductor films are stacked. For example, the oxide semiconductor film 1102 may have a stacked-layer structure of a first oxide semiconductor film and a second oxide semiconductor film which are formed using metal oxides with different compositions.

Further, the constituent elements of the first oxide semiconductor film and the second oxide semiconductor film may be the same and the composition thereof may be different. For example, the first oxide semiconductor film may have an atomic ratio of In:Ga:Zn=1:1:1, and the second oxide semiconductor film may have an atomic ratio of In:Ga:Zn=3:1:2. Alternatively, the first oxide semiconductor film may have an atomic ratio of In:Ga:Zn=1:3:2, and the second oxide semiconductor film may have an atomic ratio of In:Ga:Zn=2:1:3.

At this time, one of the first oxide semiconductor film and the second oxide semiconductor film which is closer to the gate electrode (on a channel side) preferably contains In and Ga at a proportion of In>Ga. The other which is farther from the gate electrode (on a back channel side) preferably contains In and Ga at a proportion of In≤Ga.

In an oxide semiconductor, the s orbital of heavy metal mainly contributes to carrier transfer, and when the In proportion in the oxide semiconductor is increased, overlaps of the s orbitals are likely to be increased. Thus, an oxide having a composition of In>Ga has higher mobility than an oxide having a composition of In≤Ga. Further, in Ga, the formation energy of an oxygen vacancy is larger and thus the oxygen vacancy is less likely to occur than in In; thus, the oxide having a composition of In≤Ga has more stable characteristics than the oxide having a composition of In>Ga.

An oxide semiconductor containing In and Ga at a proportion of In>Ga is used on a channel side, and an oxide semiconductor containing In and Ga at a proportion of In≤Ga is used on a back channel side, whereby field-effect mobility and reliability of the transistor can be further improved.

Further, oxide semiconductors having different crystallinities may be used for the first oxide semiconductor film and the second oxide semiconductor film. That is, the first oxide semiconductor film and the second oxide semiconductor film may be formed by combining any of a single crystal oxide semiconductor, a polycrystalline oxide semiconductor, an amorphous oxide semiconductor, and a CAAC-OS, as appropriate. When an amorphous oxide semiconductor is used for at least one of the first oxide semiconductor film and the second oxide semiconductor film, internal stress or external stress of the oxide semiconductor film 1102 is relieved, variation in characteristics of a transistor is reduced, and reliability of the transistor can be further improved.

On the other hand, an amorphous oxide semiconductor is likely to absorb an impurity which serves as a donor, such as hydrogen, and to generate an oxygen vacancy, and thus easily becomes an n-type. Thus, the oxide semiconductor film on the channel side is preferably formed using a crystalline oxide semiconductor such as a CAAC-OS.

The oxide semiconductor film 1102 may have a stacked-layer structure of three or more layers in which an amorphous oxide semiconductor film is provided between a plurality of oxide semiconductor films having crystallinity. A structure in which an oxide semiconductor film having crystallinity and an amorphous oxide semiconductor film are alternately stacked may also be employed. These two structures for making the oxide semiconductor film 1102 have a stacked-layer structure of a plurality of layers can be combined as appropriate.

Note that in the case where the oxide semiconductor film 1102 has a stacked-layer structure including a plurality of layers, oxygen may be introduced each time the oxide semiconductor film is formed. Oxygen can be introduced by the method described in the description of the substrate 1100 having an insulating surface. Note that in plasma treatment under an atmosphere containing oxygen, the plasma treatment is performed in a state where a direct current bias is applied to the substrate side (a bias application apparatus provided on the substrate side or the substrate itself), whereby oxygen plasma is likely to enter the oxide semiconductor film 1102, which is preferable. The applied bias power may be adjusted as appropriate in consideration of the thickness of the oxide semiconductor film 1102 or damage to the oxide semiconductor film 1102 by practitioners.

Oxygen is introduced each time the oxide semiconductor layer is formed, whereby the effect of reducing oxygen vacancies in the oxide semiconductor can be improved.

Figure 12B:
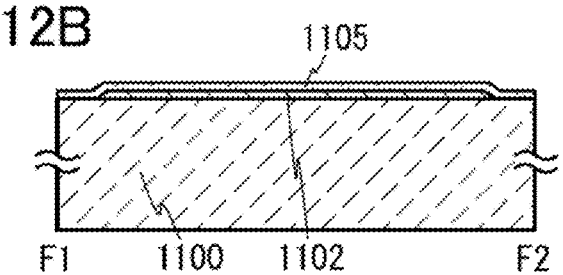

Next, an insulating film 1105 is formed over the substrate 1100 having an insulating surface and the oxide semiconductor film 1102 (see FIG. 12B). The insulating film functions as the gate insulating film 1106 of the transistor 1150 after being processed in a later step.

For the insulating film 1105, an oxide insulating film having a sufficient withstand voltage and a sufficient insulating property is preferably used. The insulating film 1105 can be formed by a vacuum deposition method, a physical vapor deposition (PVD) method such as a sputtering method, or a chemical vapor deposition (CVD) method such as a plasma CVD method to have a single-layer structure or a stacked-layer structure of a silicon oxide film, a silicon oxynitride film, a silicon nitride film, a silicon nitride oxide film, an aluminum oxide film, an aluminum nitride film, an aluminum oxynitride film, an aluminum nitride oxide film, a gallium oxide film, a yttrium oxide film, a lanthanum oxide film, or the like. A high-k material film such as a hafnium oxide film, a hafnium silicate film (HfSi$_x$O$_y$ (x>0, y>0)), a hafnium silicate film to which nitrogen is added (HfSiO$_x$N$_y$ (x>0, y>0)), or a hafnium aluminate film (HfAl$_x$O$_y$ (x>0, y>0)), may be used as at least part of the insulating film 1105. Thus, gate leakage current can be reduced.

With the use of the oxide insulating film as the insulating film 1105, part of oxygen in the oxide insulating film can be released by heat treatment and supplied to the oxide semiconductor film 1102 in a manner similar to that in the above-described description of the substrate 1100 having an insulating surface. Thus, an oxygen vacancy in the oxide semiconductor film 1102 can be filled. Note that there is no particular limitation on the timing when heat treatment is performed on the insulating film 1105 as long as it is after the insulating film 1105 is deposited.

In particular, the insulating film 1105 preferably contains a large amount of oxygen which exceeds at least the stoichiometry in (a bulk of) the insulating film 1105. For example, a film of silicon oxide represented by the formula SiO$_{2+\alpha}$ ($\alpha$>0) is preferably used as the insulating film 1105. When such an oxide silicon film is used as the insulating film 1105, oxygen can be supplied to the oxide semiconductor film 1102, so that the transistor 1150 using the oxide semiconductor film 1102 can have favorable transistor characteristics.

Figure 12C:
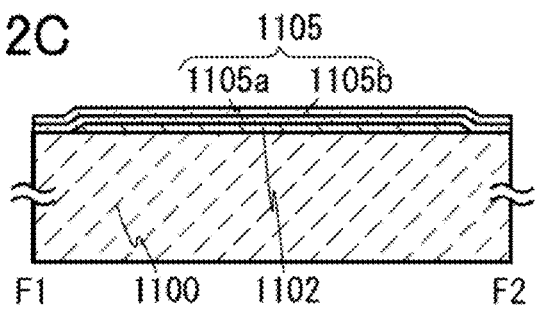

As illustrated in FIG. 12C, in the case where the insulating film 1105 has a stacked-layer structure, a barrier film 1105b having a low oxygen or water vapor permeability (also referred to as a low moisture permeability) is preferably stacked over the oxygen supply film 1105a (that is, on a surface of the oxygen supply film 1105a which is opposite to a surface of the same in contact with the oxide semiconductor film 1102). Accordingly, release of oxygen from the oxide semiconductor film 1102 can be suppressed, so that oxygen in the oxygen supply film can be efficiently supplied to the oxide semiconductor film 1102. Further, entry and diffusion of hydrogen or moisture into the oxide semiconductor film 1102 can be suppressed. As the film having a low oxygen or water vapor permeability, for example, an aluminum oxide film, an aluminum oxynitride film, an aluminum nitride oxide film, or the like can be used. In the case where an aluminum oxide film having high density (the film density is higher than or equal to 3.2 g/cm$^3$, preferably higher than or equal to 3.6 g/cm$^3$) is used, the transistor 1150 can have stable electric characteristics. Note that although the insulating film 1105 has a two-layer structure in FIG. 12C, the insulating film 1105 may have a stacked-layer structure of three or more layers using the above-described oxygen supply film 1105a and the barrier film 1105b. The description of the oxygen supply film in the description of the substrate 1100 having an insulating surface can be referred to for the oxygen supply film 1105a here.

To form a film from which part of oxygen can be released by heat treatment as the oxygen supply film 1105a, for example, oxygen is added to the film by an ion implantation method, an ion doping method, a plasma immersion ion implantation method, plasma treatment, or the like. It is preferable that oxygen be added to the film by an inductively coupled plasma (ICP) method, using oxygen plasma excited by microwaves (with a frequency of 2.45 GHz, for example). Also in the oxygen plasma treatment, as described in the description of the substrate 1100 having an insulating surface, the plasma treatment is preferably performed in a state where a direct current bias is applied to the substrate side (a bias application apparatus provided on the substrate side or the substrate itself).

Note that the oxygen supply film described in the description of the substrate 1100 having an insulating surface can also be formed by the above-described oxygen adding treatment.

The barrier film 1105b can be formed by direct formation of an aluminum oxide film, an aluminum oxynitride film, an aluminum nitride oxide film, or the like as described above. Alternatively, the barrier film 1105b can be provided with a low oxygen or water vapor permeability in the following manner, for example: a metal film (a metal film which can exhibit a low oxygen or water vapor permeability by oxygen adding treatment, e.g., an aluminum film) is formed and oxygen adding treatment is performed on the metal film. In the film formed in such a manner, particles are less generated than the case where an aluminum oxide film, an aluminum oxynitride film, an aluminum nitride oxide film, or the like is directly formed, so that a decrease in yield of the microprocessor including the transistor 1150 can be suppressed.

The barrier film described in the description of the substrate 1100 having an insulating surface can also be formed by the above-described method.

Figure 12D:
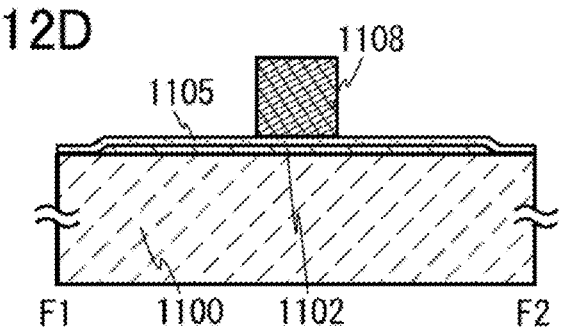
Figure 12E:
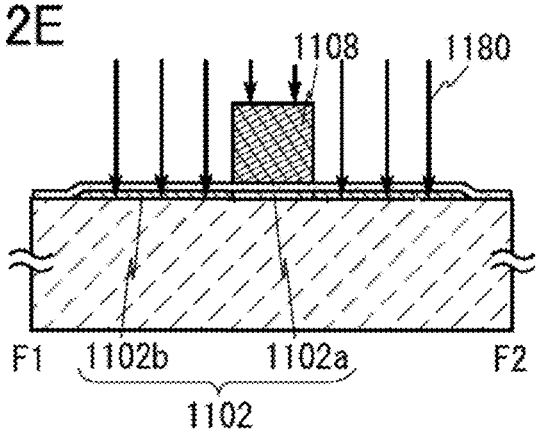

Next, a conductive film is formed over the insulating film 1105, a resist mask is formed over the conductive film by a photolithography process, and the conductive film is selectively etched using the resist mask, whereby the gate electrode 1108 of the transistor 1150 (and a wiring formed using the same layer) is formed; then the resist mask is removed (see FIG. 12D).

The conductive film for forming the gate electrode 1108 can be formed using a metal material such as molybdenum, titanium, tantalum, tungsten, aluminum, copper, neodymium, or scandium; or an alloy material mainly containing any of these materials by a physical vapor deposition (PVD) method such as a vacuum evaporation method or a sputtering method or a chemical vapor deposition (CVD) method such as a plasma CVD method, for example. Alternatively, the conductive film used for the gate electrode may be formed using a conductive metal oxide. As the conductive metal oxide, indium oxide (In$_2$O$_3$), tin oxide (SnO$_2$), zinc oxide (ZnO), an indium tin oxide (In$_2$O$_3$—SnO$_2$, which is abbreviated to ITO in some cases), indium zinc oxide (In$_2$O$_3$—ZnO), or any of these metal oxide materials in which silicon or silicon oxide is included can be used. The gate electrode 1108 can be formed to have a single-layer structure or a stacked-layer structure using any of the above materials. There is no particular limitation on the method for forming the conductive film, and a variety of film formation methods such as an evaporation method, a CVD method, a sputtering method, or a spin coating method can be employed.

As one layer of the conductive film which is in contact with the insulating film 1105, a metal oxide film containing nitrogen, specifically, an In—Ga—Zn—O film containing nitrogen, an In—Sn—O film containing nitrogen, an In—Ga—O film containing nitrogen, an In—Zn—O film containing nitrogen, a Sn—O film containing nitrogen, an In—O film containing nitrogen, or a metal nitride (e.g., InN or SnN) film can be used. These films each have a work function of 5 eV or higher, preferably 5.5 eV or higher, which enables the threshold voltage of the transistor to take a positive value when used as the gate electrode, so that a switching element of what is called normally-off type can be achieved.

The resist mask used for forming the gate electrode 1108 may be formed by an inkjet method, in which case manufacturing costs can be reduced because a photomask is not used.

Note that the conductive film may be etched using either dry etching or wet etching, or using both dry etching and wet etching.

Next, by an ion doping method or an ion implantation method, an impurity ion 1180 by which the conductivity of the oxide semiconductor film 1102 is changed is added to the oxide semiconductor film 1102, so that the second region 1102b is formed in the oxide semiconductor film 1102. At this time, the gate electrode 1108 functions as a mask, so that the impurity ion 1180 is not added to a region of the oxide semiconductor film 1102 which overlaps with the gate electrode 1108; thus, the first region 1102a which functions as a channel formation region is formed in a self-aligned manner (see FIG. 12E).

Note that in the oxide semiconductor film 1102, in a region where the impurity ion 1180 is added, the crystal structure is disordered, so that the region is likely to be in an amorphous state. Thus, in the case where a film having crystallinity such as a CAAC-OS film is used as the oxide semiconductor film 1102 and the impurity ion 1180 is added to the film, the first region 1102a functioning as a channel formation region keeps the state of the oxide semiconductor film having crystallinity because impurities are not added thereto, and a region other than the first region 1102a (i.e., the second region 1102b) is likely to be an oxide semiconductor film in an amorphous state (or an oxide semiconductor film which is almost in an amorphous state) because impurities are added thereto.

An oxide semiconductor film in an amorphous state (or an oxide semiconductor film a large part of which is in an amorphous state) easily absorbs impurities such as hydrogen which serves as a donor from an oxide semiconductor film having crystallinity such as a CAAC-OS film; thus, the impurities are absorbed (also referred to as gettered) from the first region 1102a to the second region 1102b, so that electric characteristics of the transistor 1150 can be improved.

One or more selected from the following can be used as the impurity ion 1180: Group 15 elements (typified by nitrogen (N), phosphorus (P), arsenic (As), and antimony (Sb)), boron (B), aluminum (Al), argon (Ar), helium (He), neon (Ne), indium (In), fluorine (F), chlorine (Cl), titanium (Ti), and zinc (Zn). Note that because an ion implantation method uses a mass separator with which only necessary ion is extracted, only the impurity ion 1180 can be selectively added to an object by an ion implantation method. An ion implantation method is thus preferably employed, in which case entry of impurities (e.g., hydrogen) into the oxide semiconductor film 1102 is reduced as compared with the case where the ion is added by an ion doping method. Note that the use of an ion doping method is not excluded.

Note that the impurity ion 1180 may be added in a state where a resist mask or the like covers a portion to which the impurity ion 1180 needs not be added. As a result, damage to the film due to implantation of the impurity ion 1180 can be reduced.

Figure 13A:
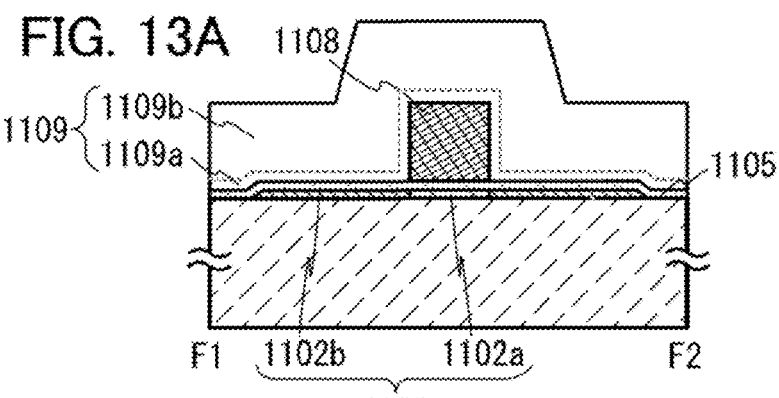
FIGS. 13A to 13D are views illustrating a method for forming a transistor used for a nonvolatile memory cell array.
Figure 13B:
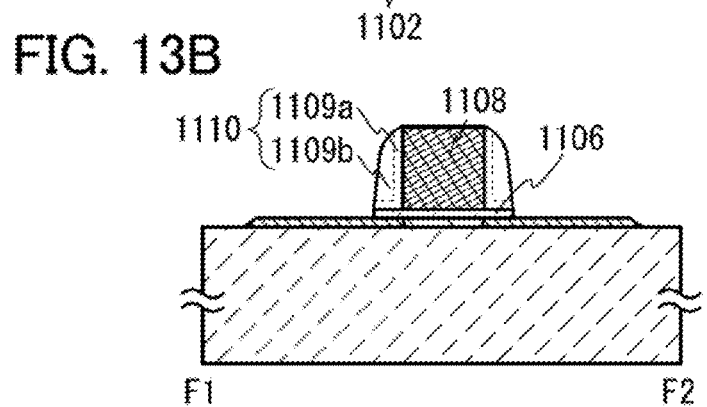

Then, an insulating film 1109 is formed over the insulating film 1105 and the gate electrode 1108 (see FIG. 13A).

The insulating film 1109 (including a region 1109a and a region 1109b in the insulating film 1109) can be formed using a method and a material similar to those of the insulating film 1105, preferably formed using a method and a material similar to those of the oxygen supply film 1105a. Accordingly, oxygen in the insulating film 1109 can be supplied to the first region 1102a which serves as a channel formation region by heat treatment.

The insulating film 1109 may have a single-layer structure, but preferably has a structure including a plurality of regions such as the region 1109a functioning as an oxygen supply film and the region 1109b over the region 1109a as in this embodiment. The reason is described below.

The insulating film 1109 is formed so as to cover at least a side surface of the gate electrode 1108 (in this case, the insulating film 1109 is referred to as a sidewall insulating film, a sidewall, or the like) as in this embodiment, or is subjected to removal treatment in a later step to function as a planarization film, in some cases. Thus, the insulating film 1109 may need to have a larger thickness to some extent than the gate insulating film 1106 and the like. In that case, in order to add oxygen to a deep portion in the film (that is, a portion near the oxide semiconductor film 1102) after the insulating film 1109 is formed, treatment for adding an oxygen ion to the film with high energy, such as an ion implantation method or an ion doping method, is needed. Thus, an oxygen ion is added to the oxide semiconductor film with high energy, which adversely affects the structure of the oxide semiconductor film 1102 (for example, the crystallinity of the oxide semiconductor film 1102 is degraded) in some cases.

To solve the above-described problem, first, the region 1109a is formed thin (specifically, ⅕ or less, preferably ¹⁄₁₀ or less of the total thickness of the insulating film 1109) and is made a film which can supply oxygen by heat treatment by using oxygen adding treatment which does not or hardly damages the oxide semiconductor film 1102 (e.g., plasma treatment performed by an ICP method, using oxygen plasma which is excited by a microwave (with a frequency of 2.45 GHz, for example)). After that, the region 1109b is formed, whereby the thickness of the insulating film 1109 is adjusted to a thickness at which the film can withstand the planarization treatment. Note that there is no particular limitation on the timing when the heat treatment is performed on the insulating film 1109 as long as it is after the insulating film 1109 is formed.

In this embodiment, the region 1109a and the region 1109b are formed using the same material and it is difficult to identify an interface therebetween clearly; thus, the region 1109a and the region 1109b are distinguished by a dotted line. However, the same does not apply to the case where the region 1109a and the region 1109b are formed using different materials.

Next, the protective insulating film 1110 is formed on the side surface of the gate electrode 1108. After that, the insulating film 1105 is processed using the gate electrode 1108 and the protective insulating film 1110 as a mask to form the gate insulating film 1106 (see FIG. 13B).

The protective insulating film 1110 can be formed in a self-aligned manner by performing a highly anisotropic etching step on the insulating film 1109. For example, a dry etching method is preferably employed. As an etching gas used for the dry etching method, for example, a gas including fluorine such as trifluoromethane, octafluorocyclobutane, or tetrafluoromethane can be used. A rare gas or hydrogen may be added to the etching gas. As the dry etching method, a reactive ion etching (RIE) method in which high-frequency voltage is applied to a substrate is preferably used.

Figure 13C:
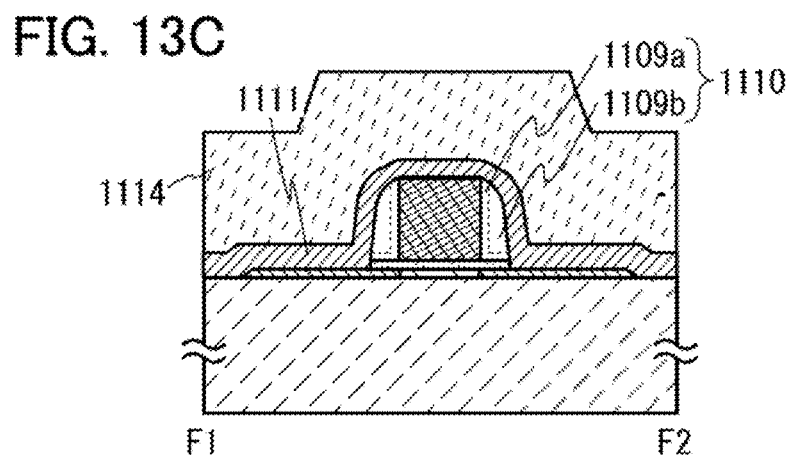
Figure 13D:
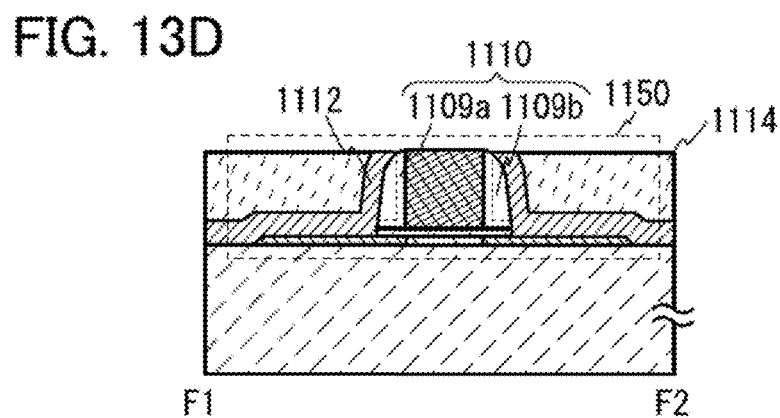

Then, a conductive film 1111 and an interlayer insulating film 1114 are formed over the oxide semiconductor film 1102, the gate electrode 1108, and the protective insulating film 1110 (see FIG. 13C).

The conductive film 1111 can be formed by a physical vapor deposition (PVD) method such as a vacuum evaporation method or a sputtering method or a chemical vapor deposition (CVD) method such as a plasma CVD method, for example. The thickness of the conductive film is greater than or equal to 50 nm and less than or equal to 11000 nm, and is preferably greater than or equal to 100 nm and less than or equal to 700 nm.

As a material of the conductive film 1111, a material which is capable of withstanding heat treatment performed in the manufacturing process of the transistor 1150 is used. For example, a metal film containing an element selected from aluminum, chromium, copper, tantalum, titanium, molybdenum, or tungsten, or a metal nitride film containing any of the above elements as its component (e.g., a titanium nitride film, a molybdenum nitride film, or a tungsten nitride film) can be used. Alternatively, the conductive film 1111 may have a structure in which a film of a high-melting-point metal such as titanium, molybdenum, or tungsten, or a nitride film of any of these metals (a titanium nitride film, a molybdenum nitride film, or a tungsten nitride film) is stacked on either or both of the bottom surface and the top surface of a metal film of aluminum, copper, or the like. Further alternatively, the conductive film may be formed using a conductive metal oxide. As the conductive metal oxide, indium oxide ($In_2O_3$), tin oxide ($SnO_2$), zinc oxide (ZnO), indium oxide-tin oxide ($In_2O_3$—$SnO_2$; abbreviated to ITO), indium oxide-zinc oxide ($In_2O_3$—ZnO), or any of these metal oxide materials to which silicon oxide is added can be used.

The interlayer insulating film 1114 may be formed using a method and a material similar to those of the gate insulating film 1106. Note that although the interlayer insulating film 1114 has a single-layer structure in this embodiment, the interlayer insulating film 1114 may have a stacked-layer structure.

Next, removal treatment (also referred to as planarization treatment) is performed on the interlayer insulating film 1114 and the conductive film 1111 so that the protective insulating film 1110 is exposed; thus, part of the conductive film 1111 which overlaps with the gate electrode 1108 of the transistor 1150 is removed. As a result, the conductive film 1111 is divided with the gate electrode 1108 provided therebetween and becomes the pair of electrode films 1112 between which the gate electrode 1108 is sandwiched. Thus, the transistor 1150 is formed (see FIG. 13D).

As the removal treatment, chemical mechanical polishing (CMP) treatment, a dry etching method, or the like may be used. Note that the CMP treatment may be performed only once or plural times.

In the case where the above-described removal treatment is performed using chemical mechanical polishing, the amount of removal varies within a substrate surface in some cases. Thus, it is preferable that etching treatment (dry etching and/or wet etching) be further performed after the removal treatment to completely remove the part of the conductive film 1111 which overlaps with the gate electrode 1108.

In this embodiment, the top surfaces of the pair of electrode films 1112 and the protective insulating film 1110 are at substantially the same level. With such a structure, coverage with a thin film formed over the pair of electrode films 1112 and the protective insulating film 1110 can be improved, so that disconnection of a thin film and a wiring can be prevented. For example, if there is a step among the pair of electrode films 1112, the protective insulating film 1110, and the interlayer insulating film 1114, a film or a wiring over the step might be cut and a defect might occur; however, if the top surfaces of the pair of electrode films 1112, the protective insulating film 1110, and the interlayer insulating film 1114 are at the same level, such a defect can be prevented and the reliability can be improved. However, as long as the above-described defect is not generated, there is no problem even if there is a step among the top surfaces of the pair of electrode films 1112, the protective insulating film 1110, and the interlayer insulating film 1114.

Through the above steps, the transistor 1150 can be formed. Further, an element such as another transistor can be formed over the transistor 1150 in the following manner: an insulating film having high surface flatness is formed over the transistor 1150, an opening portion is provided in part of the insulating film and the like, and a wiring which is electrically connected to part of the transistor 1150 is formed in the opening portion.

Embodiment 4

In this embodiment, an example of a nonvolatile memory cell including the OS transistor described in Embodiment 3 will be described with reference to FIGS. 14A to 14C.

Figure 14A:
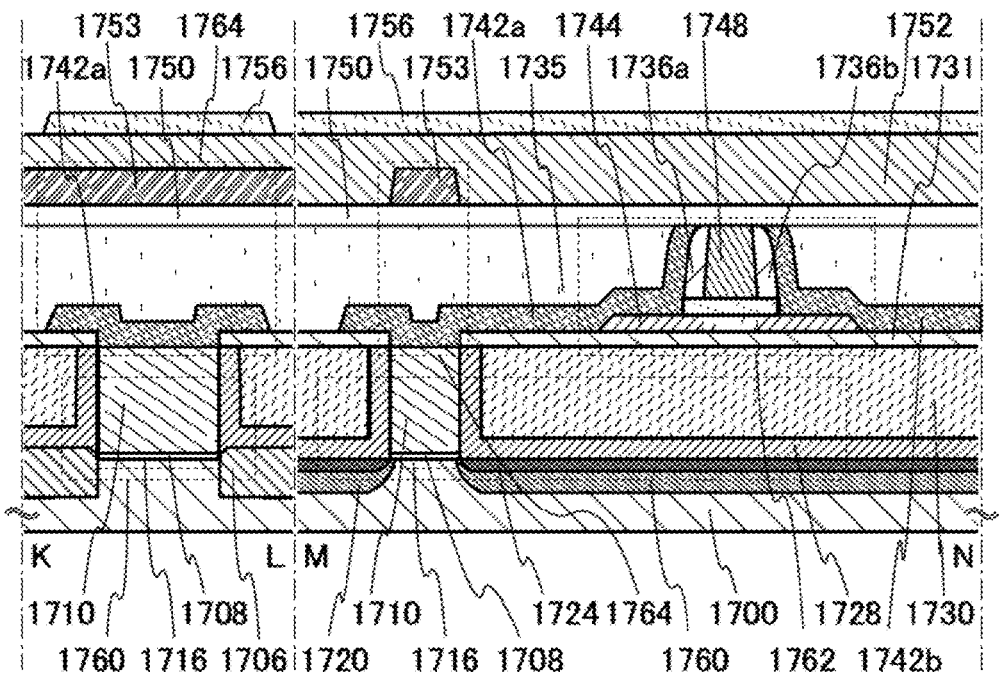
FIGS. 14A to 14C are views illustrating an example of a structure of a nonvolatile memory cell array.
Figure 14B:
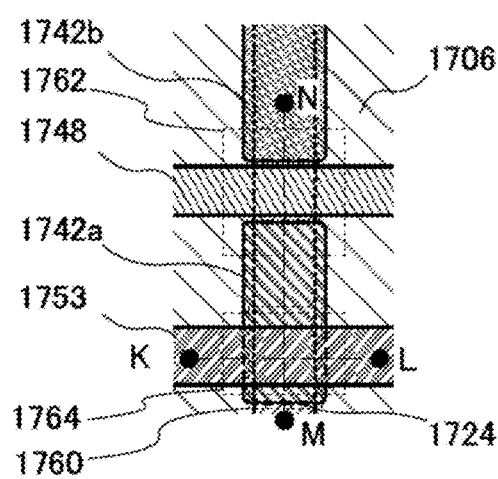
Figure 14C:
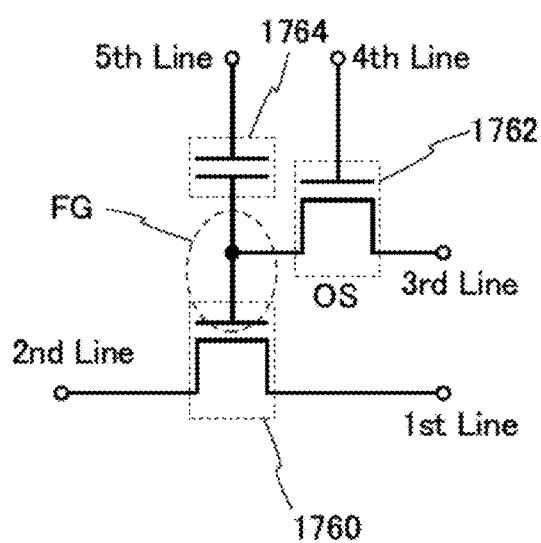

FIGS. 14A to 14C illustrate an example of a structure of a nonvolatile memory cell (hereinafter, also referred to as a "semiconductor device"). FIG. 14A is a cross-sectional view of the semiconductor device, FIG. 14B is a plan view of the semiconductor device, and FIG. 14C is a circuit diagram of the semiconductor device. Here, FIG. 14A corresponds to a cross section along line K-L and line M-N in FIG. 14B.

The semiconductor device illustrated in FIGS. 14A and 14B includes a transistor 1760 including a first semiconductor material in a lower portion, and a transistor 1762 including a second semiconductor material in an upper portion. Description is made on the case where the transistor 1150 of Embodiment 3 is used as the transistor 1762.

Here, the first semiconductor material and the second semiconductor material are preferably materials having different band gaps. For example, the first semiconductor material may be a semiconductor material other than an oxide semiconductor (e.g., silicon) and the second semiconductor material may be an oxide semiconductor. A transistor including a material other than an oxide semiconductor can operate at high speed easily. On the other hand, charge can be held in the semiconductor device for a long time owing to characteristics of a transistor including an oxide semiconductor.

Although all the transistors are n-channel transistors here, it is needless to say that p-channel transistors can be used. The specific constituent of the semiconductor device is not necessarily limited to those described here such as the material used for the semiconductor device and the structure of the semiconductor device.

The transistor 1760 in FIG. 14A includes a channel formation region 1716 provided in a substrate 1700 containing a semiconductor material (e.g., silicon), impurity regions 1720 provided so that the channel formation region 1716 is sandwiched therebetween, intermetallic compound regions 1724 in contact with the impurity regions 1720, a gate insulating film 1708 provided over the channel formation region 1716, and a gate electrode 1710 provided over the gate insulating film 1708. Note that a transistor whose source electrode and drain electrode are not illustrated in a drawing may be referred to as a transistor for the sake of convenience. Further, in such a case, in a description of a connection of a transistor, a source region and a source electrode are collectively referred to as a "source electrode", and a drain region and a drain electrode are collectively referred to as a "drain electrode". That is, in this specification, the term "source electrode" may include a source region.

Further, an element isolation insulating layer 1706 is formed over the substrate 1700 to surround the transistor 1760, and an insulating layer 1728 and an insulating layer 1730 are formed to cover the transistor 1760. Note that, in the transistor 1760, the sidewall insulating layers may be formed on side surfaces of the gate electrode 1710 and the impurity regions 1720 may include a region having a different impurity concentration.

The transistor 1760 formed using a silicon substrate can operate at high speed. Thus, when the transistor is used as a reading transistor, data can be read at a high speed. Two insulating films are formed to cover the transistor 1760. As treatment prior to formation of the transistor 1762 and a capacitor 1764, CMP treatment is performed on the two insulating films, whereby an insulating layer 1728 and an insulating layer 1730 which are planarized are formed and, at the same time, the top surface of the gate electrode 1710 is exposed.

As each of the insulating layer 1728 and the insulating layer 1730, an inorganic insulating film, typical examples of which are a silicon oxide film, a silicon oxynitride film, an aluminum oxide film, an aluminum oxynitride film, a silicon nitride film, an aluminum nitride film, a silicon nitride oxide film, and an aluminum nitride oxide film, can be used. The insulating layer 1728 and the insulating layer 1730 can be formed by a plasma CVD method, a sputtering method, or the like.

Alternatively, an organic material such as a polyimide resin, an acrylic resin, or a benzocyclobutene-based resin can be used. Other than such organic materials, it is also possible to use a low-dielectric constant material (a low-k material) or the like. In the case of using an organic material, a wet process such as a spin coating method or a printing method may be used to form the insulating layer 1728 and the insulating layer 1730.

Note that in this embodiment, a silicon nitride film is used as the insulating layer 1728, and a silicon oxide film is used as the insulating layer 1730.

Planarization treatment is preferably performed on the surface of the insulating layer 1730 in the formation region of the oxide semiconductor film 1744. In this embodiment, a base film 1731 is formed over the insulating layer 1730 sufficiently planarized (the average surface roughness of the surface of the insulating layer 1730 is preferably less than or equal to 0.15 nm) by polishing treatment (such as CMP treatment) and the oxide semiconductor film 1744 is formed over the base film 1731. As the base film 1731, as described in the above embodiment, a single layer or a stack of an oxide film having crystallinity is used. The oxide film used as the base film 1731 preferably contains indium (In) and zinc (Zn) which are constituent elements of the oxide semiconductor film 1744 to reduce lattice mismatch with the oxide semiconductor film 1744. When these materials are contained, the oxide semiconductor film 1744 can be a film having crystallinity from the vicinity of the interface with the base film 1731 and whole region in the thickness direction in the oxide semiconductor film 1744 can have crystallinity. It is preferable that one or more selected from zirconium (Zr), yttrium (Y), and cerium (Ce) be additionally contained. Accordingly, the conductivity of the base film 1731 can be reduced and thus carriers flowing between the source electrode and the drain electrode selectively flow in the oxide semiconductor film 1744 without being affected by the base film 1731.

The transistor 1762 illustrated in FIG. 14A includes an oxide semiconductor in the channel formation region. Here, an oxide semiconductor film 1744 included in the transistor 1762 is preferably highly purified by removing impurities such as moisture and hydrogen as much as possible, as described in the above embodiment. Further, the oxide semiconductor film in which oxygen vacancies are sufficiently repaired is preferable. By using such an oxide semiconductor, the transistor 1762 which has extremely favorable off-state current characteristics can be obtained.

Since the off-state current of the transistor 1762 is extremely small, stored data can be held for a long time owing to such a transistor. In other words, power consumption can be sufficiently reduced because a semiconductor device in which the refresh operation is unnecessary or the frequency of the refresh operation is extremely low can be provided.

In the process for manufacturing the transistor 1762, a conductive film over a gate electrode 1748, a sidewall insulating film 1736*a*, and a sidewall insulating film 1736*b* is removed by chemical mechanical polishing treatment to form an electrode film 1742*a* and an electrode film 1742*b* which function as a source electrode and a drain electrode.

Accordingly, in the transistor 1762, the $L_{\mathit{off}}$ width can be narrow; thus, the on-state characteristics of the transistor 1762 can be improved.

Further, precise processing can be performed accurately because an etching step using a resist mask is not performed in a step for removing the conductive film over the gate electrode 1748, which is one step of the formation process of the electrode film 1742*a* and the electrode film 1742*b*. Consequently, in a process for manufacturing the semiconductor device, a transistor having a miniaturized structure with less variation in shape or characteristics can be manufactured with high yield.

An interlayer insulating film 1735 and an insulating film 1750 each of which has a single-layer structure or a stacked-layer structure are provided over the transistor 1762. In this embodiment, an aluminum oxide film is used as the insulating film 1750. When the aluminum oxide film has high density (the film density is higher than or equal to 3.2 g/cm$^3$, preferably higher than or equal to 3.6 g/cm$^3$), the transistor 1762 can have stable electric characteristics.

In addition, a conductive layer 1753 is provided in a region overlapping with the electrode film 1742*a* of the transistor 1762 with the interlayer insulating film 1735 and the insulating film 1750 interposed therebetween, and the electrode film 1742*a*, the interlayer insulating film 1735, the insulating film 1750, and the conductive layer 1753 form a capacitor 1764. That is, the electrode film 1742*a* of the transistor 1762 functions as one electrode of the capacitor 1764, and the conductive layer 1753 functions as the other electrode of the capacitor 1764. Note that the capacitor 1764 may be omitted if a capacitor is not needed. Alternatively, the capacitor 1764 may be separately provided above the transistor 1762.

An insulating film 1752 is provided over the transistor 1762 and the capacitor 1764. In addition, a wiring 1756 for connecting the transistor 1762 to another transistor is provided over the insulating film 1752. Although not illustrated in FIG. 14A, the wiring 1756 is electrically connected to the electrode film 1742*b* through an electrode formed in an opening provided in the interlayer insulating film 1735, the insulating film 1750, the insulating film 1752, and the like. Here, the electrode is preferably provided to partly overlap with at least the oxide semiconductor film 1744 of the transistor 1762.

In FIGS. 14A and 14B, the transistor 1760 is provided to overlap with at least part of the transistor 1762. The source region or the drain region of the transistor 1760 is preferably provided to overlap with part of the oxide semiconductor film 1744. Further, the transistor 1762 and the capacitor 1764 are provided to overlap with at least part of the transistor 1760. For example, the conductive layer 1753 of the capacitor 1764 is provided to overlap with at least part of the gate electrode 1710 of the transistor 1760. With such a planar layout, the area occupied by the semiconductor device can be reduced; thus, higher integration can be achieved.

Note that the electrical connection between the electrode film 1742b and the wiring 1756 may be established by contacting the electrode film 1742b with the wiring 1756 directly or may be established through an electrode provided in an insulating layer which is between the electrode film 1742b and the wiring 1756. Alternatively, the electrical connection may be established through a plurality of electrodes.

Next, an example of a circuit configuration corresponding to FIGS. 14A and 14B is illustrated in FIG. 14C.

In FIG. 14C, a first line (1st Line) is electrically connected to a source electrode of the transistor 1760. A second line (2nd Line) is electrically connected to a drain electrode of the transistor 1760. A third line (3rd line) and one of a source electrode and a drain electrode of the transistor 1762 are electrically connected to each other, and a fourth line (4th line) and a gate electrode of the transistor 1762 are electrically connected to each other. A gate electrode of the transistor 1760 and the other of the source electrode and the drain electrode of the transistor 1762 are electrically connected to one of the electrodes of the capacitor 1764, and a fifth line (5th line) and the other of the electrodes of the capacitor 1764 are electrically connected to each other.

The semiconductor device in FIG. 14C utilizes a characteristic in which the potential of the gate electrode of the transistor 1760 can be held, and thus enables data writing, holding, and reading as follows.

Writing and holding of data are described. First, the potential of the fourth line is set to a potential at which the transistor 1762 is turned on, so that the transistor 1762 is turned on. Accordingly, the potential of the third line is supplied to the gate electrode of the transistor 1760 and the capacitor 1764. That is, predetermined charge is given to the gate electrode of the transistor 1760 (writing). Here, charge for supply of a potential level or charge for supply of a different potential level (hereinafter referred to as low-level charge and high-level charge) is given. After that, the potential of the fourth line is set to a potential at which the transistor 1762 is turned off, so that the transistor 1762 is turned off. Thus, the charge given to the gate electrode of the transistor 1760 is held (holding).

Since the off-state current of the transistor 1762 is extremely low, the charge of the gate electrode of the transistor 1760 is held for a long time.

Next, reading of data is described. By supplying an appropriate potential (reading potential) to the fifth line while a predetermined potential (constant potential) is supplied to the first line, the potential of the second line varies depending on the amount of charge held in the gate electrode of the transistor 1760. This is because in general, when the transistor 1760 is an n-channel transistor, an apparent threshold voltage $V_{th\_H}$ in the case where a high-level charge is given to the gate electrode of the transistor 1760 is lower than an apparent threshold voltage $V_{th\_L}$ in the case where a low-level charge is given to the gate electrode of the transistor 1760. Here, an apparent threshold voltage refers to the potential of the fifth line, which is needed to turn on the transistor 1760. Thus, the potential of the fifth line is set to a potential $V_0$ which is between $V_{th\_H}$ and $V_{th\_L}$, whereby charge given to the gate electrode of the transistor 1760 can be determined. For example, in the case where a high-level charge is given in writing, when the potential of the fifth wiring is set to $V_0$ ($>V_{th\_H}$), the transistor 1760 is turned on. In the case where a low-level charge is given in writing, even when the potential of the fifth wiring is set to $V_0$ ($<V_{th\_L}$), the transistor 1760 remains in an off state. Thus, the stored data can be read by the potential of the second line.

Note that in the case where memory cells are arrayed to be used, only data of desired memory cells needs to be read. In the case of a memory cell in which reading is not performed, a potential at which the transistor 1760 is turned off, that is, a potential smaller than $V_{th\_H}$ may be given to the fifth wiring regardless of the state of the gate electrode of the transistor 1760. Alternatively, a potential which allows the transistor 1760 to be turned on regardless of a state of the gate electrode, that is, a potential higher than $V_{th\_L}$ may be applied to the fifth lines.

When a transistor having a channel formation region formed using an oxide semiconductor and having extremely small off-state current is applied to the semiconductor device in this embodiment, the semiconductor device can store data for an extremely long period. In other words, power consumption can be adequately reduced because the refresh operation becomes unnecessary or the frequency of the refresh operation can be extremely low. Moreover, stored data can be held for a long period even when power is not supplied (note that a potential is preferably fixed).

Further, in the semiconductor device described in this embodiment, high voltage is not needed for writing data and there is no problem of deterioration of elements. For example, unlike a conventional non-volatile memory, it is not necessary to inject and extract electrons into and from a floating gate; thus, the problem of deterioration of a gate insulating film does not occur. In other words, the semiconductor device according to an embodiment of the disclosed invention does not have a limit on the number of times of writing which is a problem in a conventional nonvolatile memory, and reliability thereof is drastically improved. Furthermore, data is written depending on the on state and the off state of the transistor, whereby a high-speed operation can be easily realized.

As described above, a miniaturized and highly-integrated semiconductor device having high electrical characteristics and a method for manufacturing the semiconductor device can be provided.

The structures, methods, and the like which are described in this embodiment can be combined as appropriate with any of the structures, methods, and the like which are described in the other embodiments.

Embodiment 5

In this embodiment, an example of a structure of a non-volatile memory cell including the OS transistor described in Embodiment 3, which is different from that in Embodiment 4 will be described with reference to FIGS. 15A and 15B and FIGS. 16A and 16B.

Figure 15A:
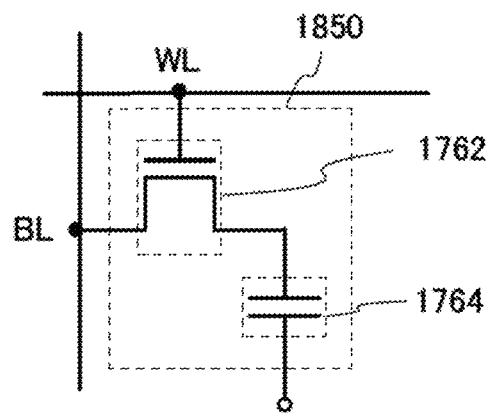
FIGS. 15A and 15B are views each illustrating an example of a structure of a nonvolatile memory cell array.
Figure 15B:
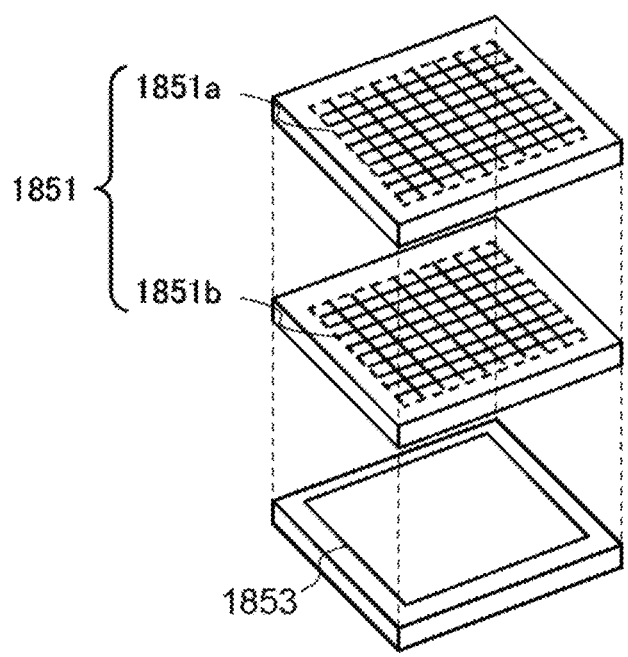

FIG. 15A illustrates an example of a circuit configuration of a semiconductor device, and FIG. 15B is a conceptual diagram illustrating an example of a semiconductor device. First, the semiconductor device illustrated in FIG. 15A is described, and then, the semiconductor device illustrated in FIG. 15B is described below.

In the semiconductor device illustrated in FIG. 15A, a bit line BL is electrically connected to the source electrode or the drain electrode of the transistor 1762, a word line WL is electrically connected to the gate electrode of the transistor 1762, and the source electrode or the drain electrode of the transistor 1762 is electrically connected to a first terminal of a capacitor 1764.

Next, writing and holding of data in the semiconductor device (a memory cell 1850) illustrated in FIG. 15A are described.

First, the potential of the word line WL is set to a potential at which the transistor 1762 is turned on, and the transistor 1762 is turned on. Accordingly, the potential of the bit line BL is supplied to the first terminal of the capacitor 1764 (writing). After that, the potential of the word line WL is set to a potential at which the transistor 1762 is turned off, so that the transistor 1762 is turned off. Thus, the potential at the first terminal of the capacitor 1764 is held (holding).

The transistor 1762 including an oxide semiconductor has extremely low off-state current. For that reason, a potential of the first terminal of the capacitor 1764 (or a charge accumulated in the capacitor 1764) can be held for an extremely long period by turning off the transistor 1762.

Secondly, reading of data is described. When the transistor 1762 is turned on, the bit line BL which is in a floating state and the capacitor 1764 are electrically connected to each other, and the charge is redistributed between the bit line BL and the capacitor 1764. As a result, the potential of the bit line BL is changed. The amount of change in potential of the bit line BL varies depending on the potential of the first terminal of the capacitor 1764 (or the charge accumulated in the capacitor 1764).

For example, the potential of the bit line BL after charge redistribution is $(C_B \times V_{B0} + C \times V)/(C_B + C)$, where V is the potential of the first terminal of the capacitor 1764, C is the capacitance of the capacitor 1764, $C_B$ is the capacitance of the bit line BL (hereinafter also referred to as bit line capacitance), and $V_{B0}$ is the potential of the bit line BL before the charge redistribution. Thus, it can be found that assuming that the memory cell 1850 is in either of two states in which the potentials of the first terminal of the capacitor 1764 are $V_1$ and $V_0$ ($V_1 > V_0$), the potential of the bit line BL in the case of holding the potential $V_1$ ($=(C_B \times V_{B0} + C \times V_1)/(C_B + C)$) is higher than the potential of the bit line BL in the case of holding the potential $V_0$ ($=(C_B \times V_{B0} + C \times V_0)/(C_B + C)$).

Then, by comparing the potential of the bit line BL with a predetermined potential, data can be read.

As described above, the semiconductor device illustrated in FIG. 15A can hold charge that is accumulated in the capacitor 1764 for a long time because the off-state current of the transistor 1762 is extremely small. In other words, power consumption can be adequately reduced because the refresh operation becomes unnecessary or the frequency of the refresh operation can be extremely low. Moreover, stored data can be stored for a long time even when power is not supplied.

Next, the semiconductor device illustrated in FIG. 15B is described.

The semiconductor device illustrated in FIG. 15B includes memory cell arrays 1851a and 1851b including a plurality of memory cells 1850 illustrated in FIG. 15A as memory circuits in the upper portion, and a peripheral circuit 1853 in the lower portion which is necessary for operating a memory cell array 1851 (the memory cell arrays 1851a and 1851b). Note that the peripheral circuit 1853 is electrically connected to the memory cell array 1851.

In the structure illustrated in FIG. 15B, the peripheral circuit 1853 can be provided under the memory cell array 1851 (the memory cell arrays 1851a and 1851b). Thus, the size of the semiconductor device can be decreased.

It is preferable that a semiconductor material of the transistor provided in the peripheral circuit 1853 be different from that of the transistor 1762 in Embodiment 5. For example, silicon, germanium, silicon germanium, silicon carbide, gallium arsenide, or the like can be used, and a single crystal semiconductor is preferably used. Alternatively, an organic semiconductor material or the like may be used. A transistor including such a semiconductor material can operate at sufficiently high speed. Thus, a variety of circuits (e.g., a logic circuit or a driver circuit) which needs to operate at high speed can be favorably realized by the transistor.

Note that FIG. 15B illustrates, as an example, the semiconductor device in which two memory cell arrays 1851 (the memory cell array 1851a and the memory cell array 1851b) are stacked; however, the number of memory cell arrays to be stacked is not limited thereto. Three or more memory cell arrays may be stacked.

Next, a specific structure of the memory cell 1850 illustrated in FIG. 15A is described with reference to FIGS. 16A and 16B.

Figure 16A:
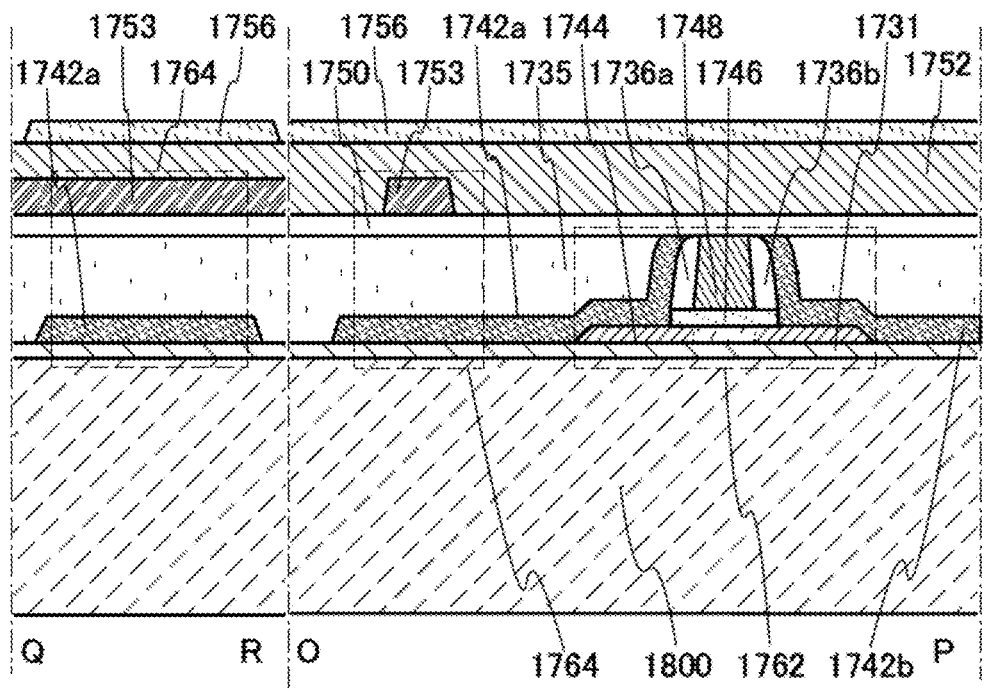
FIGS. 16A and 16B are views illustrating an example of a structure of a nonvolatile memory cell array.
Figure 16B:
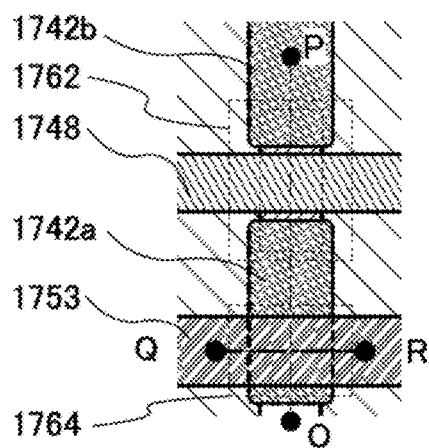

FIGS. 16A and 16B illustrate an example of a structure of the memory cell 1850. FIG. 16A is a cross-sectional view of the memory cell 1850, and FIG. 16B is a plan view of the memory cell 1850. Here, FIG. 16A illustrates a cross section taken along line O-P and line Q-R in FIG. 16B.

The transistor 1762 in FIGS. 16A and 16B can have the same structure as the transistor in Embodiment 3 or 4. That is, as the base film 1731 provided over a substrate 1800, as described in the above embodiment, a single layer or a stack of an oxide film having crystallinity is used. The oxide film used as the base film 1731 preferably contains indium (In) and zinc (Zn) which are constituent elements of the oxide semiconductor film 1744 to reduce lattice mismatch with the oxide semiconductor film 1744. When these materials are contained, the oxide semiconductor film 1744 can be a film having crystallinity from the vicinity of the interface with the base film 1731 and whole region in the thickness direction in the oxide semiconductor film 1744 can have crystallinity. It is preferable that one or more selected from zirconium (Zr), yttrium (Y), and cerium (Ce) be contained in addition to In and Zn. Thus, the conductivity of the base film 1731 can be reduced and thus carriers flowing between the source electrode and the drain electrode selectively flow in the oxide semiconductor film 1744 without being affected by the base film 1731.

An insulating film 1750 having a single-layer structure or a stacked-layer structure is provided over the transistor 1762. In addition, a conductive layer 1753 is provided in a region overlapping with the electrode film 1742a of the transistor 1762 with the insulating film 1750 interposed therebetween, and the electrode film 1742a, the interlayer insulating film 1735, the insulating film 1750, and the conductive layer 1753 form the capacitor 1764. That is, the electrode film 1742a of the transistor 1762 functions as one electrode of the capacitor 1764, and the conductive layer 1753 functions as the other electrode of the capacitor 1764.

An insulating film 1752 is provided over the transistor 1762 and the capacitor 1764. Further, the wiring 1756 for connecting the memory cell 1850 to the adjacent memory cell 1850 are provided over the insulating film 1752. Although not illustrated, the wiring 1756 is electrically connected to the electrode film 1742b of the transistor 1762 through an opening provided in the insulating film 1750, the insulating film 1752, the interlayer insulating film 1735, and the like. The wiring 1756 may be electrically connected to the electrode film 1742b through another conductive layer provided in the opening. Note that the wiring 1756 corresponds to the bit line BL in the circuit diagram of FIG. 15A.

In FIGS. 16A and 16B, the electrode film 1742b of the transistor 1762 can also function as a source electrode of a transistor included in an adjacent memory cell.

When the planar layout illustrated in FIG. 16A is employed, the area occupied by the semiconductor device can be reduced; thus, the degree of integration can be increased.

As described above, the plurality of memory cells is formed in the upper portion with the transistors including an oxide semiconductor. Since the off-state current of the transistor including an oxide semiconductor is small, stored data can be held for a long time owing to such a transistor. In other words, the frequency of the refresh operation can be extremely lowered, which leads to a sufficient reduction in power consumption.

A semiconductor device having a novel feature can be obtained by being provided with both a peripheral circuit including the transistor including a material other than an oxide semiconductor (in other words, a transistor capable of operating at sufficiently high speed) and a memory circuit including the transistor including an oxide semiconductor (in a broader sense, a transistor whose off-state current is sufficiently small). In addition, with a structure where the peripheral circuit and the memory circuit are stacked, the degree of integration of the semiconductor device can be increased.

As described above, a miniaturized and highly-integrated semiconductor device having high electrical characteristics and a method for manufacturing the semiconductor device can be provided.

This embodiment can be implemented in appropriate combination with the structures described in the other embodiments.

Embodiment 6

A microcomputer disclosed in this specification can be applied to a variety of electronic appliances (including game machines). Examples of the electronic appliances include display devices of televisions, monitors, and the like, lighting devices, desktop personal computers and notebook personal computers, word processors, image reproduction devices which reproduce still images or moving images stored in recording media such as digital versatile discs (DVDs), portable compact disc (CD) players, radio receivers, tape recorders, headphone stereos, stereos, cordless phone handsets, transceivers, portable wireless devices, mobile phones, car phones, portable game machines, calculators, portable information terminals, electronic notebooks, e-book readers, electronic translators, audio input devices, cameras such as still cameras and video cameras, electric shavers, high-frequency heating appliances such as microwave ovens, electric rice cookers, electric washing machines, electric vacuum cleaners, air-conditioning systems such as air conditioners, dishwashers, dish dryers, clothes dryers, futon dryers, electric refrigerators, electric freezers, electric refrigerator-freezers, freezers for preserving DNA, smoke detectors, radiation counters, and medical equipment such as dialyzers. Further, the examples include industrial equipment such as guide lights, traffic lights, belt conveyors, elevators, escalators, industrial robots, and power storage systems. In addition, oil engines, moving objects driven by electric motors using power from the non-aqueous secondary batteries, and the like are also included in the category of electronic appliances. Examples of the moving objects include electric vehicles (EV), hybrid electric vehicles (HEV) which include both an internal-combustion engine and a motor, plug-in hybrid electric vehicles (PHEV), tracked vehicles in which caterpillar tracks are substituted for wheels of these vehicles, motorized bicycles including motor-assisted bicycles, motorcycles, electric wheelchairs, golf carts, boats or ships, submarines, helicopters, aircrafts, rockets, artificial satellites, space probes, planetary probes, spacecrafts, and the like. Specific examples of these electronic devices are illustrated in FIGS. 17A and 17B.

Figure 17A:
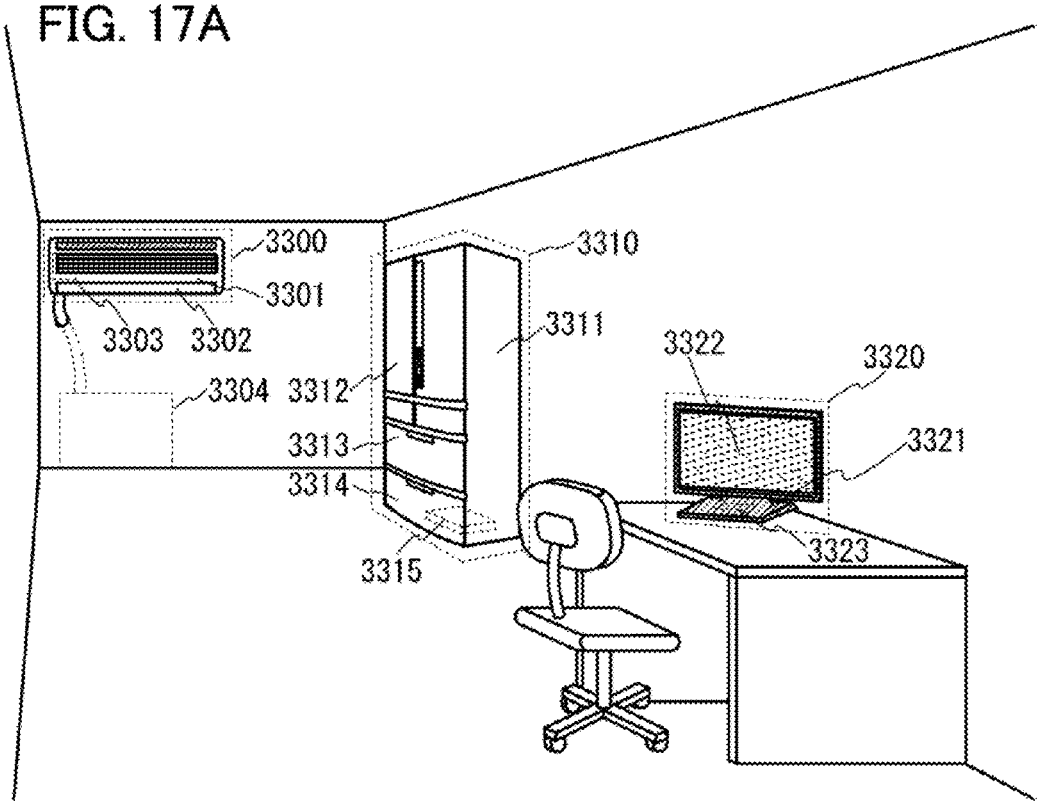
FIGS. 17A and 17B illustrate electronic devices.
Figure 17B:
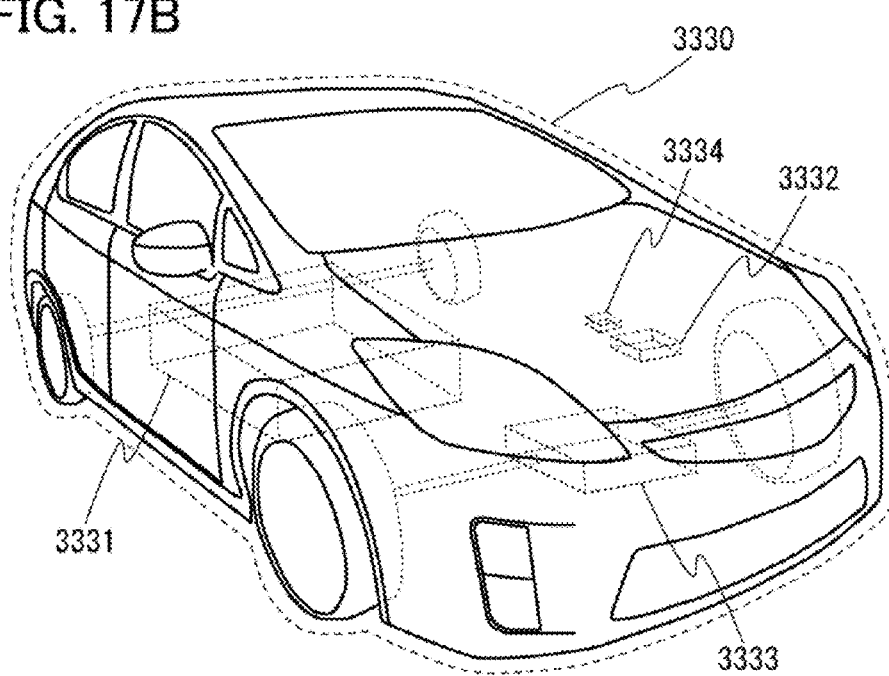

In FIG. 17A, an air conditioner which includes an indoor unit 3300 and an outdoor unit 3304 is an example of an electric appliance in which the microprocessor described in the above embodiment is used. Specifically, the indoor unit 3300 includes a housing 3301, an air outlet 3302, a microprocessor 3303, and the like. Although the microprocessor 3303 is provided in the indoor unit 3300 in FIG. 17A, the microprocessor 3303 may be provided in the outdoor unit 3304. Alternatively, the microprocessor 3303 may be provided in both the indoor unit 3300 and the outdoor unit 3304. As described in Embodiment 4 and Embodiment 5, the microprocessor 3303 includes a transistor including an oxide semiconductor and thus power consumption of the microprocessor 3303 can be reduced; accordingly, the power consumption of the air conditioner can be reduced.

In FIG. 17A, an electric refrigerator-freezer 3310 is an example of an electric appliance which is provided with the microprocessor formed using an oxide semiconductor. Specifically, the electric refrigerator-freezer 3310 includes a housing 3311, a door for a refrigerator 3312, a door for a freezer 3313, a door for a vegetable drawer 3314, a microprocessor 3315, and the like. In FIG. 17A, the microprocessor 3315 is provided in the housing 3311. The microprocessor 3315 includes the transistor including an oxide semiconductor described in Embodiment 4 and Embodiment 5, and thus power consumption of the microprocessor 3315 can be reduced; accordingly, the power consumption of the electric refrigerator-freezer 3310 can be reduced.

In FIG. 17A, an image display device 3320 is an example of an electric appliance which is provided with the microprocessor formed using an oxide semiconductor. Specifically, the image display device 3320 includes a housing 3321, a display portion 3322, a microprocessor 3323, and the like. In FIG. 17A, the microprocessor 3323 is provided in the housing 3321. The microprocessor 3323 includes the transistor including an oxide semiconductor described in Embodiment 4 and Embodiment 5, and thus power consumption of the microprocessor 3323 can be reduced; accordingly, the power consumption of the image display device 3320 can be reduced.

FIG. 17B illustrates an example of an electric vehicle which is an example of an electric appliance. An electric vehicle 3330 is equipped with a secondary battery 3331. The output of the electric power of the secondary battery 3331 is adjusted by a control circuit 3332 and the electric power is supplied to a driving device 3333. The control circuit 3332 is controlled by a processing unit 3334 including a ROM (not illustrated), a RAM (not illustrated), a microprocessor (not illustrated), or the like. The microprocessor in the processing unit 3334 includes the transistor including an oxide semiconductor described in Embodiment 4 and Embodiment 5, and thus power consumption of the microprocessor can be reduced; accordingly, the power consumption of the electric vehicle can be reduced.

The driving device 3333 includes a DC motor or an AC motor either alone or in combination with an internal-combustion engine. The processing unit 3334 outputs a control signal to the control circuit 3332 based on input data such as data of an operation (e.g., acceleration, deceleration, or stop) by a driver or data during driving (e.g., data on an upgrade or a downgrade, or data on a load on a driving wheel) of the electric vehicle 3330. The control circuit 3332 adjusts the electric energy supplied from the secondary battery 3331 in accordance with the control signal of the processing unit 3334 to control the output of the driving device 3333. In the case where the AC motor is mounted, although not illustrated, an inverter which converts direct current into alternate current is also incorporated.

This embodiment can be implemented by being combined as appropriate with any of the other embodiments.

This application is based on Japanese Patent Application serial no. 2012-047096 filed with Japan Patent Office on Mar. 2, 2012, the entire contents of which are hereby incorporated by reference.

What is claimed is:

1. A microprocessor comprising:
a processor core configured to perform arithmetic processing;
a cache memory comprising a memory cell array including a plurality of memory cells;
an interrupt controller configured to store an interrupt vector; and
a power supply controller configured to control a state of supplying power to the memory cell array including the plurality of memory cells of the cache memory,
wherein the microprocessor have a first operation mode and a second operation mode,
wherein in the first operation mode,
the processor core loads the interrupt vector stored in the interrupt controller, and performs a prefetch of data to the memory cell array included in the cache memory according to the interrupt vector; and
the power supply controller performs a power supply stopping process on the cache memory after the prefetch is completed, and
wherein in the second operation mode,
the power supply controller detects an interrupt event to perform a power supply resuming process on the cache memory; and
the processor core fetches the data in the memory cell array included in the cache memory after supply of power to the cache memory is resumed.

2. The microprocessor according to claim 1,
wherein the power supply controller performs the power supply stopping process on the cache memory and the processor core after the prefetch is completed, and
wherein the power supply controller detects the interrupt event to perform the power supply resuming process on the cache memory and the processor core.

3. The microprocessor according to claim 1, wherein the memory cell is any one of a memory cell including a transistor formed using an oxide semiconductor material for a semiconductor layer, a memory cell including a magnetic tunnel junction element, and a memory cell including an element including a system of holding charge in a floating gate, or a combination of any of these.

4. The microprocessor according to claim 1, wherein data expressed by the interrupt vector stored in the interrupt controller is stored in the memory cell array during the first operation mode.

5. The microprocessor according to claim 1, wherein the first operation mode is a low power consumption mode, and the second operation mode is a normal operation mode.

6. A method for driving a microprocessor,
wherein the microprocessor comprises:
a processor core performing arithmetic processing;
a cache memory comprising a memory cell array including a plurality of memory cells;
an interrupt controller configured to store an interrupt vector; and
a power supply controller configured to control a state of supplying power to the memory cell array including the plurality of memory cells of the cache memory,
wherein the microprocessor is switched to a low power consumption mode by:
loading the interrupt vector stored in the interrupt controller and issuing a prefetch instruction according to the interrupt vector to the cache memory by the processor core;
outputting a first signal for an instruction to stop supplying power to the cache memory to the power supply controller by the processor core after or during prefetch; and
receiving the first signal and performing a power supply stopping process on the cache memory by the power supply controller, and
wherein the microprocessor is switched to a normal operation mode by:
outputting a second signal for an instruction to resume supplying power to the cache memory to the power supply controller by the interrupt controller;
receiving the second signal and resuming supply of power to the cache memory by the power supply controller; and
loading the interrupt vector stored in the interrupt controller and fetching data from the memory cell array included in the cache memory according to the interrupt vector by the processor core.

7. The method for driving a microprocessor, according to claim 6, wherein n (n is an integer of 2 or more) interrupt vectors in decreasing order of a frequency of use of all interrupt vectors stored in the interrupt controller are loaded by the processor core in the case where there are n memory cell arrays included in the cache memory.

8. The method for driving a microprocessor, according to claim 6,
wherein the microprocessor is switched to the low power consumption mode by:
outputting the first signal for the instruction to stop supplying power to the cache memory to the power supply controller by the processor core;
receiving the first signal and outputting a signal for an instruction to load the interrupt vector to the cache memory by the power supply controller;
receiving the signal for the instruction to load the interrupt vector and loading the interrupt vector from the interrupt controller by the cache memory, so that prefetch is performed according to the interrupt vector;
outputting a signal indicating a completion of the prefetch to the power supply controller by the cache memory after the prefetch is completed; and
receiving the signal indicating the completion of the prefetch and stopping supplying power to one or both of the cache memory and the processor core by the power supply controller.

9. The method for driving a microprocessor, according to claim 8, wherein n (n is an integer of 2 or more) interrupt vectors in decreasing order of a frequency of use of all interrupt vectors stored in the interrupt controller are loaded in the cache memory in the case where there are n memory cell arrays included in the cache memory.

* * * * *